United States Patent
Yamagishi

(10) Patent No.: US 10,425,689 B2
(45) Date of Patent: Sep. 24, 2019

(54) RECEPTION APPARATUS, TRANSMISSION APPARATUS, AND DATA PROCESSING METHOD

(71) Applicant: SONY CORPORATION, Tokyo (JP)

(72) Inventor: Yasuaki Yamagishi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/568,652

(22) PCT Filed: Mar. 22, 2016

(86) PCT No.: PCT/JP2016/058933
§ 371 (c)(1),
(2) Date: Oct. 23, 2017

(87) PCT Pub. No.: WO2016/174959
PCT Pub. Date: Nov. 3, 2016

(65) Prior Publication Data
US 2018/0146252 A1 May 24, 2018

(30) Foreign Application Priority Data
Apr. 30, 2015 (JP) .................................. 2015-092627

(51) Int. Cl.
*G06F 13/00* (2006.01)
*H04N 21/435* (2011.01)
(Continued)

(52) U.S. Cl.
CPC ......... *H04N 21/4622* (2013.01); *G06F 13/00* (2013.01); *H04H 20/91* (2013.01);
(Continued)

(58) Field of Classification Search
CPC ......... H04N 21/4622; H04N 21/23614; H04H 20/91; H04H 60/25
See application file for complete search history.

(56) References Cited

U.S. PATENT DOCUMENTS

2006/0109376 A1* 5/2006 Chaffee .............. G05B 19/0423
348/423.1
2010/0007483 A1* 1/2010 Oh ......................... H04L 67/36
340/521
(Continued)

FOREIGN PATENT DOCUMENTS

JP 2011-87103 A 4/2011
JP 2014-57227 A 3/2014
(Continued)

OTHER PUBLICATIONS

"Digital Video Broadcasting (DVB); MPEG-DASH Profile for Transport of ISO BMFF Based DVB Services over IP Based Networks" Draft ETSI TS 10, May 2014.*
(Continued)

*Primary Examiner* — Sumaiya A Chowdhury
(74) *Attorney, Agent, or Firm* — Oblon, McClelland, Maier & Neustadt, L.L.P.

(57) ABSTRACT

A configuration by which application control in which an application control message is applied can be executed with certainty is implemented.
A transmission apparatus transmits event notification data in which an application control message (ACM) is stored as event data to a reception apparatus. An application controlling unit of the reception apparatus executes application control based on the ACM stored as event data in the event notification message. The event notification data is stored in an MPD that is signaling data or in a segment that is data for transmission of an AV content, and the reception apparatus can acquire the ACM from the MPD or the segment and perform rapid application control.

17 Claims, 24 Drawing Sheets

(51) Int. Cl.
| | |
|---|---|
| *H04H 20/91* | (2008.01) |
| *H04H 60/25* | (2008.01) |
| *H04N 21/236* | (2011.01) |
| *H04N 21/434* | (2011.01) |
| *H04N 21/436* | (2011.01) |
| *H04N 21/81* | (2011.01) |
| *H04N 21/845* | (2011.01) |
| *H04N 21/6405* | (2011.01) |
| *H04N 21/462* | (2011.01) |

(52) U.S. Cl.
CPC ...... *H04H 60/25* (2013.01); *H04N 21/23614* (2013.01); *H04N 21/435* (2013.01); *H04N 21/436* (2013.01); *H04N 21/4345* (2013.01); *H04N 21/8173* (2013.01); *H04N 21/845* (2013.01); *H04N 21/6405* (2013.01)

(56) References Cited

U.S. PATENT DOCUMENTS

| | | | | |
|---|---|---|---|---|
| 2010/0259380 A1* | 10/2010 | Ohtani | ............ | G05B 9/02 340/540 |
| 2012/0208562 A1* | 8/2012 | Wilkin | ............ | H04L 41/12 455/456.3 |
| 2013/0291040 A1* | 10/2013 | Rhyu | ............ | H04N 21/4622 725/109 |

FOREIGN PATENT DOCUMENTS

| | | | |
|---|---|---|---|
| WO | WO 2006/075885 A1 | 7/2006 | |
| WO | WO2006075885 * | 7/2006 | ............ H04N 7/12 |

OTHER PUBLICATIONS

International Search Report dated May 31, 2016 in PCT/JP2016/058933.

Gwang Soon Lee, et al., "Data Broadcasting Server and Receiver for Middleware based Data Services in Terrestrial DMB", Proc. Of 2007 IEEE Int. Symp. On Consumer Electronics, 2007, 7 pages.

"eDASH: Draft CR for Ad Insertion", Qualcomm Incorporated, 3GPP TSG-SA4 #82, S4-150022, Jan. 2015, 33 pages.

Gwangsoon Lee, et al., "Design of Middleware for Interactive Data Services in the Terrestrial DMB", ETRI Journal, vol. 28, No. 5, Oct. 2006, pp. 652-655 with cover pages.

Extended European Search Report dated Sep. 18, 2018, in corresponding European Patent Application No. EP 16786236.6.

"Information technology—Dynamic adaptive streaming over HTTP (DASH)—Part 3: Implementation guidelines," ISO/IEC PDTR 23009-3, Jan. 2013.

Yamagishi et al, "Event Notification Transport Protocol," Sony Corporation, Document No. AN140, Jul. 2000.

* cited by examiner

FIG. 16

```
<MPD availabilityStartTime="2011-12-25T12:30:00">   ← START TIME (UTC TIME) OF FIRST PERIOD (Period)
<Period startTime='0'>   ← OFFSET TIME PERIOD FROM PERIOD START TIME INFORMATION (MPD PRESCRIBED START TIME (MPD/@availabilityStartTime))
...
<EventStream schemeIdUri='urn:atsc:appControlMessage' timescale='1000'>   ← EVENT TYPE INFORMATION AND TIMESCALE INFORMATION (UNIT TIME PERIOD OF FOLLOWING presentationTime IS DESIGNATED AS 1/1000 SECOND)
<Event presentationTime='0' duration='1000'>(ACM①STORAGE)</Event>   ← ACTIVATE EVENT DATA (ACM ①), EVENT ACTIVATE TIME AND DURATION AT RECORDING TIME = 0, CONTINUE FOR 1000 UNIT TIME PERIODS
<Event presentationTime='1000' duration='4000'>(ACM②STORAGE)</Event>   ← ACTIVATE EVENT DATA (ACM ②), EVENT ACTIVATE TIME AND DURATION AT RECORDING TIME = 0, CONTINUE FOR 1000 UNIT TIME PERIODS
...
</EventStream>
...
<AdaptationSet>   ← STREAM (Video, Audio OR THE LIKE) WITH WHICH EVENT IS ASSOCIATED
<Representation/>   ← FOR EXAMPLE, LOW BIT RATE IMAGE SEGMENT-CORRESPONDING INFORMATION
<Representation/>   ← FOR EXAMPLE, HIGH BIT RATE IMAGE SEGMENT-CORRESPONDING INFORMATION
</AdaptationSet>
...
</Period>
</MPD>
```

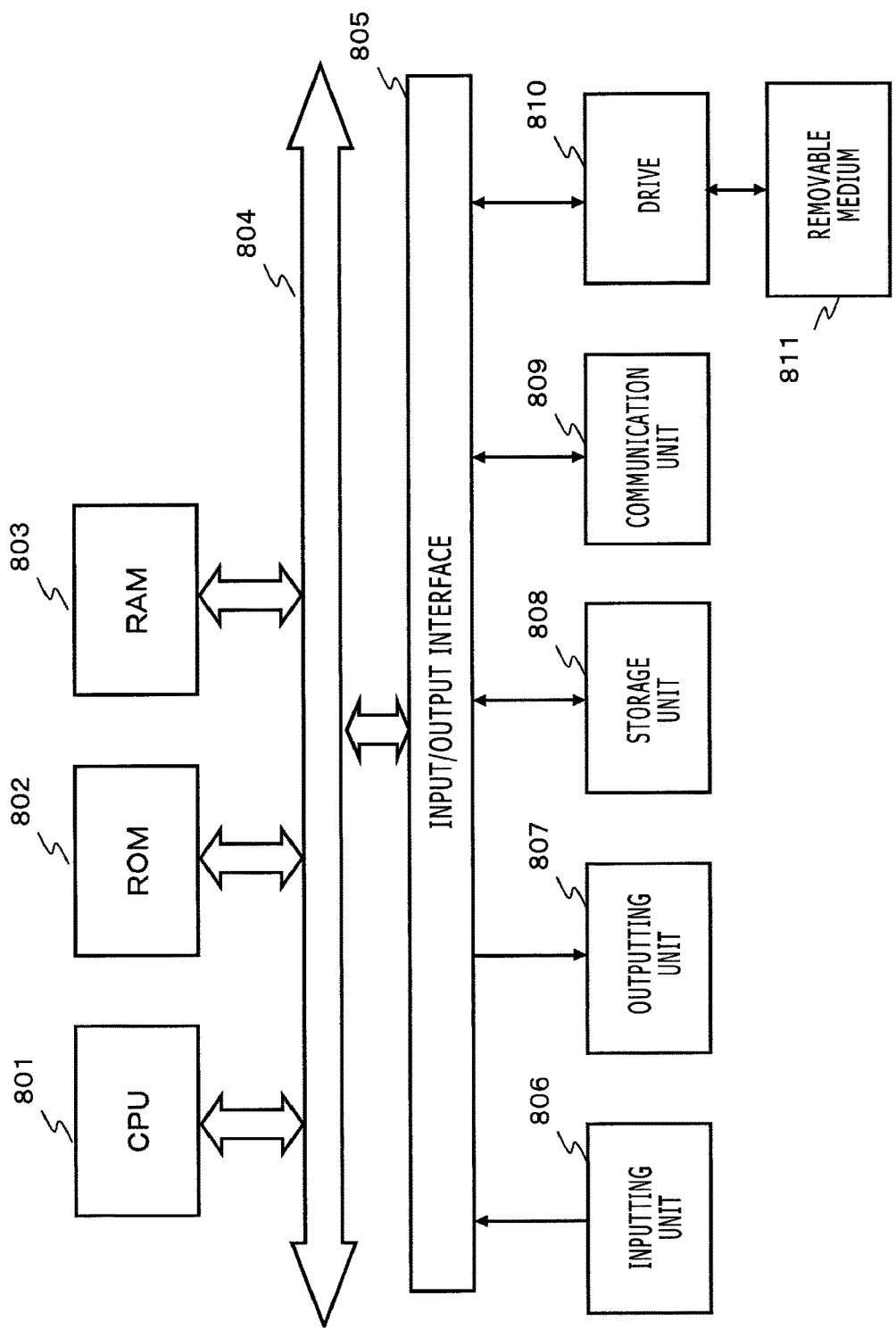

RECEPTION APPARATUS, TRANSMISSION APPARATUS, AND DATA PROCESSING METHOD

TECHNICAL FIELD

The present disclosure relates to a reception apparatus, a transmission apparatus, and a data processing method. More particularly, the present disclosure relates to a reception apparatus and a transmission apparatus that execute reception or reception of data, for example, through a broadcasting wave or a network and a data processing method ready for communication data.

BACKGROUND ART

OTT (Over The Top) is available as a data distribution method by which a content of image data, sound data and so forth can be distributed irrespective of a service form of individual telecommunication carriers. A distribution content by OTT is called OTT content, and a distribution service of image (video) data in which OTT is utilized is called OTT video or OTT-V (Over The Top Video).

The DASH (Dynamic Adaptive Streaming over HTTP) standard is available as a data streaming distribution standard according to OTT-V. DASH is a standard relating to adaptive (adaptive) streaming distribution that uses a streaming protocol based on HTTP (HyperText Transfer Protocol).

In adaptive (adaptive) streaming, in order to allow content reproduction by various clients, which become a data distribution destination, a content distribution server of a broadcasting station or the like produces a manifest file that describes segmented files of a video content of a plurality of bit rates and attribute information or a URL of the segmented files and provides the produced manifest file to a client.

The client would acquire the manifest file from a server, select an optimum bit rate content according to a size of a display unit of an own apparatus or an available communication band, and receive and reproduce the selected content. Also it is possible to perform dynamic change of the bit rate in response to a variation of the network band, and the client side can switchably receive an optimum content in accordance with a situation from time to time, and reproduction of a video content by which occurrence of video interruption is reduced is implemented. It is to be noted that adaptive (adaptive) streaming is described, for example, in PTL 1 (JP 2011-87103 A).

Development and standardization of a system for transmitting and receiving a content such as a broadcasting program using unidirectional communication by a broadcasting wave or the like or bidirectional communication or unidirectional communication through a network such as the Internet from a broadcasting station or some other transmission apparatus such as a content server to a reception apparatus such as a television set, a PC (Personal Computer) or a portable terminal are proceeding actively.

It is to be noted that, as a related-art document that discloses a technology for implementing data distribution through a broadcasting wave and a network, for example, PTL 2 (JP 2014-057227 A) is available.

As a standard relating to a data distribution system through a broadcasting wave and a network, standardization of ATSC (Advanced Television System Committee) 3.0 is currently proceeding.

In ATSC3.0, a configuration is being investigated wherein middleware for executing a reception process and so forth of ATSC3.0 broadcasting is incorporated in a broadcast distribution device (tuner-mounting device) having the ATSC3.0 compliant physical layer (ATSC-PHY) incorporated therein such that signaling data including control information and so forth for ATSC broadcasting is received to allow various controls based on the signaling data.

In particular, a configuration is being investigated wherein control based on signaling data can implement output processing of a broadcasting content or data processing that utilizes various applications provided by a broadcasting wave or the like utilizing an application program utilized on the Internet or the like, namely, a client application, as it is.

For example, into a server that is installed in a home or at a hot spot and receives a broadcasting service (in addition to a server for exclusive use, a PC, a TV (Television) set, a tablet, a smartphone or the like), the ATSC3.0 compliant physical layer (ATSC-PHY) and ATSC3.0 broadcasting reception middleware are incorporated.

After the ATSC3.0 broadcasting service is received once, the servers transfer the broadcasting reception data to a user apparatus (a PC, a TV set, a tablet, a smartphone or the like) through a network (a home network or a LAN/Wi-Fi (Wireless Fidelity) at a hot spot or the like).

The user apparatus to which the broadcasting reception data transferred through a server is inputted can execute reproduction of a broadcasting content or various applications distributed by the broadcasting utilizing an application that operates on a reproduction controlling unit or an application controlling unit of the user apparatus (for example, an ATSC3.0 DASH client application).

In this form, the middleware that executes analysis and so forth of signaling data including control information of the ATSC3.0 broadcasting service becomes a termination device which can perform immediate analysis processing at a reception timing of the signaling data. As a result, such a case occurs that the reproduction controlling unit or the application controlling unit of the user apparatus at the succeeding stage cannot perform a process according to an analysis result of the signaling data transmitted by a broadcasting wave or the like as an immediate process that does not give rise to a delay from the reception timing of the signaling data.

However, the signaling data processed by the middleware sometimes includes an application control message. This message is a message to be utilized for control of the application executed by the application controlling unit at the succeeding stage, and there is a problem that the application controlling unit cannot perform correct application control if it does not refer to the application control message.

CITATION LIST

Patent Literature

[PTL 1]
JP 2011-87103 A
[PTL 2]
JP 2014-057227 A

SUMMARY

Technical Problem

The present disclosure has been made in view of, for example, such problems as described above, and it is an object of the present disclosure to provide a reception apparatus, a transmission apparatus, and a data processing method that implement a configuration by which, when an application control message or the like is included in signaling data received by ATSC3.0 broadcasting reception middleware, the application control message or the like is outputted to an application controlling unit with certainty.

Solution to Problem

A first aspect of the present disclosure is a reception apparatus, including: a communication unit configured to receive event notification data in which an application control message is stored as event data; and an application controlling unit configured to execute application control based on the application control message stored as event data in an event notification message.

Further, a second aspect of the present disclosure is a reception apparatus, including: a communication unit configured to receive an application control message; middleware configured to produce event notification data in which the application control message is stored as event data; a data processing unit configured to acquire the application control message from the event notification data and output the application control message to an application controlling unit; and the application controlling unit configured to execute application control based on the application control message.

Further, a third aspect of the present disclosure is a transmission apparatus, including a communication unit configured to transmit event notification data in which an application control message is stored as event data.

Further, a fourth aspect of the present disclosure is a data processing method executed by a reception apparatus, including: receiving, by a communication unit, event notification data in which an application control message is stored as event data; and executing, by an application controlling unit, application control based on the application control message stored as event data in an event notification message.

Further, a fifth aspect of the present disclosure is a data processing method executed by a reception apparatus, including: receiving, by a communication unit, an application control message; producing, by middleware, event notification data in which the application control message is stored as event data; acquiring, by a data processing unit, the application control message from the event notification data and outputting the application control message to an application controlling unit; and executing, by the application controlling unit, application control based on the application control message.

Furthermore, a sixth aspect of the present disclosure is a data processing method executed by a transmission apparatus, including: transmitting, by a communication unit, event notification data in which an application control message is stored as event data.

The above and other objects, features and advantages of the present disclosure will become more apparent from the more detailed description based on the embodiment of the present disclosure hereinafter described and the attached drawings. It is to be noted that the term "system" herein is a logical aggregation configuration of a plurality of apparatus and is not limited to a system in which component apparatus are accommodated in the same housing.

Advantageous Effects of Invention

According to the configuration of one embodiment of the present disclosure, a configuration is implemented by which application control to which an application control message is applied can be executed with certainty.

In particular, a transmission apparatus transmits an event notification data, in which an application control message (ACM) is stored as event data, to a reception apparatus. An application controlling unit of the reception apparatus executes application control based on the ACM stored as event data in the event notification message. The event notification data is stored in an MPD that is signaling data or a segment that is data for transmission of an AV (Audio-Visual) content, and the reception apparatus can acquire the ACM from the MPD or the segment and perform rapid application control.

By the configuration just described, a configuration can be implemented by which application control to which an application control message is applied can be executed with certainty.

It is to be noted that the advantageous effects described herein are illustrative and not restrictive and there may be additional effects.

BRIEF DESCRIPTION OF DRAWINGS

FIG. 16 is a view illustrating an example of an MPD in which an application control message (ACM) is stored.

FIG. 24 is a view illustrating an example of a hardware configuration of the transmission apparatus and the reception apparatus that are communication apparatus.

DESCRIPTION OF EMBODIMENT

In the following, details of a reception apparatus, a transmission apparatus and a data processing method of the present disclosure are described with reference to the drawings. It is to be noted that the description is given in accordance with the following items.
1. Example of Configuration of Communication System
2. Data Communication Protocol FLUTE and ROUTE
3. Example of Communication Process Executed by Transmission Apparatus and Reception Apparatus
4. Example of Configuration and Example of Processing of Reception Apparatus
5. Transfer Process of Application Control Message
6. Event Notification Configuration
6-1. MPD Application Event Notification Method (=MPD Event)
6-2. Segment Application Event Notification Method (=In-band Event Signaling)
7. Notification Process of Application Control Message
7-1. Overview of Application Control Message Notification Configuration Utilizing Event Notification Mechanism
7-2. Notification Configuration of Application Control Message to Which MPD Application Event Notification Method (=MPD Event) is Applied
7-3. Notification Configuration of Application Control Message to Which Segment Application Event Notification Method (=In-band Event Signaling) is Applied
8. Notification and Utilization Sequence of Application Control Message (ACM)
8-1. Transmission and Utilization Sequence of Application Control Message to Which MPD Application Event Notification Method (=MPD Event) is Applied
8-2. Transmission and Utilization Sequence of Application Control Message to Which Segment Application Event Notification Method (=In-band Event Signaling) is Applied
9. Example of Processing Where Tuner-Non-Mounting Reception Apparatus is Utilized
9-1. Transmission and Utilization Sequence of Application Control Message to Which MPD Application Event Notification Method (=MPD Event) is Applied
9-2. Transmission and Utilization Sequence of Application Control Message to Which Segment Application Event Notification Method (=In-band Event Signaling) is Applied
10. Example of Configuration of Transmission Apparatus and Reception Apparatus
11. Summary of Configuration of Present Disclosure
1. Example of Configuration of Communication System First, an example of a configuration of a communication system that executes a process of the present disclosure is described with reference to FIG. 1.

Figure 1:
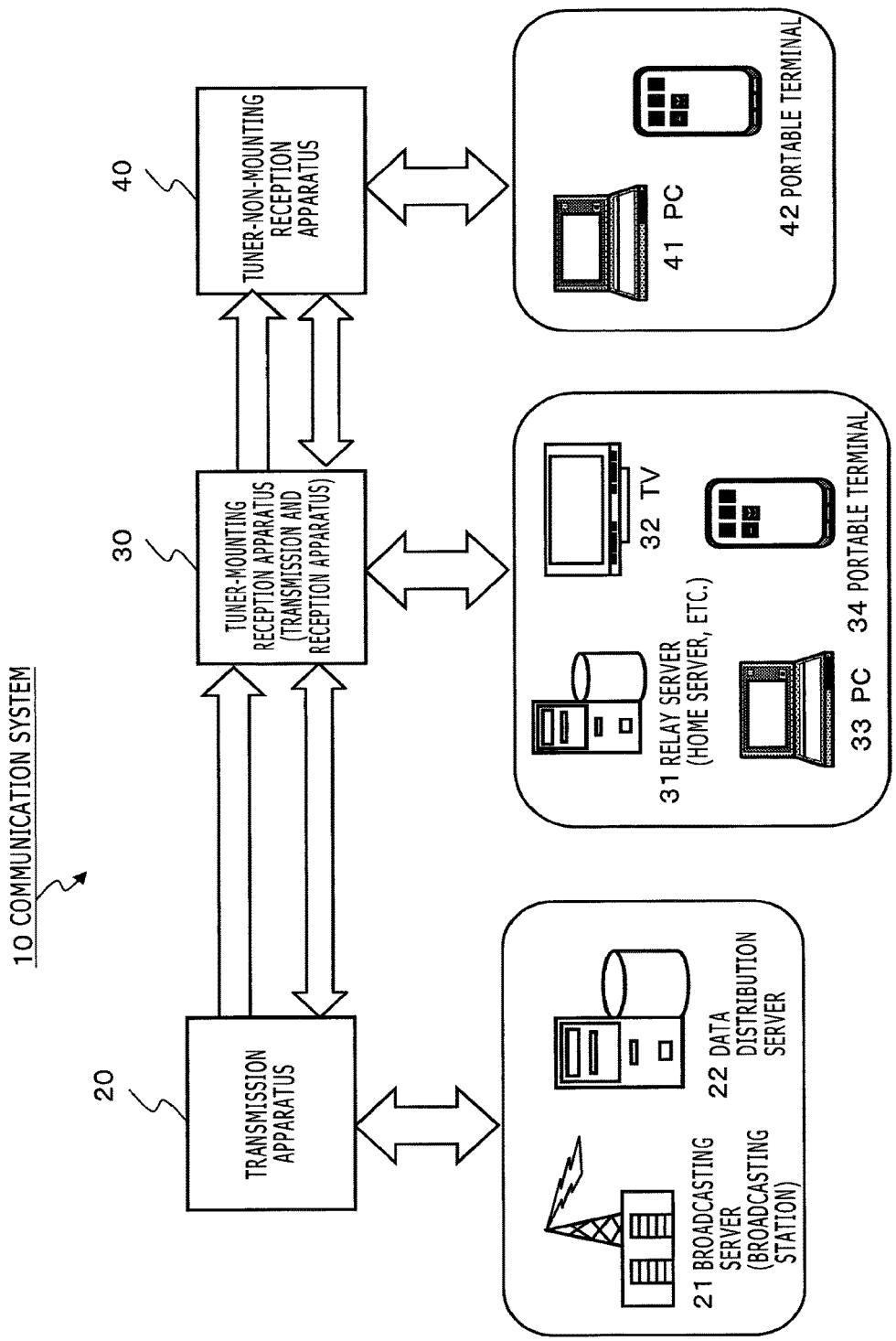
FIG. 1 is a view illustrating an example of a configuration of a communication system that executes a process of the present disclosure.

As depicted in FIG. 1, the communication system 10 includes a transmission apparatus 20 that is a communication apparatus that transmits a content such as image data, sound data and so forth, a tuner-mounting reception apparatus 30 that is a communication apparatus that receives the content transmitted from the transmission apparatus 20 through a broadcasting wave or a network, and a tuner-non-mounting reception apparatus 40 that receives the content transmitted from the transmission apparatus 20 through the tuner-mounting reception apparatus 30 and a network.

The transmission apparatus 20 particularly is an apparatus that provides a content such as, for example, a broadcasting station 21, a data distribution server 22 or the like.

The tuner-mounting reception apparatus 30 is a reception apparatus that includes a tuner for receiving a broadcasting wave. For example, the tuner-mounting reception apparatus 30 is a client apparatus or a home server of a general user, a relay server installed in a public facility or the like. In particular, the tuner-mounting reception apparatus 30 is, for example, a relay server (including a home server or the like) 31, a television set 32, a PC 33, a portable terminal 34 or the like.

On the other hand, the tuner-non-mounting reception apparatus 40 is a reception apparatus that does not include a tuner for receiving a broadcasting wave. In particular, the tuner-non-mounting reception apparatus 40 is a PC 41, a portable terminal 42 or the like.

Data communication between the transmission apparatus 20 and the tuner-mounting reception apparatus 30 is performed as communication that utilizes at least one or both of bidirectional communication or unidirectional communication through a network such as the Internet and unidirectional communication by a broadcasting wave or the like.

Content transmission from the transmission apparatus 20 to the tuner-mounting reception apparatus 30 is executed, for example, in accordance with the DASH (MPEG (Moving Picture Experts Group)-DASH) standard that is a standard of the adaptive (adaptive) streaming technology.

It is to be noted that the DASH (Dynamic Adaptive Streaming over HTTP) standard is a standard relating to adaptive (adaptive) streaming distribution in which a streaming protocol based on the HTTP (Hyper Text Transfer Protocol) is used as described hereinabove.

The MPEG-DASH standard includes the following two standards:
(a) standard relating to a manifest file (MPD: Media Presentation Description) for describing metadata that is management information of a video or audio file; and
(b) standard relating to a file format (segment format) for video content transmission.

Content distribution from the transmission apparatus 20 to the tuner-mounting reception apparatus 30 is executed in accordance with the MPEG-DASH standard described above.

A content received by the tuner-mounting reception apparatus 30 is transferred to the tuner-non-mounting reception apparatus 40 through a network (in a home, through a home network (LAN/Wi-Fi or the like), but at a hot spot, Wi-Fi or the like)).

The tuner-mounting reception apparatus 30 and the tuner-non-mounting reception apparatus 40 can perform reproduction of a content transmitted from the transmission apparatus 20.

The transmission apparatus 20 encodes content data and produces a data file including the encoded data and metadata of the encoded data. The encoding process is performed, for example, in accordance with the MP4 file format prescribed in MPEG. It is to be noted that a file of encoded data when the transmission apparatus 20 produces a data file of the MP4 format is called "mdat," and metadata is called "moov," "moof" or the like.

Contents provided to the tuner-mounting reception apparatus 30 by the transmission apparatus 20 are, for example, music data, video data of a movie, a television program, a video, a photograph, a document, a picture or a chart or various data of a game and software.

Transmission data of the transmission apparatus 20 is described with reference to FIG. 2.

Figure 2:
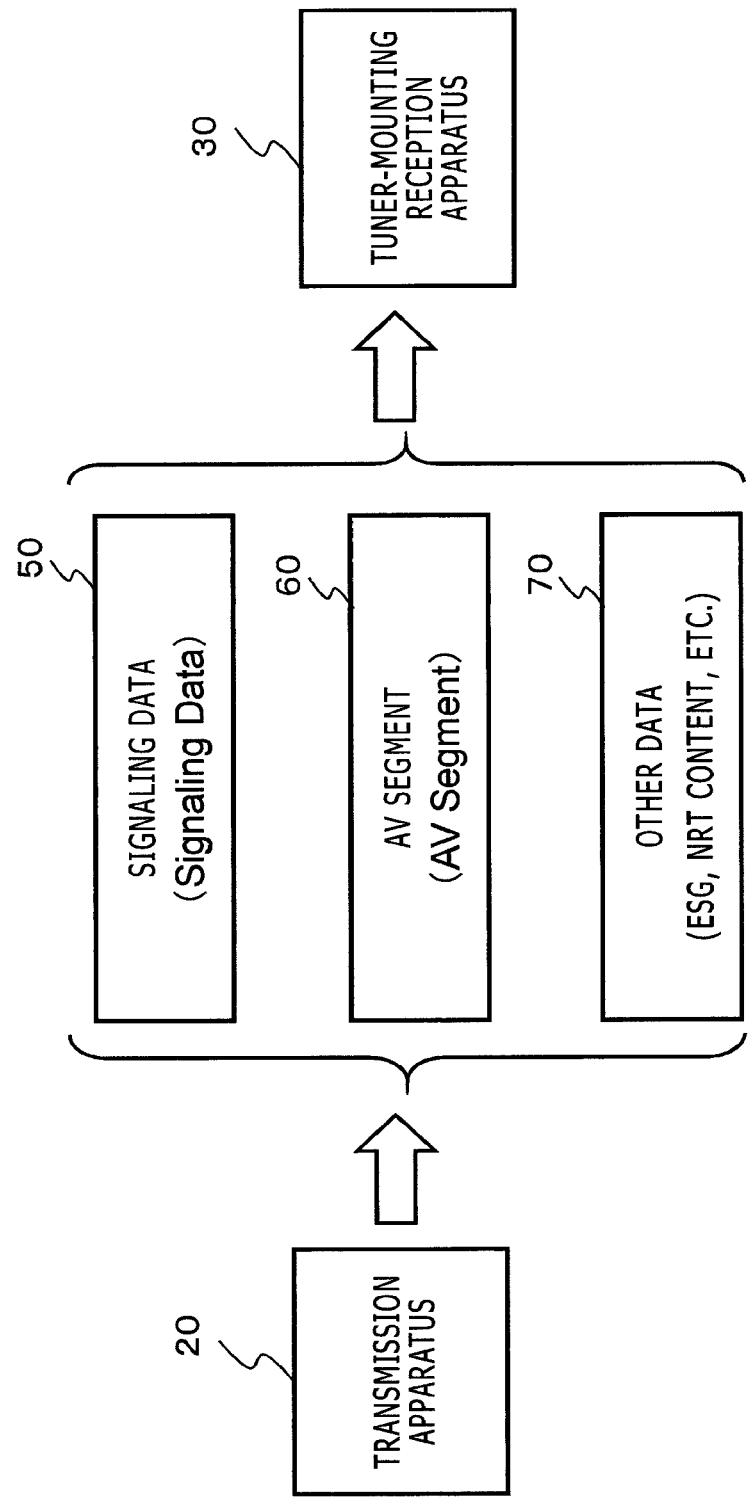
FIG. 2 is a view illustrating transmission data of a transmission apparatus.

The transmission apparatus 20 that executes data transmission in accordance with the MPEG-DASH standard performs transmission of, when roughly divided, a plurality of types of data given below, as illustrated in FIG. 2.
(a) Signaling data 50
(b) AV segment 60
(c) Other data (ESG, NRT content or the like) 70

The AV segment 60 includes image (Video) or sound (Audio) data to be reproduced by a reception apparatus, namely, for example, a program content or the like provided from a broadcasting station. For example, the AV segment 60 includes MP4 encoded data (mdat) and metadata (moov, moof) described hereinabove. It is to be noted that the AV segment is also called DASH segment.

In the meantime, the signaling data 50 includes various kinds of control information such as program schedule information such as a program table, address information necessitated for program acquisition (URL (Uniform Resource Locator) or the like), information necessitated for a reproduction process of a content, for example, guide information configured from codec information (encoding method or the like), application control information and so forth.

It is necessary for the tuner-mounting reception apparatus 30 to receive the signaling data 50 in prior to reception of the AV segment 60 in which a program content that becomes a reproduction target is stored.

The signaling data 50 is transmitted, for example, as data of the XML (Extensible Markup Language) format from the transmission apparatus 20.

The signaling data is repetitively transmitted from time to time. For example, the signaling data is transmitted frequently and repetitively, for example, after every 100 milliseconds.

This is intended to make it possible for a reception apparatus (client) to acquire signaling data immediately at any time.

A client (reception apparatus) can execute, without delay, processes necessary for reception and reproduction of a program content, such as acquisition of an address for accessing of a necessary program content or a codec setting process at any time on the basis of signaling data that can be received.

The other data 70 include, for example, an ESG (Electronic Service Guide), an NRT content and so forth. The ESG is an electronic service guide (Electronic Service Guide) and is guide information such as, for example, a program table.

The NRT content is a content of the non-real time type.

The NRT content includes, for example, various application files executed on a browser of the tuner-mounting reception apparatus 30 that is a client and data files of moving images, still images and so forth.

The data illustrated in FIG. 2 and given below, namely,
(a) the signaling data 50
(b) the AV segment 60
(c) the other data (ESG, NRT content or the like) 70 are transmitted, for example, in accordance with a data communication protocol: FLUTE (File Delivery over Uni-directional Transport).

2. Data Communication Protocol FLUTE and ROUTE

The data communication protocol: FLUTE (File Delivery over Uni-directional Transport) is a protocol for performing session management of a content transmitted by multicast.

For example, a file (identified by a URL and a version) produced by the server side that is a transmission apparatus is transmitted to a client that is a reception apparatus in accordance with the FLUTE protocol.

The tuner-mounting reception apparatus (client) 30 accumulates, for example, URLs and versions of reception files and the files in an associated relation with each other into a storage unit (client cache).

It is considered that a file having the same URL but having a different version from those of other files is updated in the substance thereof. Although the FLUTE protocol performs only unidirectional file transfer control and does not have a selective filtering function of a file by a client, if a file whose transfer is controlled by FLUTE is selectively used by the client side utilizing metadata linked with the file, then it is possible to implement selective filtering and perform configuration and update management of the local cache on which the preference of the user is reflected.

It is to be noted that not only it is possible to expand and incorporate metadata into the FLUTE protocol but also it is possible to describe metadata separately by a protocol such as ESG (Electronic Service Guide).

It is to be noted that FLUTE was initially specified as a file transfer protocol in multicast. FLUTE is configured from a combination of an FDT and a multicast protocol for a scalable file object called ALC (Asynchronous Layered Coding), particularly, LCT (Layered Coding Transport) or FEC (Forward Error Correction) components that are building blocks of the multicast protocol.

Although the conventional FLUTE was developed for the object of utilization principally for asynchronous file transfer, expansion for making it easy to apply the FLUTE also to broadcast live streaming is being performed at present by ATSC (Advanced Television System Committee) that is a normalization organization for a data distribution system through a broadcasting wave and a network. The expansion specification of this FLUTE is called ROUTE (Real-Time Object Delivery over Unidirectional Transport).

As one of standards for a data distribution system through a broadcasting wave and a network, ATSC (Advanced Television System Committee) 3.0 is available which is a standard whose standardization is being advanced at present. This ATSC3.0 prescribes a stack configuration that adopts ROUTE for transmission of signaling data, an ESG, an asynchronous file, a synchronous type stream and so forth in place of the conventional FLUTE protocol.

3. Example of Communication Process Executed by Transmission Apparatus and Reception Apparatus Now, an example of a communication process executed by a transmission apparatus and a reception apparatus is described.

Figure 3:
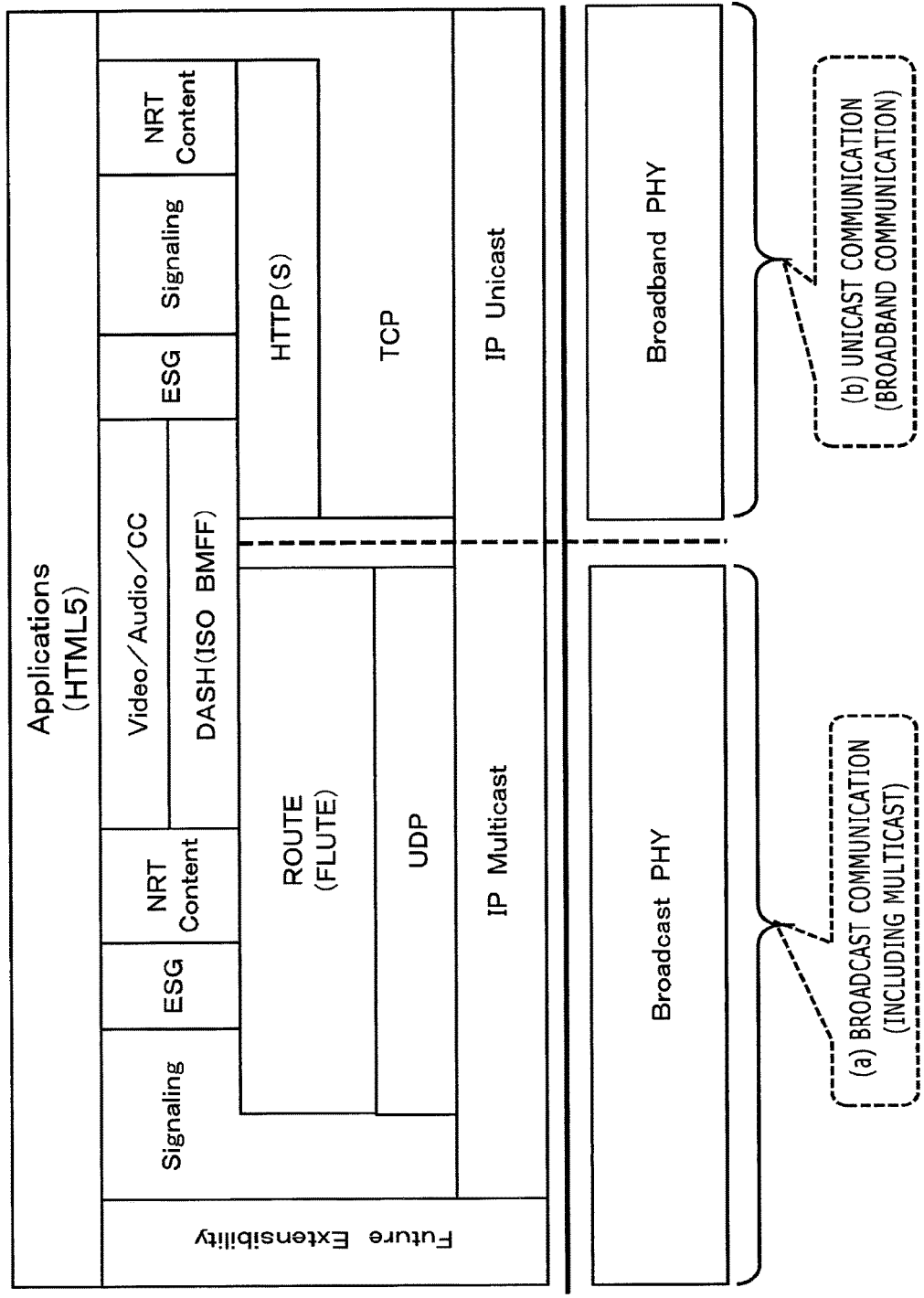
FIG. 3 is a view depicting an example of a protocol stack of the transmission apparatus and a reception apparatus.

FIG. 3 is a view depicting an example of a protocol stack of a transmission apparatus and a reception apparatus.

The example depicted in FIG. 3 has two protocol stacks for performing the following two processes of communication data:
(a) broadcast (including multicast) communication (for example, broadcasting type data distribution); and (b) unicast (broadband) communication (for example, P2P (Peer-to-Peer) communication of the HTTP type).

The left side in FIG. 3 depicts a protocol stack ready for (a) broadcast communication (for example, broadcasting type data distribution).

The right side in FIG. 3 depicts a protocol stack ready for (b) unicast (broadband) communication (for example, P2P communication of the HTTP type)

The protocol stack ready for (a) broadcast communication (for example, broadcasting type data distribution) indicated at the left side in FIG. 3 has the following layers in order from the lowermost layer:

(1) broadcast physical layer (Broadcast PHY);
(2) IP (Internet Protocol) multicast layer (IP Multicast);
(3) UDP (User Datagram Protocol) layer;
(4) ROUTE (=expansion type FLUTE) layer;
(5) ESG, NRT content, DASH (ISO (International Organization for Standardization) BMFF (Base Media File Format)) and Video/Audio/CC (Closed Caption); and
(6) application layer (Applications (HTML5 (Fifth Version of HyperText Markup Language))).

It is to be noted that, as an upper layer of (2) the IP multicast layer (IP Multicast), a signaling (Signaling) layer is set.

The signaling layer is a layer applied to transmission and reception of the signaling data 50 described hereinabove with reference to FIG. 2. The signaling data includes program schedule information such as a program table, address information (URL or the like) necessitated for program acquisition, information necessitated for a reproduction process of a content, guide information formed, for example, from codec information (encoding method or the like), control information and so forth.

The signaling data is data including access information of an AV segment to be received and reproduced by a reception apparatus (client) and guide information and control information that are necessitated for processes after reception such as a decoding process, and is data that is transmitted repetitively from time to time from a transmission apparatus.

There are various kinds of signaling data according to information. In particular, the signaling data includes a USD (user service description (User Service Description)) that is signaling data in a unit of a service.

The USD includes various kinds of control information. As representative control information, MPD (media presentation description (Media Presentation Description)) that is signaling data having a manifest file in which various guide information and control information corresponding to a content (AV segment) are stored is available.

Various kinds of signaling data are data that are necessitated by a reception apparatus (client) for reception, a reproduction process and a control process of an AV segment or an application (application program) transmitted from a transmission apparatus, and are set as files (metafiles) individually, for example, for different categories and transmitted from the transmission apparatus.

It is to be noted that, as an upper layer of (1) the broadcast physical layer (Broadcast PHY), a utilization permission layer (Future Extensibility) of a new protocol in the future is set.

(1) The broadcast physical layer (Broadcast PHY) is a physical layer configured from a communication controlling unit that controls a communication unit, for example, of the broadcasting system for executing broadcast communication.

(2) The IP multicast layer (IP Multicast) is a layer for executing a data transmission and reception process in accordance with the IP multicast.

(3) The UDP layer is a production and analysis process layer for a UDP packet.

(4) The ROUTE layer is a layer for performing storage or extraction of transfer data in accordance with the ROUTE protocol that is an expansion type FLUTE protocol.

Route is a multicast protocol of a scalable file object called ALC similarly to FLUTE and particularly includes a combination of LCT or FEC components that are building blocks of the protocol.

Figure 4:
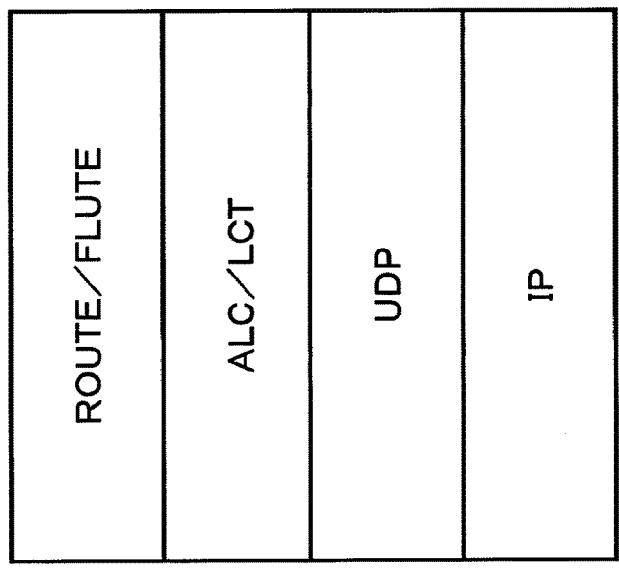
FIG. 4 is a view illustrating a ROUTE/FLUTE protocol stack.

FIG. 4 depicts a protocol stack relating to ROUTE and FLUTE.

(5) The ESG, NRT content, DASH (ISO BMFF) and Video/Audio/CC are data transferred in accordance with the ROUTE protocol.

A broadcast distribution service in accordance with the DASH standard is called MBMS (Multimedia Broadcast Multicast Service). As a method for efficiently implementing this MBMS by LTE (Long Term Evolution), eMBMS (evolved Multimedia Broadcast Multicast Service) is available.

MBMS and eMBMS are broadcast distribution services and services that distribute same data, for example, a movie content, all at once by a common bearer to a plurality of user terminals (UE) that are reception apparatus positioned in a specific area. By broadcast distribution in accordance with MBMS or eMBMS, a same content can be provided at the same time to a large number of reception apparatus such as smartphones, PCs or television sets positioned in a distribution service provision area.

MBMS and eMBMS prescribe a process for downloading a file according to the 3GPP (Third Generation Partnership Project) file format (ISO-BMFF file or MP4 file) in accordance with the transfer protocol ROUTE or FLUTE.

The data described hereinabove with reference to FIG. 2 and given below, namely,
(a) the signaling data 50,
(b) the AV segment 60, and
(c) the other data (ESG, NRT content or the like) 70 are in most cases transmitted in accordance with the ROUTE protocol or the FLUTE protocol.

(5) The ESG, NRT content, DASH (ISO BMFF) and Video/Audio/CC are data transferred in accordance with the ROUTE protocol.

ESG is an electronic service guide (Electronic Service Guide) and is guide information such as, for example, a program table.

NRT content is a content of the non-real time type.

As described hereinabove, the NRT content includes various application files executed, for example, on a browser of a reception apparatus that is a client, and data files of moving pictures, still pictures and so forth.

Video/Audio/CC is actual data that becomes a reproduction target such as videos and audios distributed in accordance with the DASH standard.

(6) The application layer (Applications (HTML5)) is an application layer for executing production or analysis of data to be transferred in accordance with the ROUTE protocol, output control of various data and so forth, and performs data production, analysis, outputting processes and so forth to which, for example, HTML5 is applied.

On the other hand, the protocol stack illustrated at the right side in FIG. 3 and ready for (b) unicast (broadband)

communication (for example, P2P communication of the HTTP type) has the following layers in order from the lowermost layer:
(1) broadband physical layer (Broadband PHY);
(2) IP unicast layer (IP Unicast);
(3) TCP (Transmission Control Protocol) layer;
(4) HTTP layer;
(5) ESG, Signaling, NRT Content, DASH (ISO BMFF) and Video/Audio/CC; and
(6) application layer (Applications (HTML5)).
(1) The broadcast physical layer (Broadcast PHY) is a physical layer configured from a communication controlling unit such as a device driver that controls a communication unit, for example, of a network card for executing broadband communication.
(2) The IP unicast layer (IP Unicast) is a layer for executing an IP unicast transmission and reception process.
(3) The HTTP layer is a production and analysis process layer for an HTTP packet.

This upper layer has a stack configuration similar to that of the (a) broadcast communication (for example, data distribution of the broadcasting type) at the left side in FIG. 3.

It is to be noted that the transmission apparatus (server) 20 and the tuner-mounting reception apparatus (client) 30 perform a process in accordance with at least one of the two communication protocol stacks for the following two processing systems of FIG. 3, namely,
(a) broadcast communication (or data distribution of the broadcasting type), and
(b) unicast (broadband) communication (for example, P2P communication of the HTTP type).

Meanwhile, the tuner-non-mounting reception apparatus (client) 40 executes, as a communication process with the tuner-mounting reception apparatus (client) 30, a communication process in accordance with the communication protocol stack for the processing system at the right side in FIG. 3, namely,
(b) unicast (broadband) communication (for example, P2P communication of the HTTP type).

In the protocol stacks depicted in FIG. 3, it is possible to describe an attribute of a file group to be multicast-transferred in accordance with ROUTE (FLUTE) (attribute including a URL that is an identifier of each file) not only in a control file of ROUTE (FLUTE) but also in signaling (Signaling) data that describes a file transfer session. Also it is possible to describe a further detailed attribute of the file transfer session by ESG (that can be applied also for a presentation application to an end user).

As described hereinabove, as one of standards relating to a data distribution system through a broadcasting wave and a network, normalization of ATSC (Advanced Television System Committee) 3.0 is proceeding.

In the standardization of an IP-based transport stack in ATSC3.0, a method of transporting a file based on a file format of MPEG-DASH (ISO-BMFF file or MP4 file) in accordance with the ROUTE (Real-Time Object Delivery over Unidirectional Transport) protocol expanded from FLUTE (File Delivery over Unidirectional Transport) has been proposed and established as a standard candidate method.

By applying the ROUTE protocol, a fragmented MP4 (fragmented MP4) file sequence of the DASH standard, MPD (Media Presentation Description) which is a control information (signaling data) storage metafile of the DASH standard, USBD (User Service Bundle Description)/USD, S-TSID (Service based Transport Session Description) and so forth which are signaling data for broadcasting distribution can be transferred.

As described hereinabove, the ROUTE protocol is a protocol based on FLUTE. A metadata file that describes transfer control parameters in FLUTE is called FDT (File Delivery Table), and a metadata file that describes transfer control parameters in ROUTE is called S-TSID (Service based Transport Session Description). S-TSID is a superset of FDTs and includes FDTs.

USBD/USD, S-TSID, MPD and so forth proposed as signaling data (SLS: Service Layer Signaling) of the ATSC3.0 service layer are all transferred by a ROUTE session.

4. Example of Configuration and Example of Processing of Reception Apparatus

Now, an example of a configuration and an example of a process of the tuner-mounting reception apparatus (client A) 30 and the tuner-non-mounting reception apparatus (client B) 40 are described with reference to FIG. 5 and so forth.

The broadcasting server 21 transmits an AV segment including a broadcasting content or the like, signaling data and other data by broadcast transmission through a broadcasting wave or a network.

Figure 5:
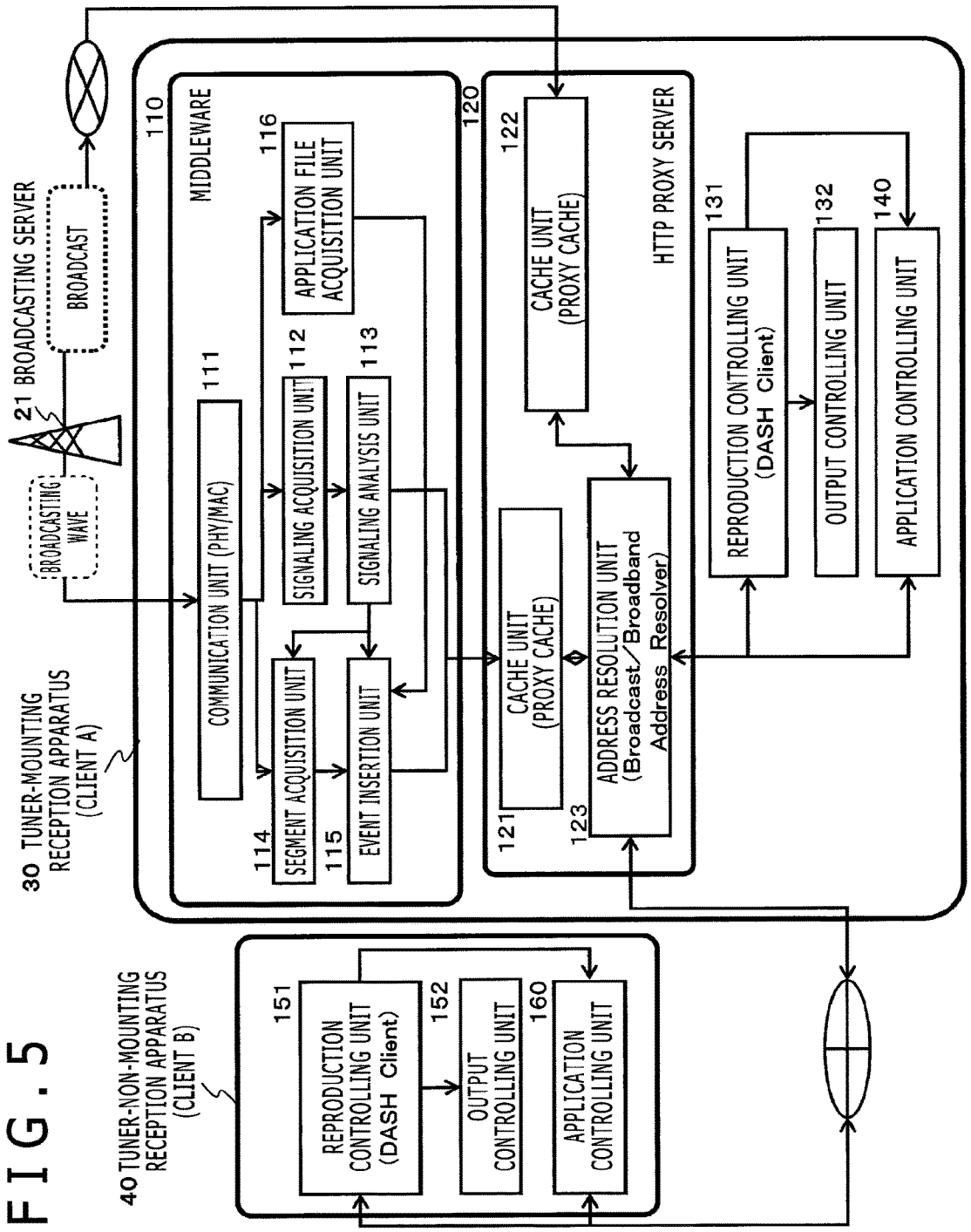
FIG. 5 is a view illustrating an example of a configuration of the reception apparatus.

Though not depicted in FIG. 5, also the data distribution server 22 that is a transmission apparatus other than the broadcasting server 21 transmits an AV segment including a broadcasting content or the like, signaling data and other data by broadcast transmission through a broadcasting wave or a network.

As depicted in FIG. 5, the tuner-mounting reception apparatus 30 includes middleware 110, an HTTP proxy server 120, a reproduction controlling unit (DASH client) 131, an output controlling unit 132 and an application controlling unit 140.

The middleware 110 receives and analyzes provision data of the broadcasting server 21.

The middleware 110 includes a communication unit (PHY/MAC (Media Access Control)) 111, a signaling acquisition unit 112 for acquiring signaling data, a signaling analysis unit 113 for analyzing the signaling data, and a segment acquisition unit 114 for acquiring the signaling data, program content data of video, audio and so forth, a data file of an NRT content or the like such as an application or the like.

Further, the middleware 110 includes an event insertion unit 115 for executing a process for inserting event information, which includes notification information of change, details and so forth of a broadcasting program or transmission data, information relating to an application to be executed by a reception apparatus, information of a process necessitated in the reception apparatus and so forth, into a segment in which signaling data or AV data is stored.

The event information is information to be conveyed to a reception apparatus such as, for example, change of a program table, change of a data form of a broadcasting content, and a process to be executed upon reproduction of the broadcasting content in the reception apparatus, information for requesting execution of some process, and so forth.

The middleware 110 further includes an application file acquisition unit 116 for acquiring an application file in which various applications (application programs) for being executed by a reception apparatus are stored.

The applications are applications for performing various information display of, for example, weather information or news information to be displayed in an overlapping relation with a broadcasting program or player information in the case of a baseball live broadcast or the like.

As a particular example of the applications, for example, the following applications are available:
an application for displaying, where the broadcasting content is a content including a guide video of a tourist spot, map information, hotel information and so forth for being displayed in an overlapping relation with the broadcasting content;
an application for displaying, where the broadcasting content is a baseball live broadcast, grade information of each player regarding the batting average, the number of home runs and so forth; and
an application for displaying a quiz or a questionnaire to viewers and collecting answers from viewers utilizing bidirectional communication.

Besides them, various applications such as advertisement display provided according to users are available.

Data received by the middleware 110 is stored into a cache unit (proxy cache) 121 of the proxy server 120. The proxy server 120 further stores data acquired from the data distribution server 22 through a network into a cache unit (proxy cache) 122.

The proxy server 120 inputs a data request from an output controlling unit 132 to an address resolution unit 123 and acquires requested data from the cache unit (proxy cache) 121 or 122 or from the outside and then provides the requested data.

The reproduction controlling unit (DASH Client) 131 executes reproduction control of a content transmitted in accordance with the DASH (MPEG-DASH) standard.

As described hereinabove, the MPEG-DASH standard includes the following two standards:
(a) the standard relating to a manifest file (MPD: Media Presentation Description) for describing metadata that is management information of a video or audio file; and
(b) the standard relating to a file format (segment format) for video content transmission.

Content distribution from the transmission apparatus 20 to the tuner-mounting reception apparatus 30 is executed in accordance with the MPEG-DASH standard described above.

A content is transmitted as a segment that is divisional data of a predetermined unit, for example, in accordance with the MP4 file format prescribed in MPEG, and the reproduction controlling unit (DASH Client) 131 refers to a manifest file (MPD) and executes a process for acquiring a segment in which a reproduction target content is stored and so forth.

The output controlling unit 132 extracts an encoded content from a segment acquired by the reproduction controlling unit 131, decodes the encoded content and outputs the decoded content to an outputting unit such as a display unit.

The application controlling unit 140 executes acquisition of a weather forecast, a news, player information upon baseball live broadcasting, map information and hotel information in a travel program, and various applications for executing a quiz or questionnaire process and so forth and application control such as starting, ending or the like of an application.

Further, the tuner-non-mounting reception apparatus (client B) 40 depicted in FIG. 5 is coupled to the tuner-mounting reception apparatus (client A) 30 through a network such as, for example, the Ethernet (registered trademark) or Wi-Fi and executes communication with the tuner-mounting reception apparatus (client A) 30.

The tuner-non-mounting reception apparatus (client B) 40 receives data of a content or the like received by the tuner-mounting reception apparatus (client A) 30 from the broadcasting server 21 or the data distribution server 22 through the tuner-mounting reception apparatus (client A) 30 and executes content reproduction.

The tuner-non-mounting reception apparatus (client B) 40 depicted in FIG. 5 includes
a reproduction controlling unit (DASH Client) 151,
an output controlling unit 152, and
an application controlling unit 160.

The components and functions just mentioned are similar to those of the reproduction controlling unit (DASH Client) 131, the output controlling unit 132 and the application controlling unit 140 described hereinabove in connection with the tuner-mounting reception apparatus (client A) 30.

Figure 6:
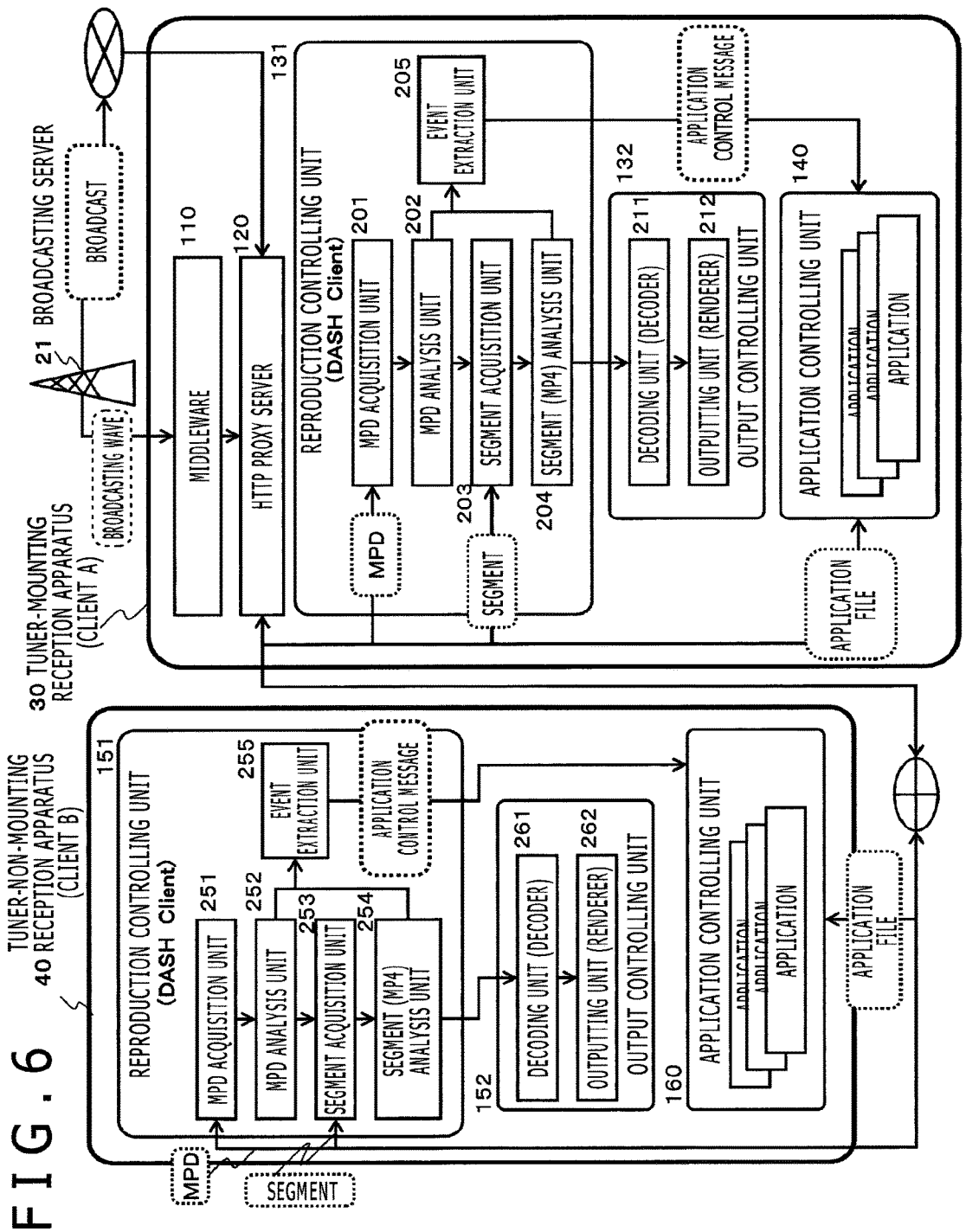
FIG. 6 is a view illustrating the example of the configuration of the reception apparatus.

FIG. 6 is a view depicting a detailed configuration of the reproduction controlling unit (DASH Client) 131 and the output controlling unit 132
which the tuner-mounting reception apparatus (client A) 30 has, and of
the reproduction controlling unit (DASH Client) 151 and the output controlling unit 152
which the tuner-non-mounting reception apparatus (client B) 40 has.

The reproduction controlling unit (DASH Client) 131 of the tuner-mounting reception apparatus (client A) 30 includes an MPD acquisition unit 201, an MPD analysis unit 202, a segment acquisition unit 203, a segment (MP4) analysis unit 204 and an event extraction unit 205.

The reproduction controlling unit (DASH Client) 131 executes reproduction control of a content transmitted in accordance with the DASH (MPEG-DASH) standard as described hereinabove.

The MPD acquisition unit 201 acquires a manifest file (MPD: Media Presentation Description) that is a management information description file of a video or audio file.

The MPD is provided from the broadcasting server 21 or the data distribution server 22 and is acquired by the reproduction controlling unit 131 after stored into the proxy server 120.

The MPD analysis unit 202 analyzes the description substance of the MPD received by the MPD acquisition unit 201 and provides information and so forth necessitated for acquisition of a segment corresponding to reproduction target data to the segment acquisition unit 203.

Further, when the MPD includes an application control message (ACM: Application Control Message), the MPD analysis unit 202 outputs the MPD to the event extraction unit 205.

The event extraction unit 205 outputs the application control message (ACM) recorded in the MPD to the application controlling unit 140.

Although various applications such as a display application of hotel guide information in a travel program, an application for a quiz or a questionnaire and so forth are available as applications as described hereinabove, those applications have no meaning if they are not executed at a determined timing in a particular broadcasting content. Accordingly, it is necessary for the application controlling unit 140 to perform control for acquisition of an application, execution of the application, ending of the application and so forth in accordance with timings prescribed in advance.

The information of the types described is recorded in the application control message (ACM: Application Control Message), and the application controlling unit 140 receives the application control message (ACM) through the event extraction unit 205 of the reproduction controlling unit 131.

The application control message (ACM) is recorded in an MPD as signaling data or in a segment, and if an application control message (ACM) is included in an MPD or a segment, then the reproduction controlling unit 131 executes a process for outputting the application control message (ACM) to the application controlling unit 140. This process is hereinafter described in detail.

The segment acquisition unit 203 performs acquisition of a segment corresponding to reproduction target data in accordance with an MPD analysis result of the MPD analysis unit 202.

A segment is predetermined unit data set in accordance with a file format (segment format) for content transmission including AV data.

The segment analysis unit 204 acquires encoded image data, encoded sound data and so forth from the segment acquired by the segment acquisition unit 203 and outputs the acquired data to the decoding unit (decoder) 211 of the output controlling unit 132.

Further, if a segment includes an application control message (ACM: Application Control Message), then the segment analysis unit 204 outputs the segment to the event extraction unit 205.

The event extraction unit 205 outputs the application control message (ACM) recorded in the segment to the application controlling unit 140.

Details of the process are hereinafter described.

The event extraction unit 205 executes extraction of event information stored in an MPD or a segment and outputs an application control message included in the extracted event information to the application controlling unit 140.

The application control message is control information relating to an application that is made a control target by the application controlling unit 140.

This application control message is stored as event information in an MPD or a segment.

It is to be noted that a particular configuration of this is hereinafter described.

The output controlling unit 132 of the tuner-mounting reception apparatus (client A) 30 includes the decoding unit (decoder) 211 and an outputting unit (renderer) 212. The decoding unit (decoder) 211 executes a decoding process (decoding) of encoded image data and encoded sound data provided from the segment analysis unit 204. The outputting unit 212 outputs the decoded image data and sound data to an outputting unit (display unit, speaker).

It is to be noted that the reproduction controlling unit (DASH Client) 151 of the tuner-non-mounting reception apparatus (client B) 40 includes an MPD acquisition unit 251, an MPD analysis unit 252, a segment acquisition unit 253, a segment (MP4) analysis unit 254, and an event extraction unit 255.

Further, the output controlling unit 152 includes a decoding unit (decoder) 261 and an outputting unit (renderer) 262.

The components and the processes to be executed are similar to those of the tuner-mounting reception apparatus (client A) 30.

It is to be noted that, to the reproduction controlling unit (DASH Client) 151 of the tuner-non-mounting reception apparatus (client B) 40, an MPD and a segment are inputted through the proxy server 120 of the tuner-mounting reception apparatus (client A) 30 and the network.

Meanwhile, to the application controlling unit 160 of the tuner-non-mounting reception apparatus (client B) 40, an application file is inputted through the proxy server 120 of the tuner-mounting reception apparatus (client A) 30 and the network.

The reproduction controlling units (DASH Client) 131 and 151 of the tuner-mounting reception apparatus (client A) 30 and the tuner-non-mounting reception apparatus (client B) 40 are execution units of an ATSC3.0 client application (3.0 DASH Client).

The ATSC3.0 client application is executed on a browser incorporated in an ATSC3.0 broadcasting reception client device. Alternatively, the ATSC3.0 client application is sometimes executed not only as a browser application but also as a native application.

The ATSC3.0 client application executed by the reproduction controlling units (DASH Client) 131 and 151 includes an ATSC3.0 DASH client application (3.0 DASH Client), an ATSC3.0 stream accompanying application (3.0 Application) and so forth.

The ATSC3.0 client application of the reproduction controlling units (DASH Client) 131 and 151 and the output controlling units 132 and 152 execute processing of data received by the middleware (Client Local ATSC Middleware) 110 and data received by the proxy server (Client Local HTTP Proxy Server) 120 through the network.

DASH-MPD files or DASH segment (segment) files, other general application files and SLS (Service level Signaling) files, in which signaling data are stored, acquired by the middleware 110 or the proxy server 120 are inputted to perform rendering of a stream or control of an application.

According to this model, as viewed from the ATSC3.0 client application executed by the reproduction controlling units (DASH Client) 131 and 151 or an application executed by the application controlling unit 160, since the outside world is accessed through the proxy server 120 without fail, the application is not conscious of the distinction regarding whether the file groups are acquired through a broadcast or through a network (network transparency is provided), and therefore, it is possible to increase the portability of the application.

Accordingly, it is not necessary to incorporate an application so as to be specialized only for broadcasting, and the application can be incorporated such that it is free from selective use of a broadcast and the Internet.

If the ATSC3.0 client application executed by the reproduction controlling units (DASH Client) 131 and 151 requests (HTTP request) acquisition of a DASH-MPD file, a DASH segment (segment) file, some other general application file or a signaling data file, then the proxy server 120 receives the request and performs determination of whether the address resolution unit (Broadcast/Broadband Address Resolver) 123 is to acquire the requested file through the broadcast reception stack or to acquire the requested file through a network.

The information that becomes a determination material is provided from the signaling analysis unit (SLS Signaling Parser) 113. The signaling analysis unit (SLS Signaling Parser) 113 issues an acquisition request for USBD/USD, S-TSID and so forth that are signaling meta of ATSC3.0 to the signaling acquisition unit (SLS Signaling Retriever) 112.

The signaling acquisition unit (SLS Signaling Retriever) 112 extracts signaling meta carried by an SLS LCT packet, which is broadcasting-received through the communication unit (ATSC tuner: ATSC3.0 PHY/MAC) 111.

The signaling analysis unit (SLS Signaling Parser) 113 extracts signaling meta from a url included in an acquisition request for an application part and resolves broadcast distribution address information for acquiring a file that becomes a target. If it is recognized that the target file is to be (has been) broadcast-distributed, then the signaling analysis unit 113 acquires, on the basis of the broadcast-distributed address information, an LCT packet in which a desired file is stored from a broadcasting stream and deploys the acquired LCT packet into the cache (Proxy Cache) units 121 and 122. The proxy server 120 returns the file (as an HTTP response) to the reproduction controlling unit 131 or the application controlling unit 140. If the url included in the acquisition request for an application part is not included in the signaling meta, then the proxy server 120 acquires the file through an ordinary net stack.

5. Transfer Process of Application Control Message

As described hereinabove, in the ATSC3.0 currently under development, a model in which the middleware (ATSC3.0 broadcasting reception middleware) 110 is incorporated in the tuner-mounting reception apparatus 30 in which the ATSC3.0 compliant physical layer (ATSC-PHY) is incorporated to analyze signaling data (ATSC broadcasting signaling) is being investigated.

In particular, a model is being investigated in which the middleware 110 is set such that it is a terminal device that can perform an immediate analysis process at a reception timing of signaling data and does not give rise to an immediate analysis load for signaling data to a reproduction controlling unit (DASH client). By this setting, it is possible to utilize a DASH client application utilized on the Internet as it is to implement reception and reproduction of an ATSC broadcast.

This model makes also it possible to transfer a broadcasting content or a network reception content received by the tuner-mounting reception apparatus 30 to the tuner-non-mounting reception apparatus 40 such that content reproduction is performed by processing of an ATSC3.0 DASH client application executed by the reproduction controlling unit 151 of the tuner-non-mounting reception apparatus 40.

The tuner-mounting reception apparatus 30 is, for example, a relay server installed in a common space (at a hot spot), a home server installed in a home, a PC or the like and is a reception apparatus in which a tuner that can receive a broadcasting wave is incorporated. Reception data of the tuner-mounting reception apparatus 30 is transferred to the tuner-non-mounting reception apparatus 40 through a network (in a home, through a home network (LAN/Wi-Fi or the like), at a hot spot, through Wi-Fi or the like).

The tuner-non-mounting reception apparatus 40 executes the ATSC3.0 DASH client application in the reproduction controlling unit 151 to perform content reproduction.

In the configuration of the present disclosure, processing such as analysis of signaling data provided by an ATSC3.0 broadcasting service is executed by the middleware 110 of the tuner-mounting reception apparatus (client A) 30.

If the signaling information includes an application control message (ACM), then the tuner-mounting reception apparatus (client A) 30 provides the application control message (ACM) as quickly as possible at the reception timing to the reception apparatus that utilizes the same.

The application control message (ACM) whose notification is required particularly is an application control message (ATSC-Trigger, HbbTV-AIT (Hybrid Broadcast Broadband TV-Application Information Table) or the like) to an AV stream accompanying application that is controlled in synchronism with a broadcasting AV stream and so forth.

Especially, where message notification synchronized as far as possible with a stream is required, it is requested to output an application control message (ACM) rapidly to the application controlling unit 140 or 160 of each of the reception apparatus 30 and 40.

Usually, the reproduction controlling units (DASH Client) 131 and 151 are incorporated such that they successively execute acquisition of a segment (DASH segment), which includes a content having AV data of an image, sound and so forth, by HTTP. If streaming reproduction is started once, then the reproduction controlling units (DASH Client) 131 and 151 continuously perform an HTTP acquisition/reproduction process.

A server that provides a segment (DASH segment such as an AV segment) is called DASH server.

The DASH server particularly is the broadcasting server 21 or the data distribution server 22.

Further, also the proxy server 120 of the tuner-mounting reception apparatus (client A) 30 is a DASH server.

The reproduction controlling units 131 and 151 of the tuner-mounting reception apparatus 30 and the tuner-non-mounting reception apparatus 40 continuously perform segment acquisition utilizing a Pull type communication session, which is normally coupled to a DASH server, and execute content reproduction of a broadcasting program or the like.

If, during this segment acquisition session, an application control message relating to an application to be controlled by the application controlling unit 140 (for example, an application for executing display of weather information or news information, a quiz or questionnaire process or the like) arrives, then it is necessary to immediately notify the application controlling unit 140 of the event notification or the application control message itself.

The configuration of the present disclosure proposes a configuration that expands the event (Event) notification mechanism prescribed in DASH, extracts the application control message and outputs the application control message to the application controlling unit.

In the process of the present disclosure, it is possible to insert an application control message acquired by the middleware (ATSC3.0 broadcast reception middleware) 110, for example, into a stream session.

Accordingly, also to the tuner-non-mounting reception apparatus (client B) 40 that does not include, for example, the communication unit 111 or the middleware 110, an application control message can be transferred in synchronism with a stream.

The tuner-non-mounting reception apparatus (client B) 40 connected through a network (in a home, through a home network (LAN/Wi-Fi or the like), at a hot spot, through Wi-Fi or the like) to the tuner-mounting reception apparatus (client A) 30, which has the communication unit 111 and the middleware 110 incorporated therein, can receive an application control message in synchronism with a stream and execute timely application control without opening a different new application messaging session of an AV segment transfer session.

6. Event Notification Configuration

Now, the event notification configuration prescribed in the DASH standard is described.

In the DASH standard, an event notification mechanism called DASH event (DASH Event) is defined.

The event notification mechanism is a mechanism for performing notification of various kinds of event information such as, for example, notification information of change, details or the like of a broadcasting program or transmission data, information regarding an application to be executed in the reception apparatus, information to be conveyed to the reception apparatus or information of a process to be necessitated by the reception apparatus.

In the DASH standard, as the event notification mechanism, the following two different event notification methods are prescribed:

(a) MPD application event notification method (=MPD Event); and
(b) segment application event notification method (=In-band Event Signaling).

The two different event notification methods above are prescribed.

In the following, details of the two event notification methods are successively described.

6-1. MPD Application Event Notification Method (=MPD Event)

The MPD application event notification method (=MPD Event) is a method of notifying of an event utilizing an MPD (Media Presentation Description), which is one piece of signaling data prescribed in the DASH standard.

The MPD application event notification method (=MPD Event) can add an event factor, in particular, such a factor as an event type, an event stream (EventStream) indicative of the event substance or the like in a unit of a period (Period) that can be defined in the MPD.

According to the MPD application event notification method (=MPD Event), information necessary for event processing can be provided to the client in a unit of a period (Period) utilizing an MPD.

In particular, in the MPD application event notification method (=MPD Event), (a) an event schedule such as an activate (start/execution/activation) timing of various events,
(b) an event process to be processed by a client (reception apparatus) at each timing, and
(c) data and so forth to be passed to an application that operates on a client upon event execution can be described in the MPD.

Figure 7:
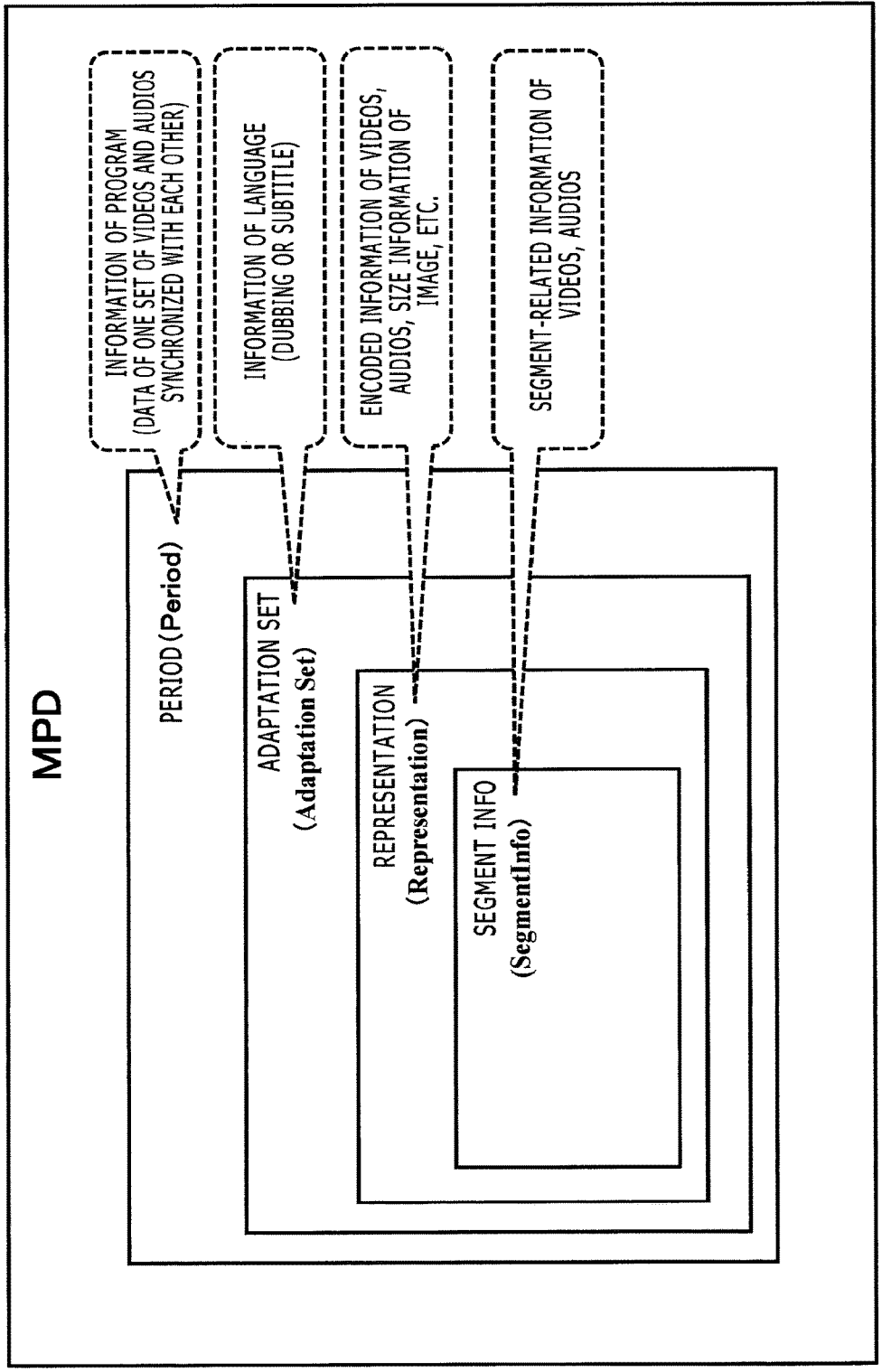
FIG. 7 is a view illustrating an example of a configuration of an MPD.

FIG. 7 is a view illustrating a format of the MPD.

The MPD has a configuration capable of describing information of an attribute or the like and control information in a unit of each of the following specified ranges for each of streams of images and sound:

(1) a period that prescribes an interval on the time axis (Period);
(2) an adaptation that prescribes a data type or the like such as an image or sound (Adaptation);
(3) a representation that prescribes a type of an image, a type of sound or the like (Representation); and
(4) segment info that becomes an information recording region in a unit of a segment (AV segment) of an image or sound (SegmentInfo).

Figure 8:
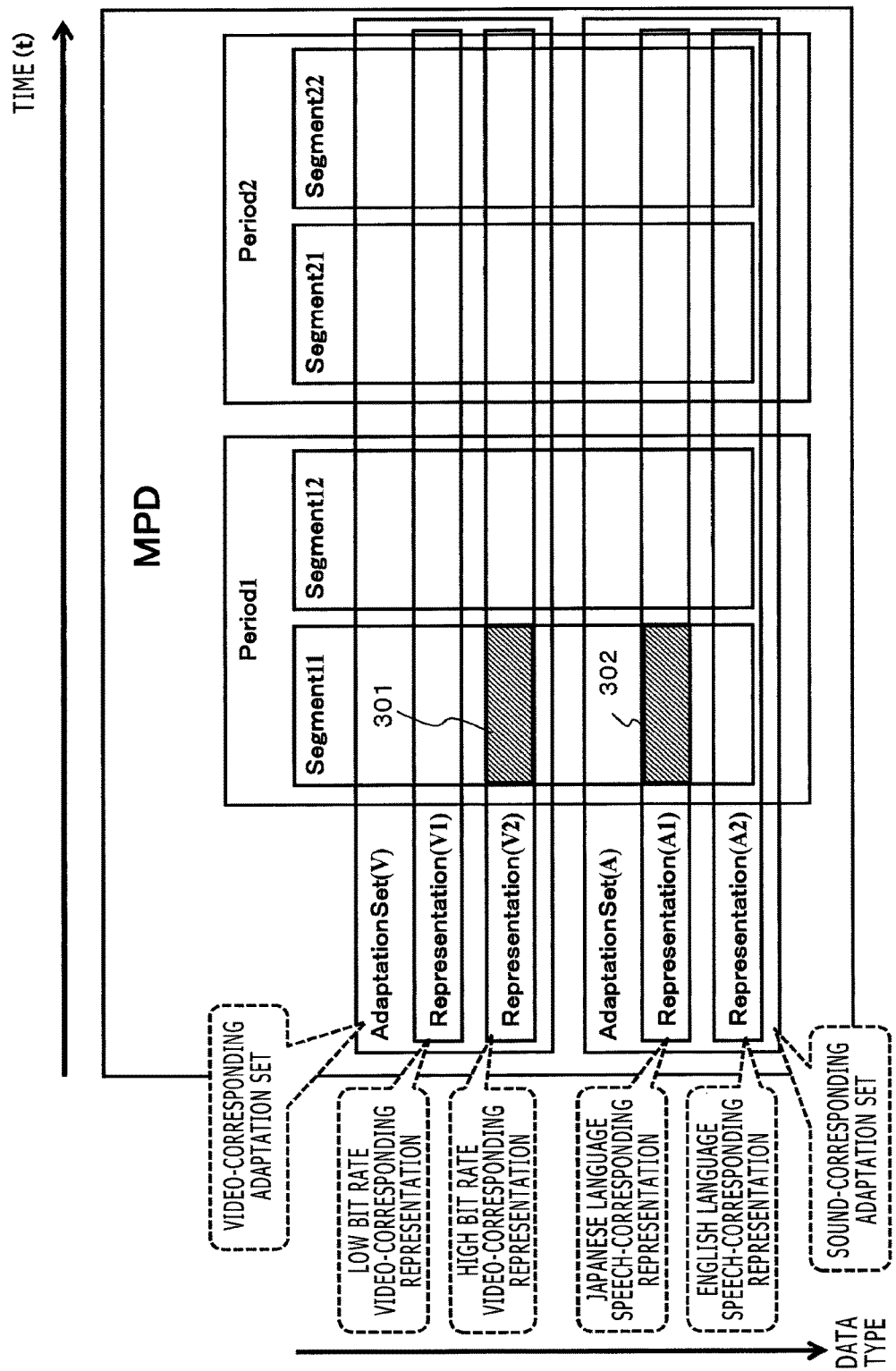
FIG. 8 is a view illustrating the example of the configuration of the MPD.

FIG. 8 is a view illustrating information, which is ready for an AV segment to be recorded into an MPD (control information, management information, attribute information and so forth), expanded in a time series.

It is assumed that the time passes from the left to the right. This time axis corresponds to a reproduction time period, for example, of an AV content in a reception apparatus.

Various kinds of information corresponding to an AV segment are recorded into an MPD. It is to be noted that the MPD is part of signaling data and is transmitted, for example, precedently to an AV segment.

Into the MPD, information can be recorded in units of data given below as described hereinabove with reference to FIG. 7:

(1) a period that prescribes an interval on the time axis (Period);
(2) an adaptation that prescribes a data type or the like such as an image or sound (Adaptation);
(3) a representation that prescribes a type of an image, a type of sound or the like (Representation); and
(4) segment info that becomes an information recording region in a unit of a segment (AV segment) of an image or sound (SegmentInfo).

FIG. 8 is a view depicting the data regions in a developed state on a time axis for individual data types.

In FIG. 8, the following two adaptations (Adaptation) are depicted:

(V) adaptation V that is an image-corresponding information recording region (Adaptation (V)); and
(A) adaptation A that is a sound-corresponding information recording region (Adaptation (A)).

(V) The adaptation V that is an image-corresponding information recording region (Adaptation (V)) has, as information recording regions in units of a stream having attributes different from each other, the following two representations (Representation):

(V1) representation (V1) that is an information recording region corresponding to a low bit rate image (Representation (V1)); and
(V2) representation (V2) that is an information recording region corresponding to a high bit rate image (Representation (V2)).

Similarly, (A) The adaptation A that is a sound-corresponding information recording region (Adaptation (A)) has, as information recording regions in units of a stream having attributes different from each other, the following two representations (Representation):

(A1) representation (A1) that is an information recording region ready for Japanese language speech (Representation (A1)); and
(A2) representation (A2) that is an information recording region ready for English language speech (Representation (A2)).

Further, each representation (Representation) is configured such that a period ready for a reproduction time axis and information in a unit of a segment can be recorded.

For example, a reception apparatus (client) that selects a high bit rate image and Japanese language speech to perform reproduction will select, upon reproduction of a segment (11) of period 1, information regarding a high bit rate image and Japanese language speech of a reproduction target and acquire the information from the MPD.

The recording information of the MPD of the selection target is information in segment regions 301 and 302 depicted in FIG. 8.

In this manner, the reception apparatus selects and refers to only information corresponding to data (segment), which is made a reproduction target by the own apparatus, from an MPD transmitted as signaling data from the transmission apparatus.

In this manner, into the MPD, a data type and segment-ready information of a unit of time can be recorded.

For example, also an event notification for notifying of various processing requests of a reception apparatus (client) can be recorded into the MPD.

Figure 9:
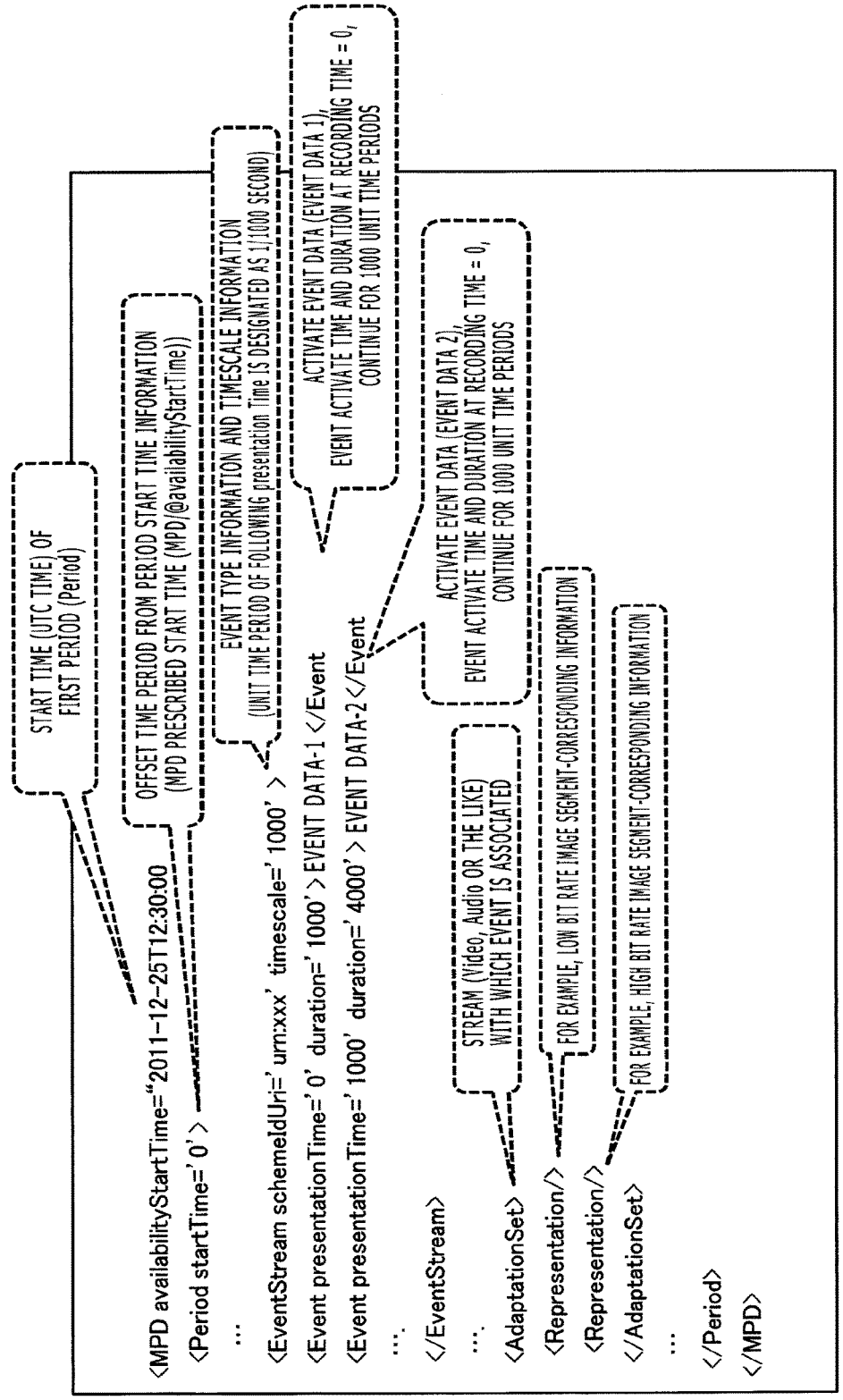
FIG. 9 is a view illustrating an example of a configuration of an event notification MPD.

FIG. 9 is a view illustrating an example of a description of an MPD where an event notification in which an MPD is used, namely, an MPD application event notification method (=MPD Event), is applied.

An MPD that includes event information has, for example, the following description.

```
<MPD availabilityStartTime="2011-12-25T12:30:00
<Period startTime='0'>
    ...
    <EventStream schemeIdUri='urn:xxx' timescale='1000'>
    <Event presentationTime='0' duration='1000'>event data 1
</Event>
    <Event presentationTime='1000' duration='4000'>event
data 2</Event>
    ....
    </EventStream>
    ...
    <AdaptationSet>
        <Representation/>
        <Representation/>
    </AdaptationSet>
    ...
</Period>
</MPD>
```

The substance of the data in the MPD mentioned above is described.

<MPD availabilityStartTime="2011-12-25T12:30:00

This data record recording region is a recording region for start time information of the first period corresponding to the data recorded in this MPD. As the time information, for example, the UTC time (Coordinated Universal Time) is used.

<Period startTime='1'>

This data record recording region is a period start time information recording region. An offset time period from start time (MPD/@availabilityStartTime) prescribed in the MPD is recorded.

<EventStream schemeIdUri='urn:xxx' timescale='1000'>

This data record recording region is a recording region of event stream designation information indicative of an event type or the like and timescale information.

By "EventStream schemeIdUri='urn:xxx'" and optional "EventStream/@value," a type and so forth of an event are defined.

Further, "timescale='1000'" indicates that the unit time period of presentation time (presentationTime) recorded below is 1/1000 second.

<Event presentationTime='0' duration='1000'>event data 1</Event>

This data record recording region is a recording region of event data and a recording region of event scheduling data such as activate (execution start and so forth) time, duration and so forth of the event.

The event data includes actual data, metadata, data of commands and so forth, access information to the data and so forth that are necessary for executing the event. Further, activate (execution start and so forth) time and a duration of the event are recorded.

This example designates that an event specified by event data 1 is to be continued for 1000 unit time periods at the activate (activation/execution) time=0.

<Event presentationTime='1000' duration='4000'>event data 2</Event>

This data record recording region is also a recording region of event data and a recording region of event scheduling data such as activate (execution start and so forth) time, duration and so forth of the event.

The event data includes actual data, metadata, data of commands and so forth, access information to the data and so forth that are necessary for executing the event. Further, activate (execution start and so forth) time and a duration of the event are recorded.

This example designates that an event specified by event data 2 is to be continued for 4000 unit time periods at the activate (activation/execution) time=1000.

The following data record recording regions

```
<AdaptationSet>
    <Representation/>
    <Representation/>
``` are data recording regions for recording information of the individual data types.

In this manner, in the event notification in which an MPD is used, namely, in the MPD application event notification method (MPD Event), a type of an event is defined by the EventStream/@schemeIdUri (and optional EventStream/@value) attribute, and event data, namely, actual data, metadata, data of commands and so forth, access information to the data and so forth that are necessary for executing the event, can be added to the content part of the EventStream/Event factor.

It is to be noted, a format (what is to be stored) of the "event data" to be stored as a data element beginning with MPD/Period/EventStream/Event is specified (defined) by a value of the "EventStream/@schemeIdUri" attribute (in the example of FIG. 9, (urn:xxx)).

It is to be noted that this MPD application event notification method (MPD Event) can be applied only where the substance of a period prescribed in the MPD can be finally determined before the MPD is sent out.

Figure 10:
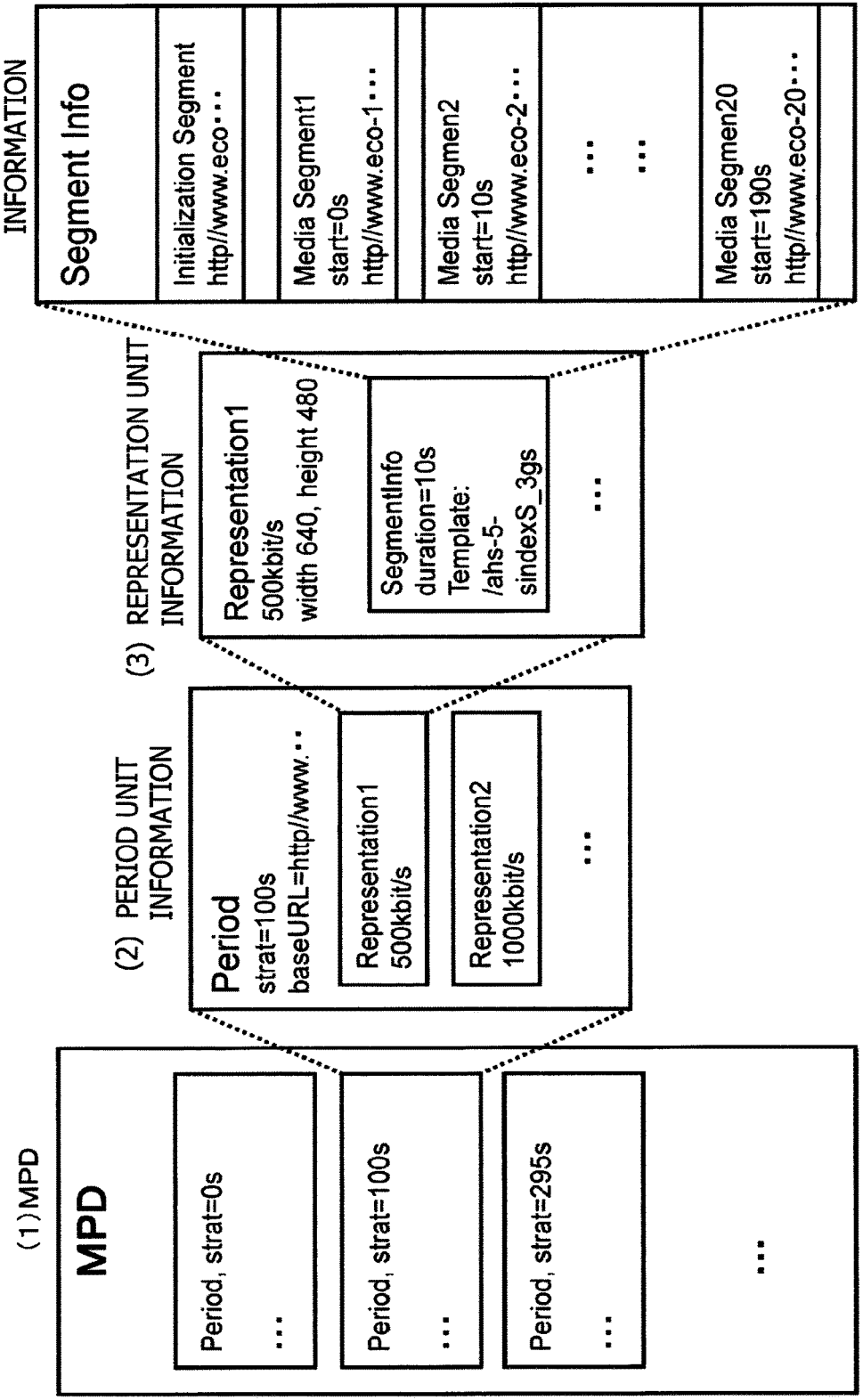
FIG. 10 is a view illustrating an example of a utilization sequence of the MPD.

FIG. 10 is a view illustrating a procedure of an analysis process (parse) of an MPD executed by a reception apparatus.

In FIG. 10, the following figures are depicted:

(1) MPD;
(2) period unit information;
(3) representation unit information; and
(4) segment unit information.

A reception apparatus (client) that receives an AV segment and executes a reproduction process of an AV content acquires an MPD included in signaling data that is received in advance before reception of the AV segment and acquires information corresponding to data to be reproduced by the own apparatus from the MPD.

First, the reception apparatus (client) selects, from (1) an MPD depicted in FIG. 10, (2) the period unit information in which information of a particular period corresponding to an AV segment reproduction time period is recorded.

Further, the reception apparatus (client) selects the representation unit information corresponding to a type of data to be reproduced by the own apparatus (client) and further selects (4) the segment unit information corresponding to the reproduction target segment.

The reception apparatus (client) can refer to data recorded in (4) the segment unit information to acquire an AV segment that becomes a reproduction target or acquire various kinds of information necessary for AV segment reproduction.

If event information is recorded in the segment unit information of the received MPD, then the reception apparatus (client) performs activation (event activation process such as execution, start or the like) and the like of a designated event in accordance with the recorded event information.

A configuration and an example of a process of an event insertion execution apparatus 310 that executes production (or acquisition) and outputting of an MPD in which event information is recorded and an event execution apparatus 320 that receives an event recording MPD and executes a process according to the MPD-record event information are described with reference to FIG. 11.

Figure 11:
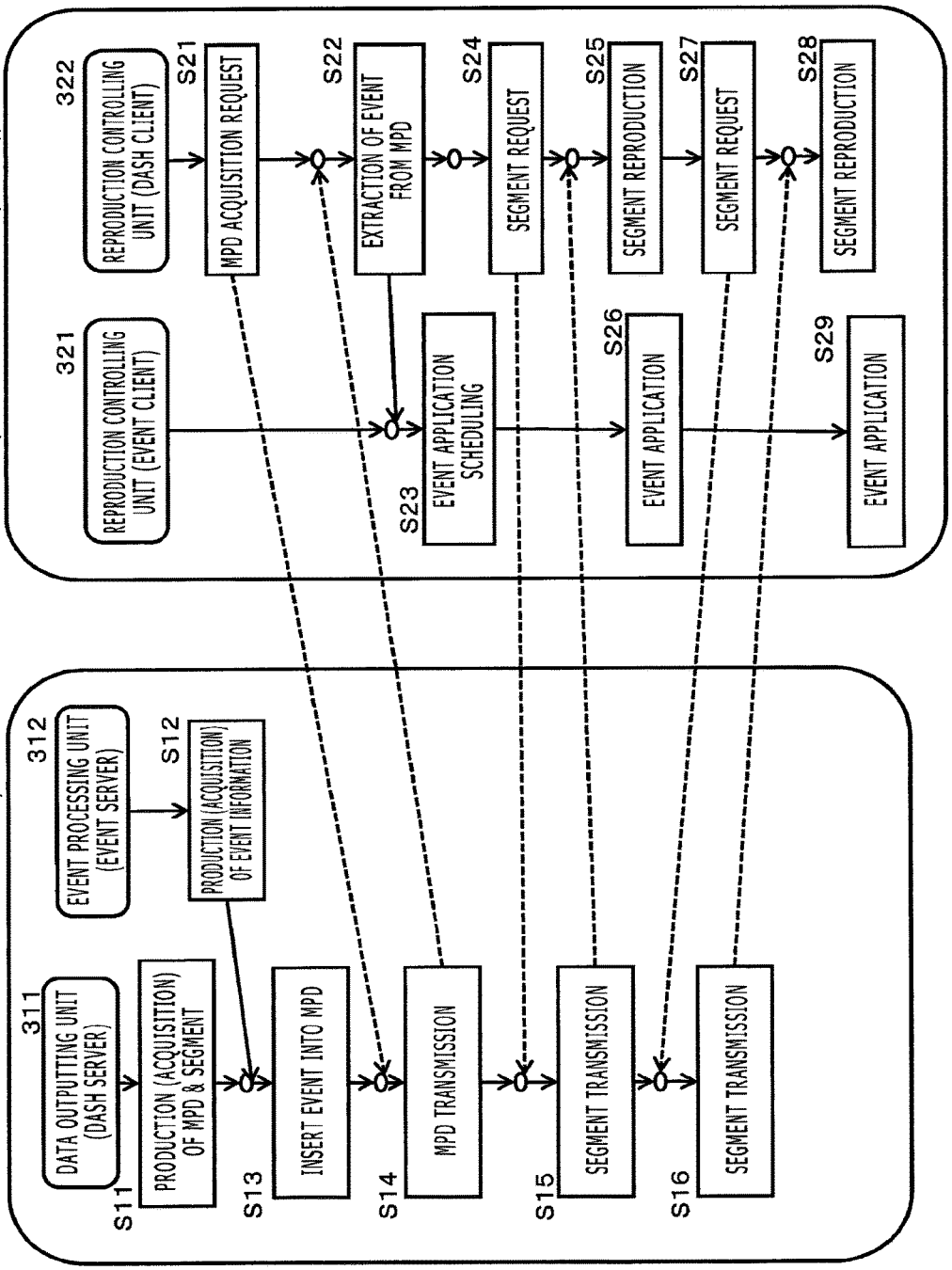
FIG. 11 is a view illustrating a production, transmission and utilization sequence of event information.

In FIG. 11, the event insertion execution apparatus 310 that executes production (or acquisition) and outputting of an MPD in which event information is recorded is depicted at the left side.

Further, at the right side in FIG. 11, the event execution apparatus 320 that receives an MPD, in which event information is recorded, inputted thereto and executes a process (event activate) according to the event information recorded in the MPD is depicted.

The event insertion execution apparatus 310 particularly is the broadcasting server 21 or the data distribution server 22 that transmits signaling data such as an MPD or an AV segment, or middleware 110 (middleware 110 depicted in FIGS. 5 and 6) of a reception apparatus that receives signaling data such as an MPD or an AV segment in the reception apparatus and outputs the received signaling data or AV segment to the reproduction controlling unit 131 of the reception apparatus.

The event execution apparatus 320 depicted at the right side in FIG. 11 particularly is a reproduction controlling unit (reproduction controlling units 131 and 151 depicted in FIGS. 5 and 6) of a reception apparatus that receives signaling data such as an MPD or an AV segment as an input thereto and executes a content reproduction process.

A process executed by the event insertion execution apparatus 310 is described.

The event insertion execution apparatus 310 includes a data outputting unit (DASH server) 311 and an event processing unit (event server 312).

It is to be noted that these server functions are functions provided by the broadcasting server 21 and the data distribution server 22 that transmits signaling data of an MPD or the like or an AV segment, and middleware 110 of the reception apparatus (middleware 110 depicted in FIGS. 5 and 6).

In the following, a process executed by the event insertion execution apparatus 310 is described for every processing step.

(Step S11)

First at step S11, the data outputting unit (DASH server) 311 of the event insertion execution apparatus 310 produces or acquires an MPD as signaling data and a segment that includes AV data that configures a reproduction content.

Where the event insertion execution apparatus 310 is the broadcasting server 21 or the data distribution server 22, it performs a process for producing or acquiring an MPD or a segment.

Where the event insertion execution apparatus 310 is the middleware 110 of a reception apparatus (middleware 110 depicted in FIGS. 5 and 6), it performs a process for acquiring an MPD or a segment from reception data.

(Step S12)

Then, at step S12, the event processing unit (event server) 312 of the event insertion execution apparatus 310 procures or acquires event information.

The event information is information for the notification of or request for execution of some process to the reception apparatus such as, for example, change of a program table, change of a data form of a broadcasting content or a process to be executed upon reproduction of a broadcasting content in the reception apparatus.

Where the event insertion execution apparatus 310 is the broadcasting server 21 or the data distribution server 22, it performs a process for producing or acquiring event information.

Where the event insertion execution apparatus 310 is the middleware 110 of the reception apparatus (middleware 110 depicted in FIGS. 5 and 6), it performs a process for acquiring event information from the reception data.

(Step S13)

Then at step S13, the data outputting unit (DASH server) 311 of the event insertion execution apparatus 310 performs insertion of the event information into the MPD as signaling data.

By this process, an event information-recording MPD described hereinabove with reference to FIG. 9 is produced.

In the event information-recording MPD depicted in FIG. 9, a type and the substance of an event, an activate (activation) time of the event, duration information and so forth are recorded as described hereinabove.

It becomes possible for the reception apparatus to perform a process for activating (for example, executing) a designated event at a designated time and continuing the event for a designated duration in accordance with the event information recorded in the MPD or a like process.

(Step S14)

Then at step S14, the data outputting unit (DASH server) 311 of the event insertion execution apparatus 310 transmits (outputs) the event information-recording MPD in which the event information is recorded in the MPD as signaling data.

Where the event insertion execution apparatus 310 is the broadcasting server 21 or the data distribution server 22, it transmits the event information-recording MPD through a broadcasting wave or a network.

Where the event insertion execution apparatus 310 is the middleware 110 of the reception apparatus (middleware 110 depicted in FIGS. 5 and 6), it outputs the event information-recording MPD to a proxy server or the reproduction controlling unit.

(Steps S15 and S16)

Then at steps S15 and S16, the data outputting unit (DASH server) 311 of the event insertion execution apparatus 310 transmits (outputs) the segment in which an AV content and so forth are stored.

The segment transmission is executed continuously after step S16.

Where the event insertion execution apparatus 310 is the broadcasting server 21 or the data distribution server 22, it transmits the segment through a broadcasting wave or a network.

Where the event insertion execution apparatus 310 is the middleware 110 of the reception apparatus (middleware 110 depicted in FIGS. 5 and 6), it outputs the segment to a proxy server or the reproduction controlling unit.

Now, a process executed by the event execution apparatus 320 depicted at the right side in FIG. 11 is described. The event execution apparatus 320 particularly is a reproduction controlling unit (reproduction controlling unit 131 or 151 depicted in FIGS. 5 and 6) of a reception apparatus that receives signaling data such as an MPD or an AV segment as an input thereto and executes a content reproduction process.

The process executed by the event execution apparatus 320 and illustrated in FIG. 11 is a process executed by the reproduction controlling unit 131 or 151 of the reception apparatus.

It is to be noted that, in FIG. 11, the reproduction controlling unit is depicted such that it is separated in a unit of a process type according to a type of a process to be executed.

In particular, two processing units including a reproduction controlling unit (event client) 321 as an event-ready process execution unit and a reproduction controlling unit (DASH client) 322 that executes a content reproduction process to which an MPD or an AV segment is applied.
(Step S21)

First at step S21, the reproduction controlling unit (DASH client) 322 of the event execution apparatus 320 performs acquisition request for an MPD as signaling data to the event insertion execution apparatus 310.
(Step S22)

Then at step S22, the reproduction controlling unit (DASH client) 322 of the event execution apparatus 320 acquires event information from the MPD acquired from the event insertion execution apparatus 310.

It is to be noted that it is assumed that the MPD acquired here is event information-recording MPD, namely, the event information MPD depicted in FIG. 9.

In the event information-recording MPD, a type and the substance of an event, an activate (activation such as, for example, execution, stopping or the like) time, duration information and so forth are recorded.

The reception apparatus can perform a process for activating (for example, executing) a designated event at a designated time and continuing the event for a designated duration in accordance with event information recorded in the MPD or a like process.
(Step S23)

Then at step S23, the reproduction controlling unit (event client) 321 of the event execution apparatus 320 performs a scheduling process for event application in accordance with the event information acquired from the MPD.

As described hereinabove, in the event information-recording MPD, a type and the substance of an event, an activate (activation) time of the event, duration information and so forth are recorded, and the reproduction controlling unit (event client) 321 of the event execution apparatus 320 refers to the various types of information to perform a scheduling process for event execution.
(Step S24)

Then at step S24, the reproduction controlling unit (DASH client) 322 of the event execution apparatus 320 performs acquisition request for a segment to the event insertion execution apparatus 310.
(Step S25)

Then at step S25, the reproduction controlling unit (DASH client) 322 of the event execution apparatus 320 acquires an AV content and so forth from the segment acquired at step S24 and executes a reproduction process.
(Step S26)

Then at step S26, the reproduction controlling unit (event client) 321 of the event execution apparatus 320 performs an application process of the event scheduled in accordance with the event information acquired from the MPD, namely, an event activate (event execution, start or the like) process.
(Steps S27 to S29)

Processes at steps S27 to S29 are processes similar to those at steps S24 to S26.

The sequence of processes described above will be executed continuously.

In this manner, the reception apparatus (client) can execute various events in accordance with event information recorded in the MPD together with a process for receiving and reproducing an AV segment.

6-2. Segment Application Event Notification Method (=in-Band Event Signaling)

Now, the segment application event notification method (=In-band Event Signaling) that is the other event notification method prescribed in the DASH standard is described.

The segment application event notification method (=In-band Event Signaling) is a method of recording event information into a segment (DASH segment), in which an AV content and so forth are stored, and providing the segment to a reception apparatus.

The transmission apparatus 20 depicted in FIG. 1 encodes content data, produces a data file including the encoded data and metadata of the encoded data and transmits the data file as described hereinabove. The encoding process is performed in accordance, for example, with the MP4 file format prescribed in MPEG. It is to be noted that a file of encoded data when the transmission apparatus 20 produces a data file of the MP4 format is called "mdat," and metadata is called "moov," "moof" or the like.

Contents provided by the transmission apparatus 20 are various data such as, for example, music data, video data of movies, television programs, videos, photographs, documents, pictures and charts, games and software.

An example of a configuration of a DASH segment that can be utilized when content stream distribution is performed in compliance with the DASH standard is described with reference to FIG. 12. Dash segments are divided into two types including:
(a) an initialization segment (Initialization Segment); and
(b) a media segment (Media Segment) (=AV segment).
(a) The initialization segment (Initialization Segment) is a segment in which initialization data of setting information and so forth necessary for executing content reproduction such as setting or the like of the decoder in the tuner-mounting reception apparatus 30 is stored.
(b) The media segment (Media Segment) (=Av segment) is a segment in which an encoded content (AV content) that becomes a reproduction target is stored.

Figure 12:
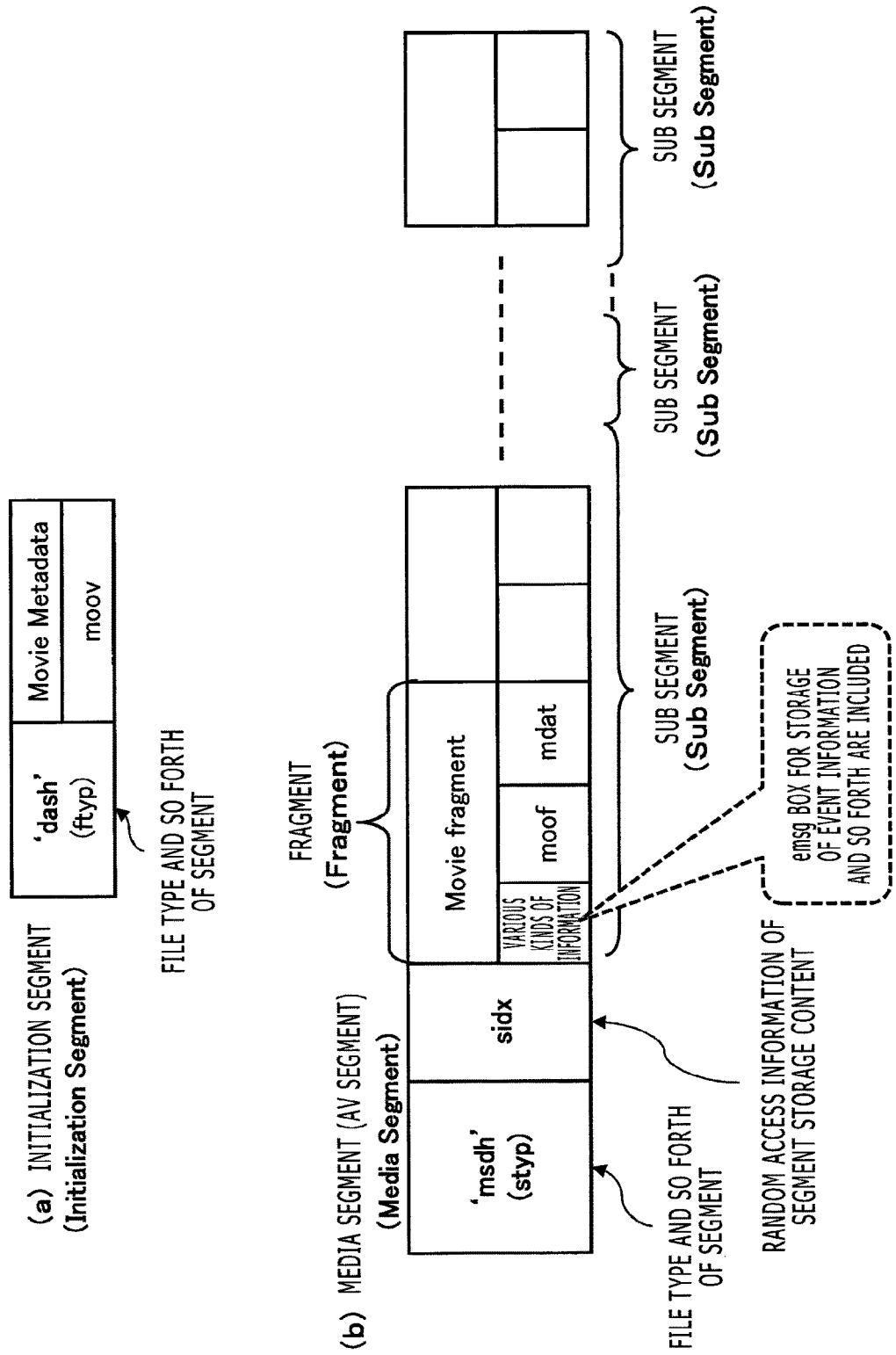
FIG. 12 is a view illustrating a configuration of a segment into which event information is to be stored.

As depicted in FIG. 12, (a) the initialization segment includes the following kinds of information:
(a1) header information (dash) including file type information and so forth of the segment; and
(a2) metadata (moov) including initialization information such as codec (encoding form) information and so forth of media data (mdat) that is an encoded content to be transmitted by a media segment.

Meanwhile, (b) the media segment includes the following kinds of information as depicted in FIG. 12:
(b1) header information (msdh) including file type information and so forth of the segment;
(b2) boundary information between a plurality of sub segments (Sub-Segment) stored in the media segment, and access information (sidx) indicative of a random access point of the media data (mdat) that is an encoded content stored in the media segment and so forth; and
(b3) a plurality of sub segments (Sub-Segment).

Further, a plurality of sub segments (Sub-Segment) include one or a plurality of fragments (Fragment) Each fragment (Fragment) includes the following various kinds of data:
media data (mdat) that is an encoded content that becomes a reproduction target;
metadata (moof) corresponding to the media data (mdat); and various kinds of information (control information, management information, attribute information and so forth) corresponding to the media data (mdat).

It is to be noted that media data (mdat), metadata (moof) and other various kinds of information (control information, management information, attribute information and so forth) are individually stored into boxes defined by the MP4 format.

Into the mdat box, AV data is stored.

Into the moof box, metadata is stored.

Also the other various kinds of information are stored into boxes defined in accordance with the respective kinds of information.

The event information is stored into an event information storage box (emsg box) defined in the MP4 format as a box for placing event information as part of the various kinds of information.

An example of a data configuration of the event information storage box (emsg) in the MP4 format data utilized in the segment application event notification method (=In-band Event Signaling) is described with reference to FIG. 13.

Figure 13:
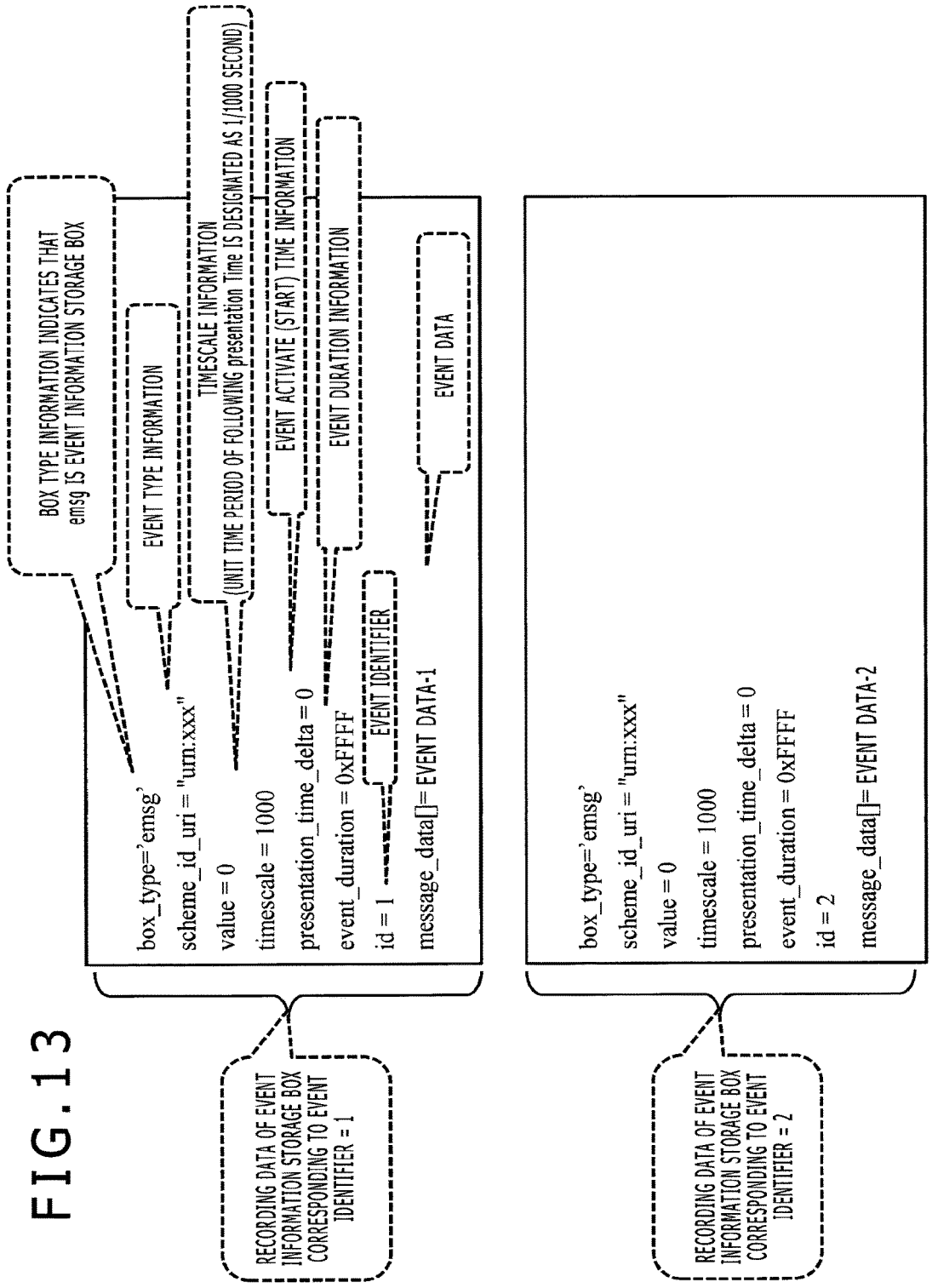
FIG. 13 is a view illustrating an example of a data configuration in a segment in which event information is stored.

FIG. 13 illustrates data of two event information storage boxes (emsg) in which two kinds of event information of event identifiers 1 and 2 are stored individually.

The event information storage box (emsg) has, for example, the following description.

box_type='emsg'
scheme_id_uri="urn:xxx"
value=0
timescale=1000
presentation_time_delta=0
event_duration=0xFFFF
id=1
message_data[ ]=event data-1

The data substance of the event information storage box (emsg) described above is described.

box_type='emsg'

This data record recording region is a box type recording region. It is described that this box (data storage box prescribed by the MP4) is an event information storage box (emsg).

scheme_id_uri="urn:xxx"
value=0

The data record recording regions are recording regions of event designation information indicative of an event type and so forth.

"scheme_id_uri="urn:xxx"" and the optional "value" define a type or the like of an event.

timescale=1000

This data record recording region is a recording region of timescale information.

"timescale='1000'" indicates that the unit time period of the presentation time (presentationTime) recorded in the following is 1/1000 second.

presentation_time_delta=0
event_duration=0xFFFF

These data record recording regions are recording regions of event scheduling data such as an activate (execution start and so forth) time, a duration and so forth of an event. It is designated that an event specified by the event designation information continues till a time=0xFFFF after the activate (activation/execution) time=0 of the event. It is to be noted that 0xFFFF indicates that the end time is not defined and signifies that the event may or may not be continued till the end of reproduction of an AV content corresponding to the segment for which this event information storage box is set.

id=1

This data recording region is an event identification information recording region.

message_data[ ]=event data-1

This data recording region is a recording region for event data.

The event data includes actual data, metadata or data of a command necessary for execution of the event, access information to them and so forth.

In this manner, in the segment application event notification method (=In-band Event Signaling), it is possible to record event information into a segment stream (in-stream) and transfer the segment stream.

In the segment application event notification method (=In-band Event Signaling), a type of an event can be defined in the "scheme_id_uri" field and the optional "value" field.

Further, to the "message_data" field, event data, namely, actual data, metadata or data of a command necessary for execution of the event, access information to them and so forth can be added.

Now, a configuration and an example of a process of the event insertion execution apparatus 310 that executes production (or acquisition) and outputting of a segment in which event information is recorded and the event execution apparatus 320 that receives an event recording information segment and executes a process according to event information recorded in the segment are described with reference to FIG. 14.

Figure 14:
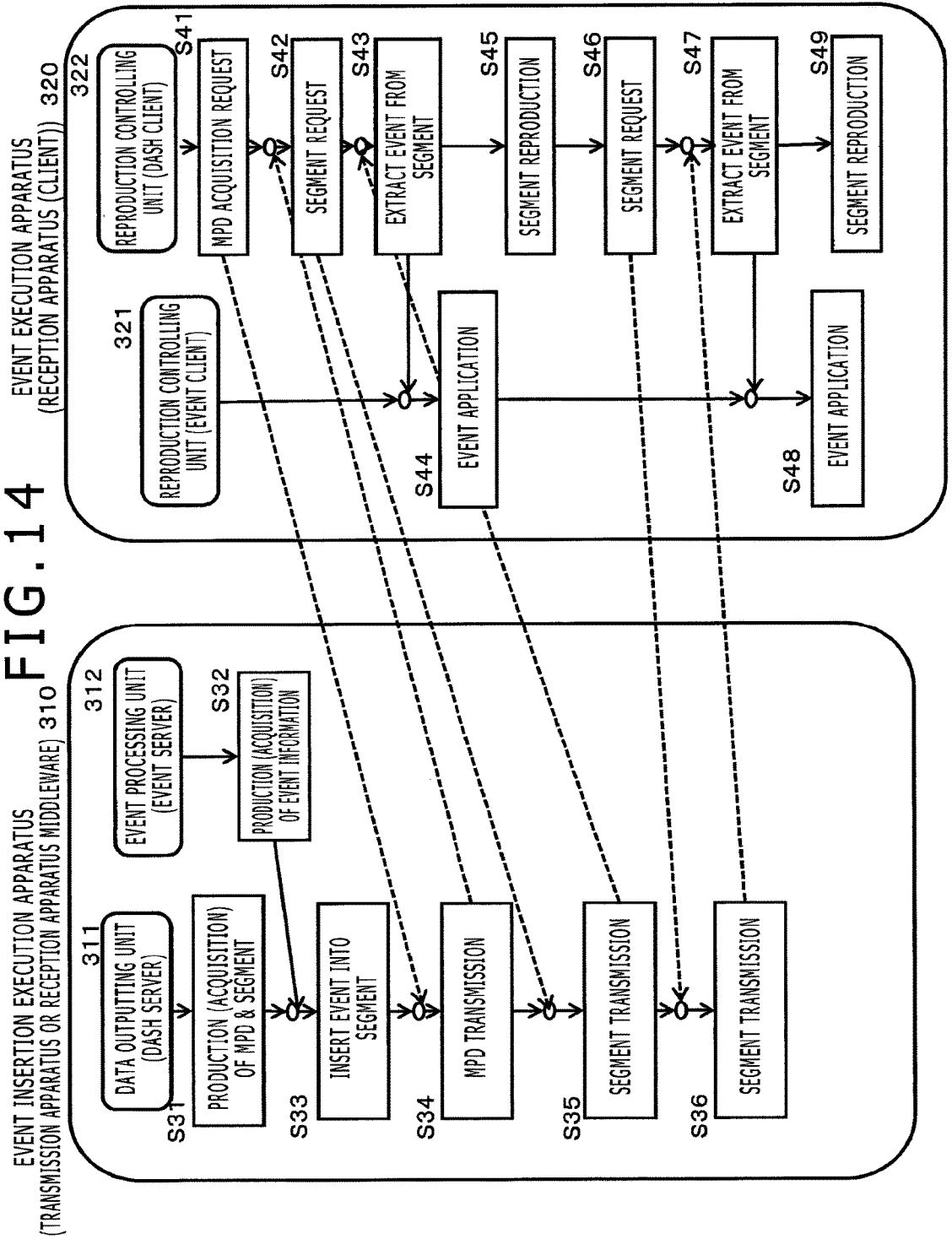
FIG. 14 is a view illustrating a production, transmission and utilization sequence of event information.

FIG. 14 depicts, at the left side therein, the event insertion execution apparatus 310 that executes production (or acquisition) and outputting of a segment in which event information is recorded.

Meanwhile, at the right side in FIG. 14, the event execution apparatus 320 is depicted which receives a segment in which event information is recorded as an input thereto and executes a process (event activate) according to event information recorded in the segment.

The event insertion execution apparatus 310 particularly is the broadcasting server 21 or the data distribution server 22 that transmits signaling data such as an MPD or an AV segment, or middleware 110 (middleware 110 depicted in FIGS. 5 and 6) of a reception apparatus that receives signaling data such as an MPD or an AV segment in the reception apparatus and outputs the received signaling data or AV segment to the reproduction controlling unit 131 of the reception apparatus.

The event execution apparatus 320 depicted at the right side in FIG. 14 particularly is a reproduction controlling unit (reproduction controlling units 131 and 151 depicted in FIGS. 5 and 6) of a reception apparatus that receives signaling data such as an MPD or an AV segment as an input thereto and executes a content reproduction process.

A process executed by the event insertion execution apparatus 310 is described.

The event insertion execution apparatus 310 includes the data outputting unit (DASH server) 311 and the event processing unit (event server 312).

It is to be noted that these server functions are functions provided by the broadcasting server 21 and the data distribution server 22 that transmits signaling data of an MPD or the like or an AV segment, and middleware 110 of the reception apparatus (middleware 110 depicted in FIGS. 5 and 6).

In the following, a process executed by the event insertion execution apparatus 310 is described for every processing step.

(Step S31)

First at step S31, the data outputting unit (DASH server) 311 of the event insertion execution apparatus 310 produces or acquires an MPD as signaling data and a segment that includes AV data that configures a reproduction content.

Where the event insertion execution apparatus 310 is the broadcasting server 21 or the data distribution server 22, it performs a process for producing or acquiring an MPD or a segment.

Where the event insertion execution apparatus 310 is the middleware 110 of a reception apparatus (middleware 110 depicted in FIGS. 5 and 6), it performs a process for acquiring an MPD or a segment from reception data.

(Step S32)

Then, at step S32, the event processing unit (event server) 312 of the event insertion execution apparatus 310 procures or acquires event information.

The event information is information for the notification of or request for execution of some process to the reception apparatus such as, for example, change of a program table, change of a data form of a broadcasting content or a process to be executed upon reproduction of a broadcasting content in the reception apparatus.

Where the event insertion execution apparatus 310 is the broadcasting server 21 or the data distribution server 22, it performs a process for producing or acquiring event information.

Where the event insertion execution apparatus 310 is the middleware 110 of the reception apparatus (middleware 110 depicted in FIGS. 5 and 6), it performs a process for acquiring event information from the reception data.

(Step S33)

Then at step S33, the data outputting unit (DASH server) 311 of the event insertion execution apparatus 310 performs insertion of the event information into the segment.

By this process, a segment that include an emsg box that is an event information recording box prescribed by the MP4 format described hereinabove with reference to FIG. 13 is produced.

In the event information-recording box (emsg) i depicted in FIG. 13, a type and the substance of an event, an activate (activation) time of the event, duration information and so forth are recorded as described hereinabove.

It becomes possible for the reception apparatus to perform a process for activating (for example, executing) a designated event at a designated time and continuing the event for a designated duration in accordance with the event information recorded in the emsg box in the segment or a like process.

(Step S34)

Then at step S34, the data outputting unit (DASH server) 311 of the event insertion execution apparatus 310 transmits (outputs) the MPD as signaling data.

Where the event insertion execution apparatus 310 is the broadcasting server 21 or the data distribution server 22, it transmits the MPD through a broadcasting wave or a network.

Where the event insertion execution apparatus 310 is the middleware 110 of the reception apparatus (middleware 110 depicted in FIGS. 5 and 6), it outputs the MPD to a proxy server or the reproduction controlling unit.

(Steps S35 and S36)

Then at steps S35 and S36, the data outputting unit (DASH server) 311 of the event insertion execution apparatus 310 transmits (outputs) the segment in which an AV content and so forth are stored.

The segment to be transmitted is a segment that includes the event information recording box (emsg) prescribed by the MP4 format.

The segment transmission is executed continuously after step S36.

Where the event insertion execution apparatus 310 is the broadcasting server 21 or the data distribution server 22, it transmits the segment through a broadcasting wave or a network.

Where the event insertion execution apparatus 310 is the middleware 110 of the reception apparatus (middleware 110 depicted in FIGS. 5 and 6), it outputs the segment to a proxy server or the reproduction controlling unit.

Now, a process executed by the event execution apparatus 320 depicted at the right side in FIG. 14 is described. The event execution apparatus 320 particularly is a reproduction controlling unit (reproduction controlling unit 131 or 151 depicted in FIGS. 5 and 6) of a reception apparatus that receives signaling data such as an MPD or an AV segment as an input thereto and executes a content reproduction process.

The process executed by the event execution apparatus 320 and illustrated in FIG. 14 is a process executed by the reproduction controlling unit 131 or 151 of the reception apparatus.

It is to be noted that, in FIG. 14, reproduction controlling units are depicted separately according to a type of a process to be executed. In particular, two processing units including a reproduction controlling unit (event client) 321 as an event-ready process execution unit and a reproduction controlling unit (DASH client) 322 that executes a content reproduction process to which an MPD or an AV segment is applied are depicted separately.

(Step S41)

First at step S41, the reproduction controlling unit (DASH client) 322 of the event execution apparatus 320 performs acquisition request for an MPD as signaling data to the event insertion execution apparatus 310.

(Step S42)

Then at step S42, the reproduction controlling unit (DASH client) 322 of the event execution apparatus 320 performs acquisition request for a segment to the event insertion execution apparatus 310.

(Step S43)

Then at step S43, the reproduction controlling unit (DASH client) 322 of the event execution apparatus 320 acquires event information from the segment acquired from the event insertion execution apparatus 310.

It is to be noted that the segment acquired here has an event information recording box (emsg). In particular, it is assumed that the segment is a segment (event information recording segment) including the event information recording box (emsg) in which the event information illustrated in FIG. 13 is recorded.

In the event information-recording segment, a type and the substance of an event, an activate (activation) time of the event, duration information and so forth are recorded.

The reception apparatus can perform a process for activating (for example, executing) a designated event at a designated time and continuing the event for a designated duration in accordance with event information recorded in the segment or a like process.

(Step S44)

Then at step S44, the reproduction controlling unit (event client) 321 of the event execution apparatus 320 performs an application process of the event scheduled in accordance with the event information acquired from the segment, namely, an event activate (event execution, start or the like) process.
(Step S45)

Then at step S45, the reproduction controlling unit (DASH client) 322 of the event execution apparatus 320 acquires an AV content and so forth from the segment acquired at step S42 and executes a reproduction process.
(Steps S46 to S49)

Processes at steps S46 to S49 are processes similar to those at steps S42 to S45.

The sequence of processes described above will be executed continuously as a process of a segment unit.

In this manner, the reception apparatus (client) can execute various events in accordance with event information recorded in the event information-recording box (emsg) in the segment together with a process for receiving and reproducing an AV segment.

7. Notification Process of Application Control Message

Now, a configuration for notifying of an application control message utilizing the event notification mechanisms described above is described.

7-1. Overview of Application Control Message Notification Configuration Utilizing Event Notification Mechanism The tuner-mounting reception apparatus (client A) 30 and the tuner-non-mounting reception apparatus (client B) 40 described hereinabove with reference to FIGS. 5 and 6 have the application controlling units 140 and 160, respectively.

The application controlling units 140 and 160 execute control of various applications to be executed together with a reproduction process, for example, of a broadcast content.

Although, as the application, various applications are available as described above such as, for example, a display application of hotel guide information in a travel program or an application for a quiz or a questionnaire, there is no meaning if they are not executed at determined timings in a specific broadcast content. Accordingly, it is necessary for the application controlling units 140 and 160 to perform control of acquisition of an application and execution and ending of the application in accordance with prescribed timings.

The application controlling units 140 and 160 perform various controls for an application such as acquisition (download), activation, ending, stopping, pause, visualization, invisualization or deletion of an application file.

In order to cause the application controlling units 140 and 160 to execute such various application controls as described above, it is necessary to notify the application controlling units 140 and 160 of the control substance and control timings.

This notification information is the application control message (ACM: Application Control Message) illustrated in FIG. 6.

The application control message (ACM) is recorded in an MPD as signaling data or a segment, and where an application control message (ACM) is included in an MPD or a segment, the reproduction controlling units 131 and 151 execute a process for outputting this to the application controlling units 140 and 160, respectively.

The application control message is transmitted and outputted utilizing the event notification mechanism described hereinabove. In the following, details of a notification configuration of the application control message utilizing this event notification mechanism are described.

As described hereinabove, in the DASH standard, as the event notification mechanism, the following two different event notification methods are prescribed:

(a) MPD application event notification method (=MPD Event); and
(b) segment application event notification method (=In-band Event Signaling).

The two different event notification methods described are prescribed.

A particular example of the data configuration where event notification is performed using (a) the MPD application event notification method (=MPD Event) is such as described hereinabove with reference to FIG. 9. A particular example of the data configuration where event notification is performed using (b) the segment application event notification method (=In-band Event Signaling) is such as described hereinabove with reference to FIG. 13.

Whichever one of the methods is used, into the event notification message, event type information is recorded as information for specifying a type of an event.

In the event information-recording MPD depicted in FIG. 9, a type of an event is defined by "EventStream schemeIdUri='urn:xxx'" and optional "EventStream/@value." Further, in the description of the event information storage box (emsg) in the segment depicted in FIG. 13, the data record recording region scheme_id_uri="urn:xxx"

is a recording region for the event designation information indicative of an event type or the like.

As one of such event types, an application control message (ACM: Application Control Message) is defined. In particular, an event type indicating that the type of an event to be notified of in the event notification executed using an MPD or a segment is the application control message (ACM: Application Control Message) is defined.

In particular, for example, schemeIdUri in schemeIdUri=urn:atsc:appControlMessage
is determined as an event type identifier indicative of the application control message (ACM).

It is to be noted that the identifier given above is an example, and various identifiers can be utilized if event information extracted from an MPD or a segment is data (character string or code) that can be decided by the reception apparatus that the event information is event information relating to an application control message (ACM).

Further, by any of the two different event notification methods described hereinabove with reference to FIGS. 9 and 13 and given below:
(a) an MPD application event notification method (=MPD Event); and
(b) a segment application event notification method (=In-band Event Signaling),
event data is stored.

The event data includes actual data, metadata, data of commands and so forth, access information to the data and so forth that are necessary for executing the event.

In the event information-storage MPD illustrated in FIG. 9, event data is recorded, for example, into "<Event presentationTime='0' duration='1000'>event data 1</Event>."

Meanwhile, in the description of the event information storage box (emsg) illustrated in FIG. 13, event data is recorded, for example, into "message_data[ ]=event data-1."

When an application control message (ACM (Application Control Message)) is notified of utilizing the event notification message illustrated in FIG. 9 or 13, an example of event data to be recorded into the event notification messages is described with reference to FIG. 15.

Figure 15:
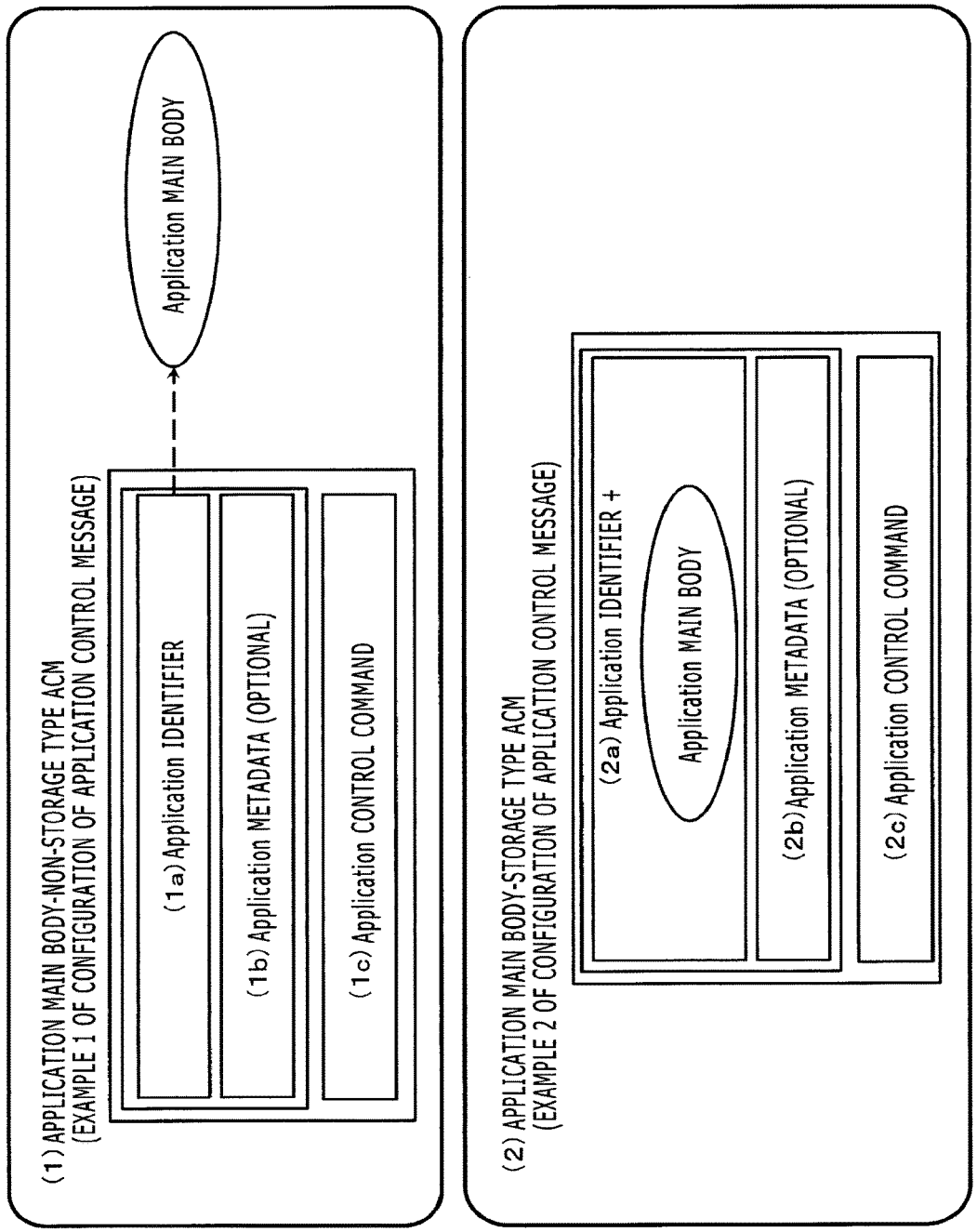
FIG. 15 is a view illustrating an example of a configuration of an application control message (ACM).

In FIG. 15, two examples given below of a configuration of the application control message (ACM) to be stored as event data into an event notification message are illustrated:
(1) an application main body non-storing type ACM; and
(2) an application main body storing type ACM.
(1) The application main body non-storing type ACM is of a type in which the application main body is not stored, but access information for acquiring the application main body is stored.
(2) The application main body storing type ACM is of a type in which the application main body is stored.
(1) The application main body non-storing type ACM has such components as given below:
(1a) application identifier;
(1b) application metadata (optional); and
(1c) application control command.
(2) The application main body storing type ACM has such components as given below:
(2a) application identifier+application main body;
(2b) application metadata (optional); and
(2c) application control command.

In the following, such storage data as given above are described.

The application identifier included in (1a) and (2a) is information necessary for identification or an acquisition process of an application such as a URL of the application that becomes a control target of an application control message (ACM). Where a plurality of applications are available as a control target of the application control message (ACM), an identifier with which the plurality of applications can be acquired is set.

As the identifier described just above, for example, an identifier of packaged applications, a set of identifiers of individual applications or the like are available.

It is to be noted that, where an application main body is designated by the identifier url, it is acquired by broadcasting or through a network. Where an application main body is acquired through a network, it is acquired in accordance with the HTTP by an ordinary network type stack. Where an application main body is acquired by a broadcast, it is transferred in accordance with the ROUTE protocol similarly to a signaling file in which signaling data is stored or a DASH segment file. It is to be noted that, where an application main body is broadcasted and accumulated asynchronously as a file, the file is called NRT (Non Real Time) file.

The application main body included in (2a) is an application itself that is a control target of the application control message (ACM). It is to be noted that the application main body is sometimes configured by a plurality of packaged applications.

The metadata of an application indicated in (1b) and (2b) is attribute information of the applications.

It is to be noted that application metadata are not an essential factor for storage into an ACM and are all optional.

In the following, the application metadata are indicated in a classified manner into metadata having a high priority degree for storage into an ACM, metadata having a medium priority degree and metadata having a low priority degree.
(A) Metadata having a high priority degree for storage into an ACM
(a1) Version (Version) information: a version of the application (an instance of the application is identified uniquely depending upon the identifier (Identifier) and the version (Version))
(a2) Related file (Related files) information: a different related file resource necessary to execute the application
(a3) Application rating (Content advisory rating) information: rating information of the application
(B) Metadata having a medium priority degree for storage into an ACM
(b1) Application name (Name) information: name for user presentation of the application
(b2) Priority degree (Priority) information: a relative priority degree of the application with respect to the other applications
(b3) Security property (Security properties) information: security property information of the application, for example, CAS (Conditional Access System)/DRM (Digital Rights Management) information
(C) Metadata having a low priority degree for storage into an ACM
(c1) Type (Type) information: a type (kind) of the application
(c2) Profile (Profile) information: ability attribute of a device required for execution of the application (type of a codec, a memory capacity and so forth).
(c3) Icon (Icons) information: an icon for identifying the application (displayed on an application launcher or the like)
(c4) Storage (Storage hints) information: hint information regarding whether or not storage into a local storage or a cache of a device on a route is possible
(c5) Target property (Targeting properties) information: an attribute for identifying a target by which the application is to be consumed (a target region, a class of the user or the like)

Into the recording regions for the application control commands in (1c) and (2c) depicted in FIG. 15, a control command for the application that becomes a control target and information of an execution timing and so forth are recorded.

As a type of the control command, for example, activation (execution), stopping (including a pause (state holding)), visualization/invisualization, deletion (where the application is cached into a local storage, deletion of the application) and so forth of an application.

For each of the commands described above, a timing at which the command is to be executed, for example, a time on the time axis associated with a certain stream (AV stream) (NPT: a concept of Normal Play Time) or an absolute time (wall clock time) is recorded.

As a control command to be recorded into a recording region for each of the application control commands in (1c) and 2(c) depicted in FIG. 15 and a particular process (code), the following examples are available:
  download (Download): to download an application;
  activate (Activation (start)): to activate an application;
  termination (Termination (stop)): to stop an application;
  suspension (Suspension (pause)): to temporarily stop an application; and
  data event (DataEvent): to pass (cause) data to (be consumed by) an application.

Fox example, such control commands as given above are available.

It is to be noted that, into the recording regions for the application control commands in (1c) and (2c) depicted in FIG. 15, also a parameter to be applied upon execution of the commands can be recorded.

As the parameter, for example, the following parameters (p1) and (p2) are available.
(p1) Time of the action: media time line
This is a parameter indicative of a time axis of a stream of a target whose execution is controlled in synchronism with the application.

(p2) Required synchronization level

This is a parameter indicative of a level of accuracy in synchronism (for example, program level, . . . , 2 sec, lip sync, frame sync). Those parameters are parameters set incidentally to all of the control commands given hereinabove.

Meanwhile, as a parameter unique to the commands "download (Download)" and "activate (Activation (start))," the following parameter (p3) is available.

(p3) Target device

This is a parameter indicative of a target device for downloading or activating the target application (primary (primary TV or the like)/companion (companion-tablet, portable telephone set or the like)).

Further, as a parameter corresponding to "data event (DataEvent)," the following parameter (p4) is available.

(p4) Data

This is a parameter indicative of data to be passed to the target application.

As described hereinabove, in the DASH standard, as the event notification mechanism, the following two different event notification methods are prescribed:

(a) MPD application event notification method (=MPD Event); and (b) segment application event notification method (=In-band Event Signaling).

These two event notification methods are prescribed.

In the following, examples of processing for notifying of an application control message applying the two different event notification methods are described.

7-2. Notification Configuration of Application Control Message to which MPD Application Event Notification Method (=MPD Event) is Applied Now, a notification configuration of an application control message utilizing the MPD application event notification method (=MPD Event) is described.

FIG. 16 is a view depicting an example of a description of an MPD in an event notification in which an MPD is used, namely, in the case where the MPD application event notification method (=MPD Event) is applied to notify of an application control message.

An MPD including an application control message has, for example, the following description as indicated in FIG. 16.

```
<MPD availabilityStartTime="2011-12-25T12:30:00
  <Period startTime='0'>
    ...
    <EventStream schemeIdUri='urn:atsc:appControlMessage'
    timescale='1000'>
      <Event presentationTime='0' duration='1000'>ACM1
      storage</Event>
      <Event presentationTime='1000' duration='4000'>ACM2
      storage</Event>
      ....
    </EventStream>
    ...
    <AdaptationSet>
      <Representation/>
      <Representation/>
    </AdaptationSet>
    ...
  </Period>
</MPD>
```

The substance of the MPD data mentioned above is described.

<MPD availabilityStartTime="2011-12-25T12:30:00

This data record recording region is a recording region for start time information of the first period corresponding to the data recorded in this MPD. As the time information, for example, the UTC time is used.

<Period startTime='1'>

This data record recording region is a period start time information recording region. An offset time period from start time (MPD/@availabilityStartTime) prescribed in the MPD is recorded.

<EventStream schemeIdUri='urn:atsc:appControlMessage' timescale='1000'>

This data record recording region is a recording region of event stream designation information indicative of an event type or the like and timescale information.

"EventStream schemeIdUri='urn:atsc:appControlMessage'" indicates that this event notification is an event notification for notifying of an application control message (ACM).

Further, "timescale='1000'" indicates that the unit time period of presentation time (presentationTime) recorded below is $\frac{1}{1000}$ second.

<Event presentationTime='0' duration='1000'>ACM1 storage</Event>

This data record recording region is a recording region of event data and a recording region of event scheduling data such as activate (execution start and so forth) time, duration and so forth of the event.

In this example, as the event data, application control message 1 (ACM1) is stored.

Further, an activate (execution start and so forth) time and a duration of the event are recorded.

This example designates that an event specified by event data 1 is to be continued for 1000 unit time periods at the activate (activation/execution) time=0.

Application control message 1 (ACM1) to be stored as event data is data, for example, of an application main body or an identifier, metadata, a command and so forth. A particular example of application control message 1 (ACM1) is illustrated in (1) of FIG. 17.

Application control message 1 (ACM1) illustrated in (1) of FIG. 17 has a data configuration similar to that of the application main body non-storing type (ACM) described hereinabove with reference to (1) of FIG. 15 and has the following data components:

(1a) application identifier;

(1b) application metadata (optional); and (1c) application control command.

Details of the data just described are such as described hereinabove with reference to FIG. 15.

Figure 17:
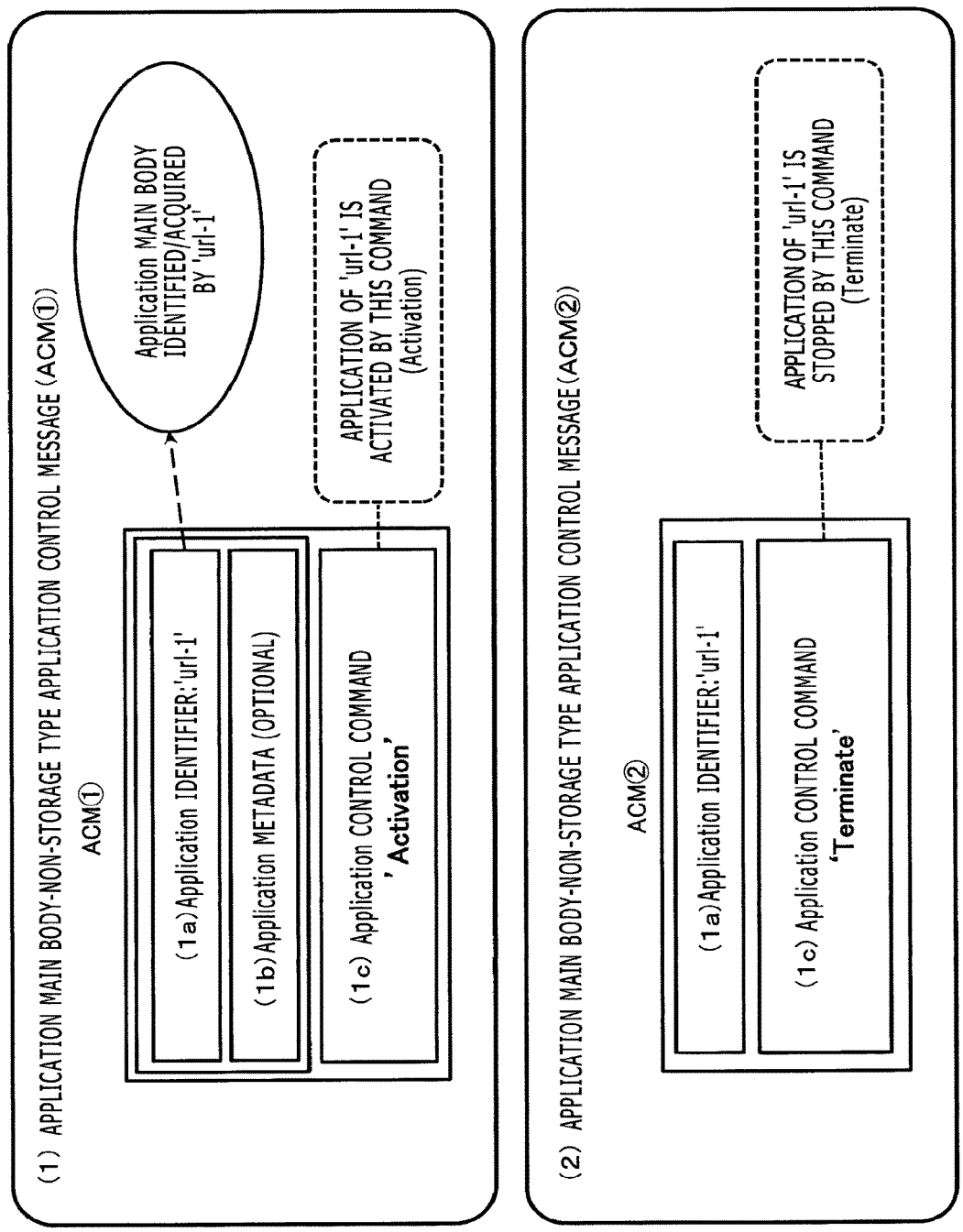
FIG. 17 is a view illustrating an example of an application control message (ACM) stored in an MPD.

In the example illustrated in (1) of FIG. 17, (1a) application identifier=uri-1 and (1c) application control command="activate (Activation)" are recorded.

The command "activate (Activation)" is a command for activating an application.

In particular,

<Event presentationTime='0' duration='1000'>ACM1 storage</Event> is a description that designates execution of processing such that an activation process of an application, which is identified by (1a) the application identifier=uri-1 and acquired, is executed at time=0 in accordance with (1c) the application control command="activate (Activation)"
and the process is continued for 1000 unit time periods.
<Event presentationTime='1000' duration='4000'>ACM2 storage</Event>

Also this data record recording region is a recording region of event data and a recording region of event scheduling data such as activate (execution start and so forth) time, duration and so forth of the event.

In this example, application control message 2 (ACM2) is stored as the event data.

Further, an activate (execution start and so forth) time and a duration of the event are recorded.

This example designates that an event specified by event data 1 is to be continued for 4000 unit time periods at the activate (activation/execution) time=1000.

Application control message 2 (ACM2) stored as event data is data, for example, of an application main body or an identifier, metadata, a command and so forth.

A particular example of application control message 2 (ACM2) is illustrated in (2) of FIG. 17.

Application control message 2 (ACM2) illustrated in (2) of FIG. 17 has a data configuration simplified from that of the application main body non-storing type (ACM) described hereinabove with reference to (1) of FIG. 15 and has the following data components:
(1a) application identifier; and
(1c) application control command.

This example of the ACM does not have application metadata.

This ACM2 is an ACM for causing a process for the same application as that of ACM1 to be performed, and since metadata same as the metadata stored in ACM1 can be applied, the metadata storage region is omitted.

In the example depicted in (2) of FIG. 17,
(1a) application identifier=uri-1 and
(1c) application control command="terminate (Terminate)"
are recorded.

The command "terminate (Terminate)" is a command for stopping the application.

In particular, the description
<Event presentationTime='1000' duration='4000'>ACM2 storage</Event>
is a description that designates execution of processing such that
a stopping process of an application, which is identified by
(1a) the application identifier=uri-1
and acquired, is executed
at time=1000
in accordance with
(1c) the application control command="terminate (Terminate)"
and the process is continued for 1000 unit time periods.

The following data record recording regions
  <AdaptationSet>
    <Representation/>
    <Representation/>
are data recording regions for recording information of the individual data types.

In this manner, notification of an application control message (ACM) can be performed by applying notification of an application control message (ACM) as an event using an MPD, namely, applying the MPD application event notification method.

As described above with reference to FIGS. 7, 8 and so forth, into an MPD, segment corresponding information of a data type and a time unit can be recorded.

By notifying of the application control message (ACM) utilizing this MPD, it is possible to provide an application control message (ACM) associated with a segment of a data type and a time unit that are made a reproduction target by the reception apparatus.

It is to be noted that, since an MPD that is signaling data is provided to a reception apparatus precedently to an AV content, the notification process of an ACM event using the MPD is utilizable where execution timing and so forth of an event can be predicted in advance over a time section of a period (Period) prescribed as a process time range in the MPD.

As a particular example, the notification process of an ACM event using the MPD can be utilized in an offline content (a program recorded in advance, a movie program or the like) rather than in a live broadcast.

7-3. Notification Configuration of Application Control Message to which Segment Application Event Notification Method (=in-Band Event Signaling) is Applied Now, a notification configuration of an application control message to which the segment application event notification method (=In-band Event Signaling) is applied is described.

Figure 18:
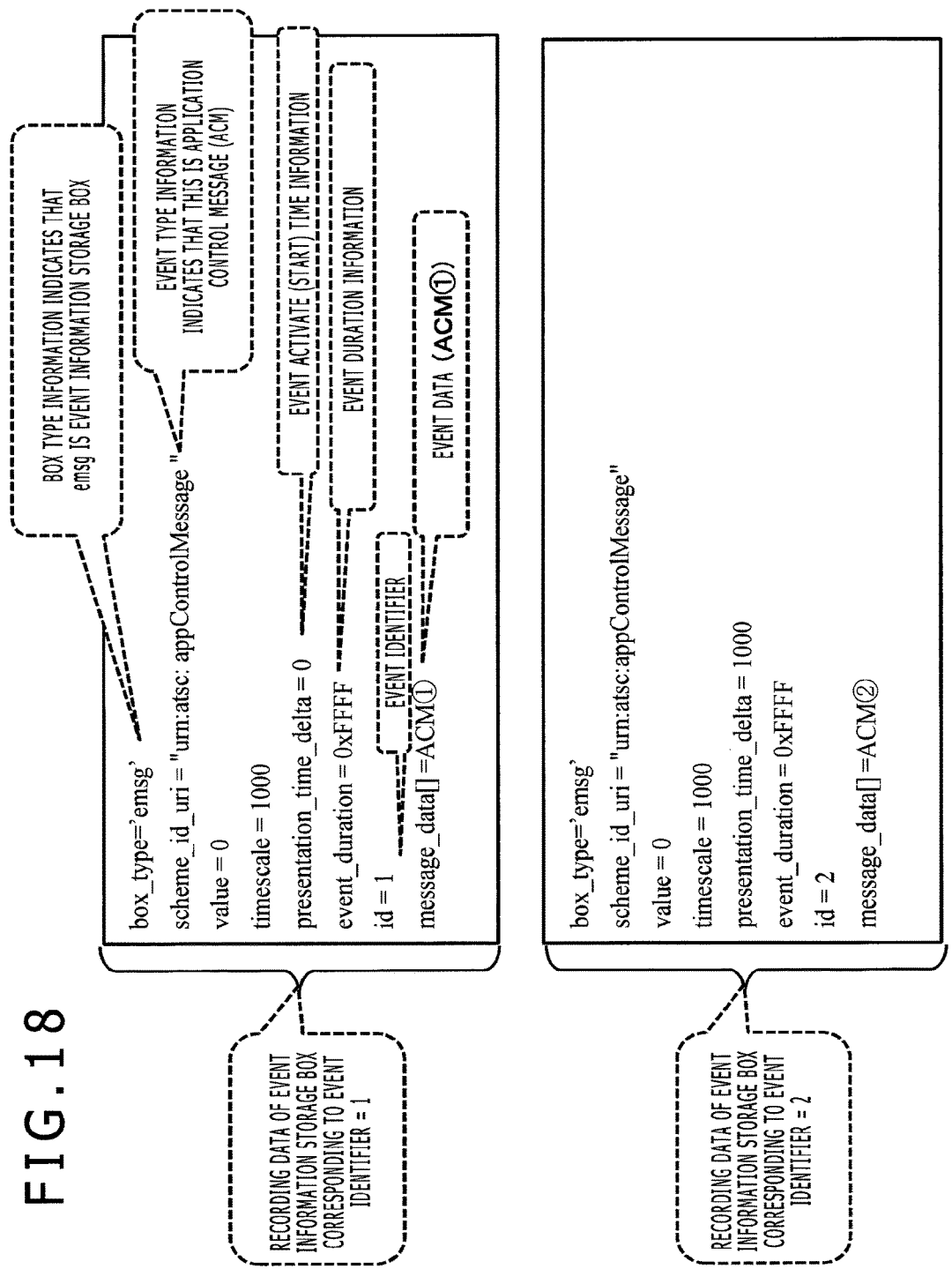
FIG. 18 is a view illustrating an example of a segment (emsg box prescribed in the MP4) in which an application control message (ACM) is stored.

FIG. 18 is a view depicting an example of a description of the "event information storage box (emsg)" in a segment where an event information storage box (emsg) in MP4 format data utilized in event notification using a segment, namely, a segment application event notification method (=In-band Event Signaling) is applied to notify of an application control message.

It is to be noted that the format may be encoded by a binary bit stream representation or may be encoded by a text according to XML or the like.

In FIG. 18, data of two event information storage boxes (emsg) in which two ACMs of application control messages 1 and 2 (ACM1 and ACM2) identified by event identifiers 1 and 2 are stored separately are depicted.

As depicted in FIG. 18, a segment including an application control message (ACM) has, for example, the following description.
box_type='emsg'
scheme_id_uri="urn:atsc:appControl Message"
value=0
timescale=1000
presentation_time_delta=0
event_duration=0xFFFF
id=1
message_data[ ]=ACM1

The substance of the data of the above event information storage box (emsg) is described.
box_type='emsg'

This data record recording region is a box type recording region. This describes that this box (data storage box prescribed by the MP4) is an event information storage box (emsg).
scheme_id_uri="urn:atsc:appControl Message"
value=0

The data record recording regions are recording regions of event designation information indicative of an event type and so forth.
'scheme_id_uri="urn:atsc:appControl Message"' indicates that this event notification is an event notification for notifying of an application control message (ACM).
timescale=1000

This data record recording region is a recording region of timescale information.

"timescale='1000'" indicates that the unit time period of the presentation time (presentationTime) recorded in the following is 1/1000 second.

presentation_time_delta=0
event_duration=0xFFFF

These data record recording regions are recording regions of event scheduling data of an activate (execution start and so forth) time, a duration and so forth of the event. This designates that an event identified by event designation information is activated at an activate (activation/execution) time=0 and continues till a time=0xFFFF. It is to be noted that 0xFFFF indicates that the end time is not defined and signifies that the event may or may not be continued till the end of reproduction of an AV content corresponding to the segment for which this event information storage box is set.

id=1

This data recording region is an event identification information recording region.

message_data[ ]=ACM1

This data recording region is a recording region of event data.

In this example, as event data, application control message 1 (ACM1) is stored.

A particular example of application control message 1 (ACM1) is such as described hereinabove with reference to (1) of FIG. 17.

Application control message 1 (ACM1) depicted in (1) of FIG. 17 has a data configuration similar to that of the application main body non-storing type (ACM) described hereinabove with reference to (1) of FIG. 15 and has such data components as given below:

(1a) application identifier;
(1b) application metadata (optional); and
(1c) application control command.

Details of the data factors are such as described hereinabove with reference to FIG. 15.

In the example depicted in (1) of FIG. 17,
(1a) application identifier=uri-1 and
(1c) application control command="activate (Activation)"
are recorded.

The command "activate (Activation)" is a command for activating the application.

In particular, the segment application event (ACM1) notification message corresponding to the event identifier=1 (ACM1) of FIG. 18 is a description that designates execution of processing such that an activation process of an application, which is identified by
(1a) the application identifier=uri-1
and acquired, is executed
at time=0
in accordance with
(1c) the application control command="activate (Activation)."

Meanwhile, application control message 2 (ACM2) stored in the segment application event (ACM2) corresponding to the event identifier=2 (ACM2) depicted at the lower part in FIG. 18 has a data configuration depicted in (2) of FIG. 17.

Application control message 2 (ACM2) depicted in (2) of FIG. 17 has a data configuration further simplified from that of the application main body non-storing type (ACM) described hereinabove with reference to (1) of FIG. 15 and has the following data components:
(1a) application identifier; and
(1c) application control command.

This example of the ACM does not have application metadata.

This ACM2 is an ACM for causing a process for the same application as that of ACM1 to be performed, and since metadata same as the metadata stored in ACM1 can be applied, the metadata storage region is omitted.

In the example depicted in (2) of FIG. 17,
(1a) application identifier=uri-1 and
(1c) application control command="terminate (Terminate)"
are recorded.

The command "terminate (Terminate)" is a command for stopping the application.

In particular, the segment application event (ACM2) notification message corresponding to the event identifier=2 (ACM2) of FIG. 18 is a description that designates execution of processing such that a stopping process of an application, which is identified by
(1a) the application identifier=uri-1
and acquired, is executed
at time=1000
in accordance with
(1c) the application control command="terminate (Terminate)."

In this manner, in the application control message (ACM) notification configuration to which the segment application event notification method (=In-band Event Signaling) is applied, it is possible to record an application control message (ACM) into a segment stream (in-stream) and transfer the segment stream.

In the segment application event notification method (=In-band Event Signaling), it can be defined in the "scheme_id_uri" field and the optional "value" field that the event type is the application control message (ACM). Further, to the "message_data" field, event data, namely, application actual data, metadata, data of commands and so forth that configure the application control message (ACM), access information to the data and so forth can be added.

8. Notification and Utilization Sequence of Application Control Message (ACM)

Now, a transmission and utilization sequence of an application control message (ACM) is described.

As described hereinabove, when an application control message (ACM) is transmitted applying an event notification mechanism, two event notification methods of different types can be utilized:
(a) an MPD application event notification method (=MPD Event); and
(b) a segment application event notification method (=In-band Event Signaling).

Sequences when an application control message (ACM) is transmitted using the two different event notification methods above are successively described.

8-1. Transmission and Utilization Sequence of Application Control Message to which MPD Application Event Notification Method (=MPD Event) is Applied First, a transmission and utilization sequence of an application control message where the MPD application event notification method (=MPD Event) is applied is described with reference to FIG. 19.

A configuration and an example of processing of a transmission apparatus 510 that executes production and outputting of an AV segment or an MPD in which an application control message (ACM) is recorded as event information and a reception apparatus 520 that receives the application control message (ACM) recording MPD and executes a process according to the MPD-recording application control message (ACM) are described with reference to FIG. 19.

Figure 19:
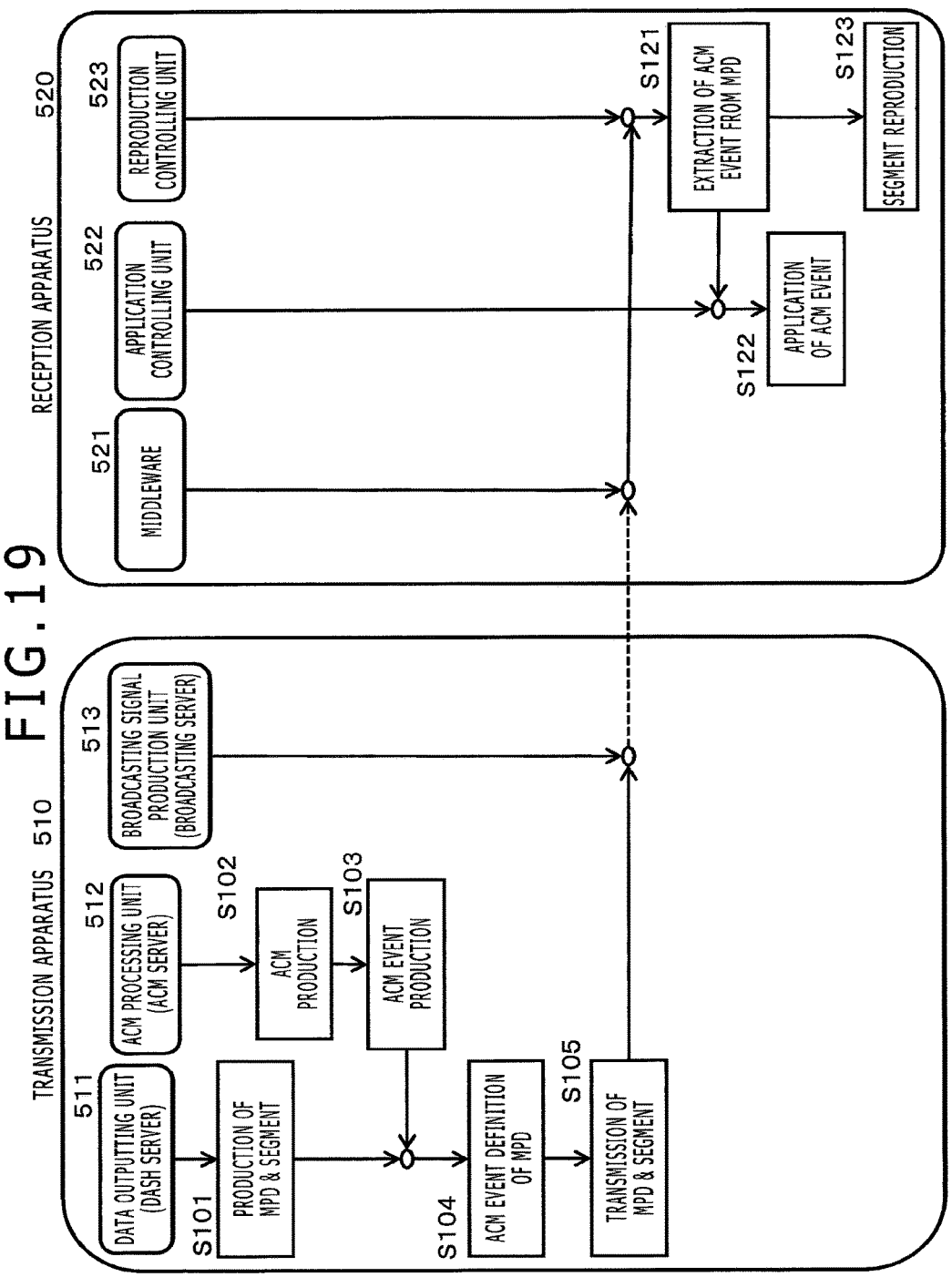
FIG. 19 is a view illustrating a production, transmission and utilization sequence of an application control message (ACM).

In FIG. 19, the transmission apparatus 510 that executes production and outputting of an MPD in which an application control message (ACM) is recorded is depicted at the left side.

Meanwhile, at the right side in FIG. 19, the reception apparatus 520 is depicted which receives an MPD, in which an application control message (ACM) is recorded, as an input thereto and executes an application control process according to the application control message (ACM) recorded in the MPD.

The transmission apparatus 510 particularly is the broadcasting server 21 or the data distribution server 22 that transmits signaling data such as an MPD or an AV segment.

Meanwhile, the reception apparatus 520 depicted at the right side in FIG. 19 particularly is a reception apparatus that receives signaling data such as an MPD or an AV segment as an input thereto and executes a content reproduction process.

A process executed by the transmission apparatus 510 is described.

The transmission apparatus 510 includes a data outputting unit (DASH server) 511, an application control message (ACM) processing unit (ACM server) 512 and a broadcasting signal production unit (broadcasting server) 513.

It is to be noted that those server functions are functions the broadcasting server 21 or the data distribution server 22 depicted in FIG. 1, which transmits signaling data such as an MPD or an AV segment, has.

In the following, a process executed by the transmission apparatus 510 is described for each processing step.
(Step S101)

First at step S101, the data outputting unit (DASH server) 511 of the transmission apparatus 510 produces a segment that includes an MPD as signaling data and a segment including AV data that configures a reproduction content.
(Step S102)

Then at step S102, the application control message (ACM) processing unit (ACM server) 512 of the transmission apparatus 510 produces an application control message (ACM).

The application control message (ACM) is a message in which, for example, the data described hereinabove with reference to FIG. 15 is stored.

As described hereinabove with reference to FIG. 15, for the application control message (ACM), for example, the following two data types are available:

(1) an application main body non-storing type ACM; and
(2) an application main body storing type ACM.

At step S102, an application control message (ACM) of one of the types is produced.
(Step S103)

Then at step S103, the application control message (ACM) processing unit (ACM server) 512 of the transmission apparatus 510 sets the application control message (ACM) as an event.

In particular, parameters necessitated in event notification such as an activate time, a duration and so forth of the application control message (ACM) are determined. In other words, a setting process for parameters and other format data which make ACM transmission possible using the event notification mechanism in accordance with the DASH standard and so forth are performed.
(Step S104)

Then at step S104, the data outputting unit (DASH server) 511 of the transmission apparatus 510 performs insertion of the application control message (ACM) as event information into the MPD as signaling data.

By this process, an MPD including the application control message described hereinabove with reference to FIG. 16 is produced.

In the application control message storage MPD depicted in FIG. 16, it is indicated that the type of the event is the application control message as described hereinabove. Further, as event data, the application control message (ACM) described hereinabove with reference to FIG. 15 is stored.

Furthermore, an activate (activation) time, duration information and so forth of the application control message are recorded.

The reception apparatus can perform, in accordance with the application control message recorded in the MPD, a process with the designated application control message referred to.

In particular, for an application acquired in accordance with the recorded data in the application control message, a process in which the control command recorded in the application control message is applied is executed.

The execution time period and duration comply with the description of the MPD.
(Step S105)

Then at step S105, the data outputting unit (DASH server) 511 of the transmission apparatus 510 transmits (outputs) the event information-recording MPD in which the application control message is recorded in the MPD as signaling data or the segment.

Where the transmission apparatus 510 is the broadcasting server 21, the broadcasting signal production unit (broadcasting server) 513 performs a process for transmitting the MPD or the segment on a broadcasting wave.

Where the transmission apparatus 510 is the data distribution server 22, the MPD or the segment is transmitted through a network.

Now, a process executed by the reception apparatus 520 depicted at the right side in FIG. 19 is described.

In FIG. 19, middleware 521, an application controlling unit 522 and a reproduction controlling unit 523 of the reception apparatus 520 are depicted. The components mentioned correspond to the components of the tuner-mounting reception apparatus 30 depicted in FIGS. 5 and 6.
(Step S121)

First, if the reproduction controlling unit (DASH client) 523 of the reception apparatus 520 acquires the MPD as signaling data from the transmission apparatus 510 through the middleware 521, then it acquires event information from the acquired MPD at step S121.

It is to be noted that it is assumed here that the acquired MPD is an MPD in which an application control message (ACM) is recorded.

In the application control message storage MPD, it is indicated that the type of the event is the application control message as described hereinabove.

Further, as event data, the application control message (ACM) described hereinabove with reference to FIG. 15 is stored.

Furthermore, an activate (activation) time, duration information and so forth of the application control message are recorded.

The reception apparatus can perform, in accordance with the application control message recorded in the MPD, a process in which a designated command is applied to a designated application (Step S122)

Then at step S122, the application controlling unit 522 of the reception apparatus 520 performs an application process of the application control message (ACM) acquired from the MPD.

In the application control message storage MPD, the application control message (ACM) described hereinabove with reference to FIG. 15 is stored as event data.

In the application control message (ACM), an application main body of a control target or identification information of the application is recorded, and further, metadata, a control command and so forth are recorded.

The application controlling unit 522 executes an application process of the command prescribed in the ACM for the application specified in accordance with the ACM recorded data.

It is to be noted that a command application time and duration information are recorded in the MPD as described hereinabove with reference to FIG. 16.

(Step S123)

Then, the reproduction controlling unit (DASH client) 523 of the reception apparatus 520 acquires an AV content and so forth from the segment received from the transmission apparatus 510 and executes a reproduction process.

It is to be noted that the processes at steps S121 to S123 are executed continually and repetitively.

In this manner, it is possible for the reception apparatus (client) to execute various application controls in accordance with an application control message (ACM) as event information recorded in an MPD together with a process for receiving and reproducing an AV segment.

8-2. Transmission and Utilization Sequence of Application Control Message to which Segment Application Event Notification Method (=in-Band Event Signaling) is Applied Now, a transmission and utilization sequence of an application control message to which the segment application event notification method (=In-band Event Signaling) is applied is described with reference to FIG. 20.

A configuration and an example of a process of the transmission apparatus 510 that executes production (or acquisition) and outputting of a segment in which an application control message (ACM) is recorded as event information and the reception apparatus 520 that receives an application control message (ACM) recorded in the segment and executes a process according to the application control message (ACM) recorded in the segment are described with reference to FIG. 20.

Figure 20:
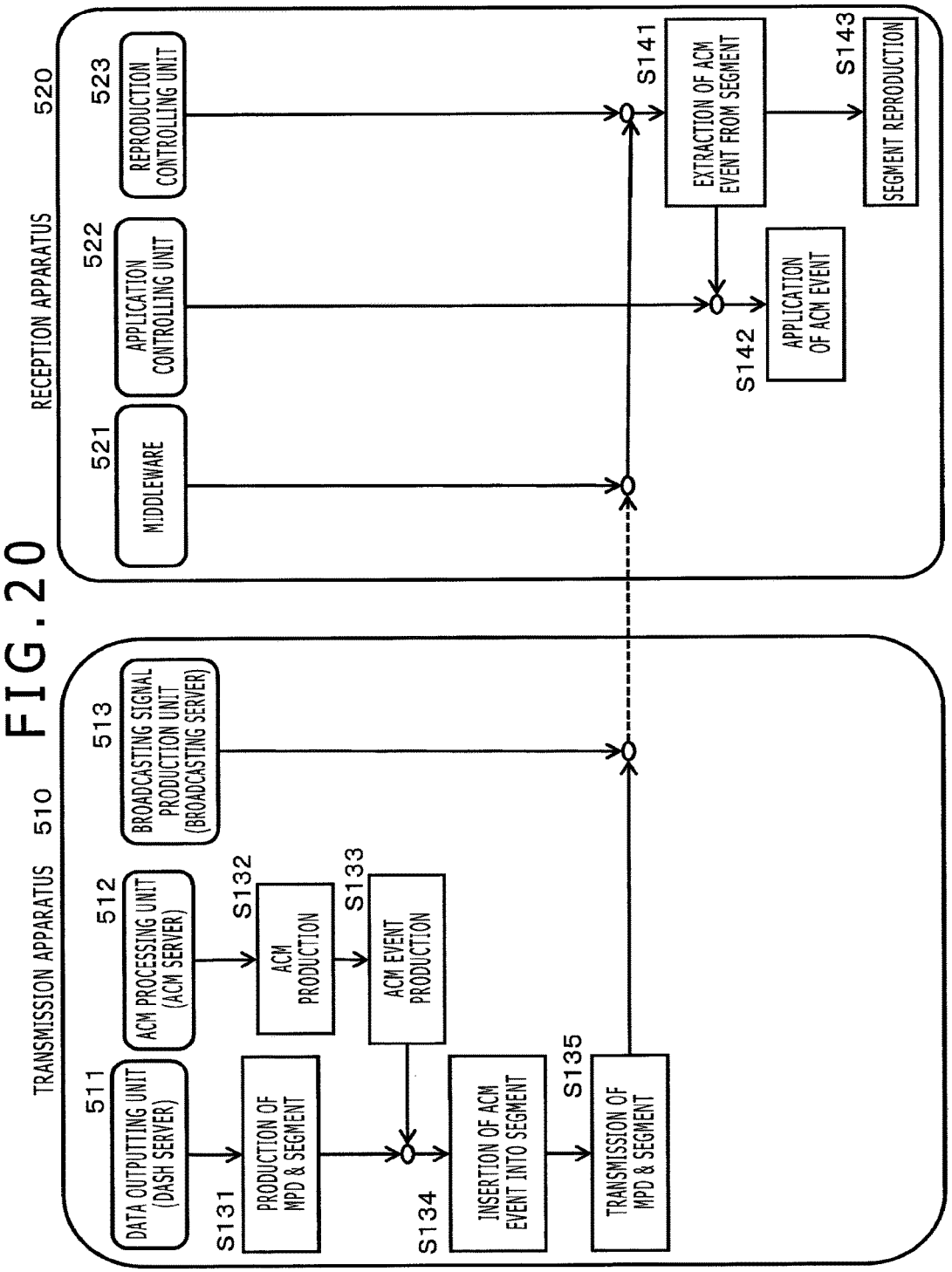
FIG. 20 is a view illustrating another production, transmission and utilization sequence of an application control message (ACM).

In FIG. 20, the transmission apparatus 510 that executes production (or acquisition) and outputting of a segment in which an application control message (ACM) is depicted at the left side.

Meanwhile, at the right side in FIG. 20, the reception apparatus 520 that receives a segment in which an application control message (ACM) is recorded as an input thereto and executes an application control process according to the application control message (ACM) recorded in the segment.

The transmission apparatus 510 particularly is the broadcasting server 21 or the data distribution server 22 that transmits signaling data such as an MPD or an AV segment.

Meanwhile, the reception apparatus 520 depicted at the right side in FIG. 20 particularly is a reception apparatus that receives signaling data such as an MPD or an AV segment as an input thereto and executes a content reproduction process.

A process executed by the transmission apparatus 510 is described.

The transmission apparatus 510 has a data outputting unit (DASH server) 511, an application control message (ACM) processing unit (ACM server) 512 and a broadcasting signal production unit (broadcasting server) 513.

It is to be noted that those server functions are functions that the broadcasting server 21 or the data distribution server 22 depicted in FIG. 1, which transmits signaling data such as an MPD or an AV segment, has.

In the following, a process executed by the transmission apparatus 510 is described for each processing step.

(Step S131)

First at step S131, the data outputting unit (DASH server) 511 of the transmission apparatus 510 produces or acquired a segment that includes an MPD as signaling data and a segment including AV data that configures a reproduction content.

(Step S132)

Then at step S132, the application control message (ACM) processing unit (ACM server) 512 of the transmission apparatus 510 produces an application control message (ACM).

The application control message (ACM) is a message in which, for example, the data described hereinabove with reference to FIG. 15 is stored.

As described hereinabove with reference to FIG. 15, for the application control message (ACM), for example, the following two data types are available:
(1) an application main body non-storing type ACM; and
(2) an application main body storing type ACM.

At step S132, an application control message (ACM) of one of the types is produced.

(Step S133)

Then at step S133, the application control message (ACM) processing unit (ACM server) 512 of the transmission apparatus 510 sets the application control message (ACM) as an event.

In particular, parameters necessitated in event notification such as an activate time, a duration and so forth of the application control message (ACM) are determined. In other words, a setting process for parameters and other format data which make ACM transmission possible using the event notification mechanism in accordance with the DASH function and so forth are performed.

(Step S134)

Then at step S134, the data outputting unit (DASH server) 511 of the transmission apparatus 510 performs insertion of the application control message (ACM) as event information into the emsg box prescribed in the MP4, which is configuration data of the segment.

By this process, a segment including the application control message described hereinabove with reference to FIG. 18 is produced. In particular, emsg box recording data prescribed by the MP4 is produced.

In the application control message storage segment depicted in FIG. 18,
it is indicated that the type of the event is the application control message as described hereinabove.

Further, as event data, the application control message (ACM) described hereinabove with reference to FIG. 15 is stored.

Furthermore, an activate (activation) time, duration information and so forth of the application control message are recorded.

The reception apparatus can perform, in accordance with the application control message recorded in this segment, a process with the designated application control message referred to.

In particular, for an application acquired in accordance with the recorded data in the application control message, a process in which the control command recorded in the application control message is applied is executed.

The execution time period and duration comply with the segment (emsg box) recorded data.

(Step S135)

Then at step S135, the data outputting unit (DASH server) 511 of the transmission apparatus 510 transmits (outputs) the MPD and the segment in which the application control message is recorded.

Where the transmission apparatus 510 is the broadcasting server 21, the broadcasting signal production unit (broadcasting server) 513 performs a process for transmitting the MPD or the segment on a broadcasting wave.

Where the transmission apparatus 510 is the data distribution server 22, the MPD or the segment is transmitted through a network.

Now, a process executed by the reception apparatus 520 depicted at the right side in FIG. 20 is described.

In FIG. 20, middleware 521, an application controlling unit 522 and a reproduction controlling unit 523 of the reception apparatus 520 are depicted. The components mentioned correspond to the components of the tuner-mounting reception apparatus 30 depicted in FIGS. 5 and 6.

(Step S141)

First, if the reproduction controlling unit (DASH client) 523 of the reception apparatus 520 acquires a segment from the transmission apparatus 510 through the middleware 521, then it acquires event information from the acquired segment at step S141.

It is to be noted that it is assumed that the segment acquired here is a segment including an emsg box in which an application control message (ACM) is recorded.

The segment is a segment in which an application control message (ACM) is recorded in the emsg box prescribed by the MP4 described hereinabove with reference to FIG. 18.

In the application control message storage segment, it is indicated that the type of the event is the application control message as described hereinabove. Further, as event data, the application control message (ACM) described hereinabove with reference to FIG. 15 is stored.

Furthermore, an activate (activation) time, duration information and so forth of the application control message are recorded.

The reception apparatus can perform, in accordance with the application control message recorded in the segment, a process in which a designated command is applied to a designated application.

(Step S142)

Then at step S142, the application controlling unit 522 of the reception apparatus 520 performs an application process of the application control message (ACM) acquired from the segment.

In the application control message storage segment, the application control message (ACM) described hereinabove with reference to FIG. 15 is stored as event data.

In the application control message (ACM), an application main body of a control target or identification information of the application is recorded, and further, metadata, a control command and so forth are recorded.

The application controlling unit 522 executes an application process of the command prescribed in the ACM for the application specified in accordance with the ACM recorded data.

It is to be noted that a command application time and duration information are recorded in the segment (emsg box prescribed in the MP4) as described hereinabove with reference to FIG. 18.

(Step S143)

Then, the reproduction controlling unit (DASH client) 523 of the reception apparatus 520 acquires an AV content and so forth from the segment received from the transmission apparatus 510 and executes a reproduction process.

It is to be noted that the processes at steps S141 to S143 are executed continually and repetitively.

In this manner, it is possible for the reception apparatus (client) to execute various application controls in accordance with an application control message (ACM) as event information recorded in a segment together with a process for receiving and reproducing an AV segment.

9. Example of Processing where Tuner-Non-Mounting Reception Apparatus is Utilized As described hereinabove with reference to FIGS. 5 and 6, as a reception apparatus (client) that executes reproduction of a broadcast content or the like, the tuner-mounting reception apparatus (client A) 30 and the tuner-non-mounting reception apparatus (client B) 40 are used.

Since the tuner-non-mounting reception apparatus (client B) 40 cannot directly receive a broadcasting wave, it is necessary to input various data through the tuner-mounting reception apparatus (client A) 30.

This similarly applies also to the application control message (ACM), and since the tuner-non-mounting reception apparatus (client B) 40 cannot directly receive an application control message (ACM), it is necessary to input the application control message (ACM) through the tuner-mounting reception apparatus (client A) 30.

In the following, a processing sequence when the tuner-non-mounting reception apparatus (client B) 40 receives an application control message (ACM) as an input thereto through the tuner-mounting reception apparatus (client A) 30 and performs processing is described.

As described hereinabove, when an application control message (ACM) is transmitted applying an event notification mechanism, the following two event notification methods of different types can be utilized:

(a) the MPD application event notification method (=MPD Event); and (b) the segment application event notification method (=In-band Event Signaling).

In the following, sequences when an application control message (ACM) is transmitted using the two different event notification methods above are successively described.

9-1. Transmission and Utilization Sequence of Application Control Message to which MPD Application Event Notification Method (=MPD Event) is Applied First, a transmission and utilization sequence of an application control message where the MPD application event notification method (=MPD Event) is applied is described with reference to FIG. 21.

Processing sequences among the following three apparatus are described with reference to FIG. 21:

(1) a transmission apparatus 610 that executes production and outputting of an AV segment or an application control message (ACM);

(2) a tuner-mounting reception apparatus 620 that receives an AV segment or an application control message (ACM) and produces an ACM recorded MPD in which the application control message (ACM) is recorded as event information in the MPD; and (3) a tuner-non-mounting reception apparatus 630 that receives an application control message (ACM) recorded MPD from the tuner-mounting reception apparatus 620 and executes a process in accordance with the MPD-recording application control message (ACM).

Figure 21:
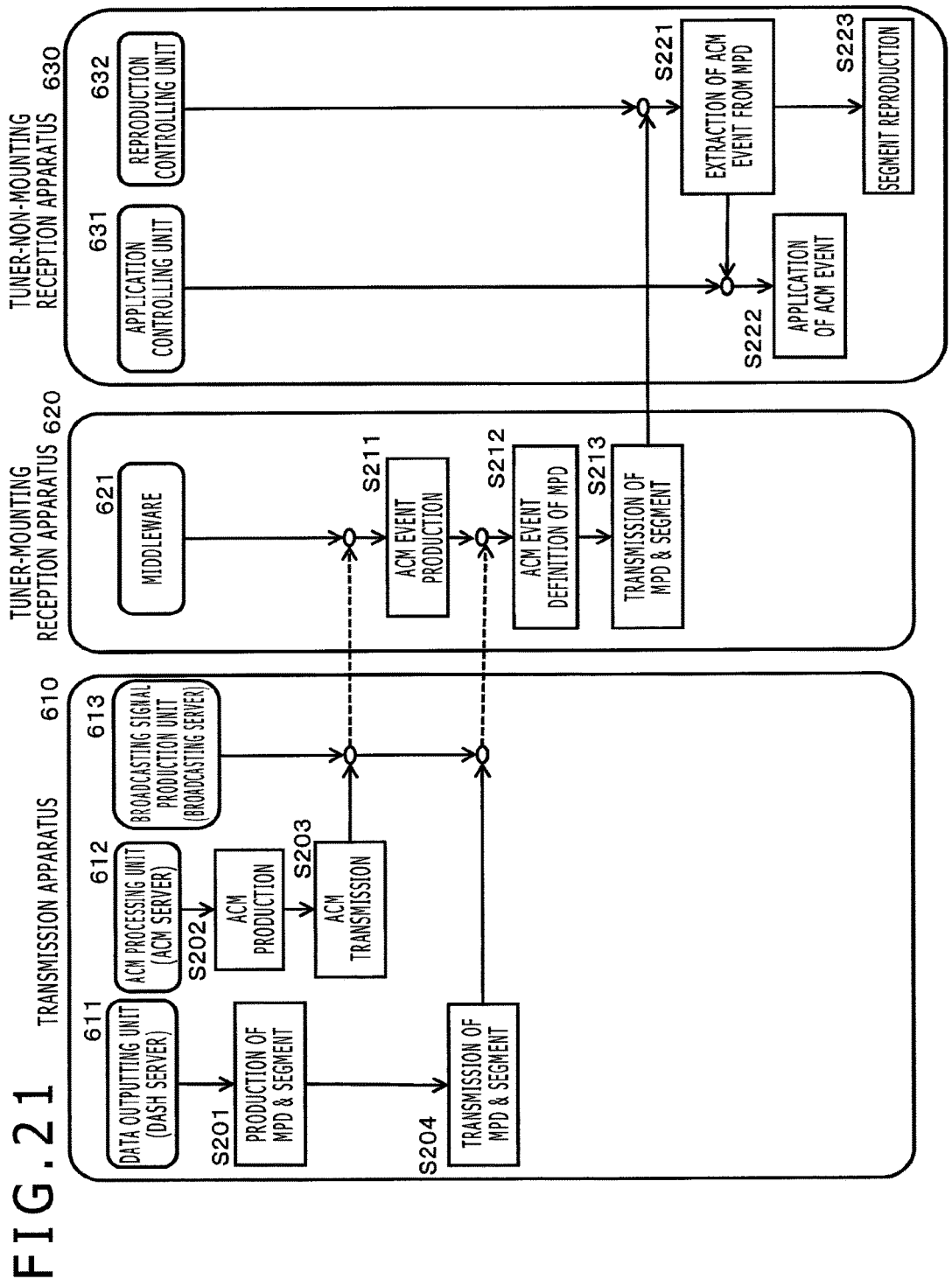
FIG. 21 is a view illustrating a further production, transmission and utilization sequence of an application control message (ACM).

In FIG. 21, the transmission apparatus 610, the tuner-mounting reception apparatus 620 and the tuner-non-mounting reception apparatus 630 are depicted from the left.

The transmission apparatus 610 particularly is the broadcasting server 21 or the data distribution server 22 that transmits signaling data such as an MPD or an AV segment.

A process executed by the transmission apparatus 610 is described.

The transmission apparatus 610 includes a data outputting unit (DASH server) 611, an application control message (ACM) processing unit (ACM server) 612 and a broadcasting signal production unit (broadcasting server) 613.

It is to be noted that those server functions are functions the broadcasting server 21 or the data distribution server 22 depicted in FIG. 1, which transmits signaling data such as an MPD or an AV segment, has.

In the following, processes executed by the transmission apparatus 610 are described for individual processing steps.
(Step S201)

First at step S201, the data outputting unit (DASH server) 611 of the transmission apparatus 610 produces a segment that includes an MPD as signaling data and a segment including AV data that configures a reproduction content.
(Steps S202 and S203)

Then, the application control message (ACM) processing unit (ACM server) 612 of the transmission apparatus 610 produces an application control message (ACM) at step S202, and transmits the produced application control message (ACM) at step S203.

The application control message (ACM) is a message in which, for example, data described hereinabove with reference to FIG. 15 is stored.

As described hereinabove with reference to FIG. 15, for the application control message (ACM), for example, the following two data types are available:
(1) an application main body non-storing type ACM; and
(2) an application main body storing type ACM.

At steps S202 and S203, an application control message (ACM) of one of the types is produced and transmitted.
(Step S204)

Then at step S204, the data outputting unit (DASH server) 611 of the transmission apparatus 610 transmits (outputs) the MPD as signaling data or the segment.

Where the transmission apparatus 610 is the broadcasting server 21, the broadcasting signal production unit (broadcasting server) 613 performs a process for transmitting the MPD or the segment on a broadcasting wave.

Where the transmission apparatus 610 is the data distribution server 22, the MPD or the segment is transmitted through a network.

Now, a process of the tuner-mounting reception apparatus 620 is described.

The tuner-mounting reception apparatus 620 has a configuration similar to that of the tuner-mounting reception apparatus 30 depicted in FIGS. 5 and 6.

The tuner-mounting reception apparatus 620 receives an AV segment or an application control message (ACM) transmitted from the transmission apparatus 610 and produces an ACM recorded MPD in which the application control message (ACM) is recorded as event information in the MPD.

Further, the tuner-mounting reception apparatus 620 transfers the produced ACM recorded MPD or segment to the tuner-non-mounting reception apparatus 630.

Processes at steps executed by the tuner-mounting reception apparatus 620 are described.
(Step S211)

If middleware 621 of the tuner-mounting reception apparatus 620 receives an application control message (ACM) from the transmission apparatus 610, then it sets the received application control message (ACM) as an event at step S211.

In particular, the middleware 621 of the tuner-mounting reception apparatus 620 sets parameters necessitated for event notification such as an activate time, a duration and so forth of the application control message (ACM) and prepares a format as event information in compliance with the DASH standard.

It is to be noted that the parameters to be applied in this process are described as attribute data incidental to the application control message (ACM) received from the transmission apparatus 610.
(Step S212)

Then at step S212, the middleware 621 of the tuner-mounting reception apparatus 620 performs insertion of the application control message (ACM) as event information into an MPD as signaling data.

By this process, an MPD including the application control message described hereinabove with reference to FIG. 16 is produced.

In the application control message storage MPD depicted in FIG. 16, it is indicated that the type of the event is the application control message as described hereinabove. Further, as event data, the application control message (ACM) described hereinabove with reference to FIG. 15 is stored.

Furthermore, an activate (activation) time, duration information and so forth of the application control message are recorded.

The tuner-non-mounting reception apparatus 630 can perform, in accordance with the application control message recorded in the MPD, a process with the designated application control message referred to.

In particular, for an application acquired in accordance with the recorded data in the application control message, a process in which the control command recorded in the application control message is applied is executed.

The execution time period and duration comply with the description of the MPD.
(Step S213)

Then at step S213, the middleware 621 of the tuner-mounting reception apparatus 620 transmits (outputs) the event information-recording MPD in which the application control message is recorded in the MPD as signaling data or the segment.

It is to be noted that outputting of an MPD or a segment from the tuner-mounting reception apparatus 620 to the tuner-non-mounting reception apparatus 630 is executed, for example, from the middleware of the tuner-mounting reception apparatus 620 through a proxy server.

Now, a process executed by the tuner-non-mounting reception apparatus 630 depicted at the right side in FIG. 21 is described.

In FIG. 21, an application controlling unit 631 and a reproduction controlling unit 632 of the tuner-non-mounting reception apparatus 630 are depicted. The components mentioned corresponds to the components of the tuner-non-mounting reception apparatus 40 depicted in FIGS. 5 and 6.

(Step S221)

First, if the reproduction controlling unit (DASH client) 632 of the tuner-non-mounting reception apparatus 630 acquires an MPD as signaling data through the middleware 621 of the tuner-mounting reception apparatus 620, then it acquires event information from the acquired MPD at step S221.

It is to be noted that it is assumed here that the acquired MPD is an MPD in which an application control message (ACM) is recorded.

In the application control message storage MPD, it is indicated that the type of the event is the application control message as described hereinabove. Further, as event data, the application control message (ACM) described hereinabove with reference to FIG. 15 is stored.

Furthermore, an activate (activation) time, duration information and so forth of the application control message are recorded.

The reception apparatus can perform, in accordance with the application control message recorded in the MPD, a process in which a designated command is applied to a designated application.

(Step S222)

Then at step S222, the application controlling unit 631 of the tuner-non-mounting reception apparatus 630 performs an application process of the application control message (ACM) acquired from the MPD.

In the application control message storage MPD, the application control message (ACM) described hereinabove with reference to FIG. 15 is stored as event data.

In the application control message (ACM), an application main body of a control target or identification information of the application is recorded, and further, metadata, a control command and so forth are recorded.

The application controlling unit 631 executes an application process of a command prescribed in the ACM for the application specified in accordance with the ACM recorded data.

It is to be noted that a command application time and duration information are recorded in the MPD as described hereinabove with reference to FIG. 16.

(Step S223)

Then, the reproduction controlling unit (DASH client) 632 of the tuner-non-mounting reception apparatus 630 acquires an AV content and so forth from the segment received through the tuner-mounting reception apparatus 620 and executes a reproduction process.

It is to be noted that the processes at steps S221 to S223 are executed continually and repetitively.

In this manner, it is possible for the tuner-non-mounting reception apparatus 630 to acquire an application control message (ACM) as event information from an application control message (ACM) recorded MPD produced by the middleware of the tuner-mounting reception apparatus 620 and execute various application controls in accordance with the acquired ACM together with a process for receiving and reproducing an AV segment.

It is to be noted that the configuration for performing a process for inserting an application control message (ACM) into an MPD after such broadcast sending out as described hereinabove with reference to FIG. 21 is limited only to a case in which there is a time allowance before execution of the application.

For example, the configuration is limited to such a case that a reproduction start time is scheduled such that, after a sufficient period of time elapses after a certain AV segment is sent out from a broadcasting server or the like, reproduction of the segment is started.

This is because, since it is necessary to record an application control message (ACM) into an MPD in accordance with setting of a period unit and, for example, it is necessary for the middleware 621 of the tuner-mounting reception apparatus 620 to collect ACMs broadcasted from a broadcasting server over an interval of time for one period (Period) and produce an MPD corresponding to the period and therefore a time lag for at least one period occurs before sending out of the MPD.

9-2. Transmission and Utilization Sequence of Application Control Message to which Segment Application Event Notification Method (=in-Band Event Signaling) is Applied Now, a transmission and utilization sequence of an application control message to which the segment application event notification method (=In-band Event Signaling) is applied is described with reference to FIG. 22.

Processing sequences among the following three apparatus are described with reference to FIG. 22:

(1) a transmission apparatus 610 that executes production and outputting of an AV segment or an application control message (ACM);

(2) a tuner-mounting reception apparatus 620 that receives an AV segment or an application control message (ACM) and produces an ACM recorded segment in which the application control message (ACM) is recorded as event information in the segment; and (3) a tuner-non-mounting reception apparatus 630 that receives an application control message (ACM) recorded segment from the tuner-mounting reception apparatus 620 and executes a process in accordance with the segment-recording application control message (ACM).

Figure 22:
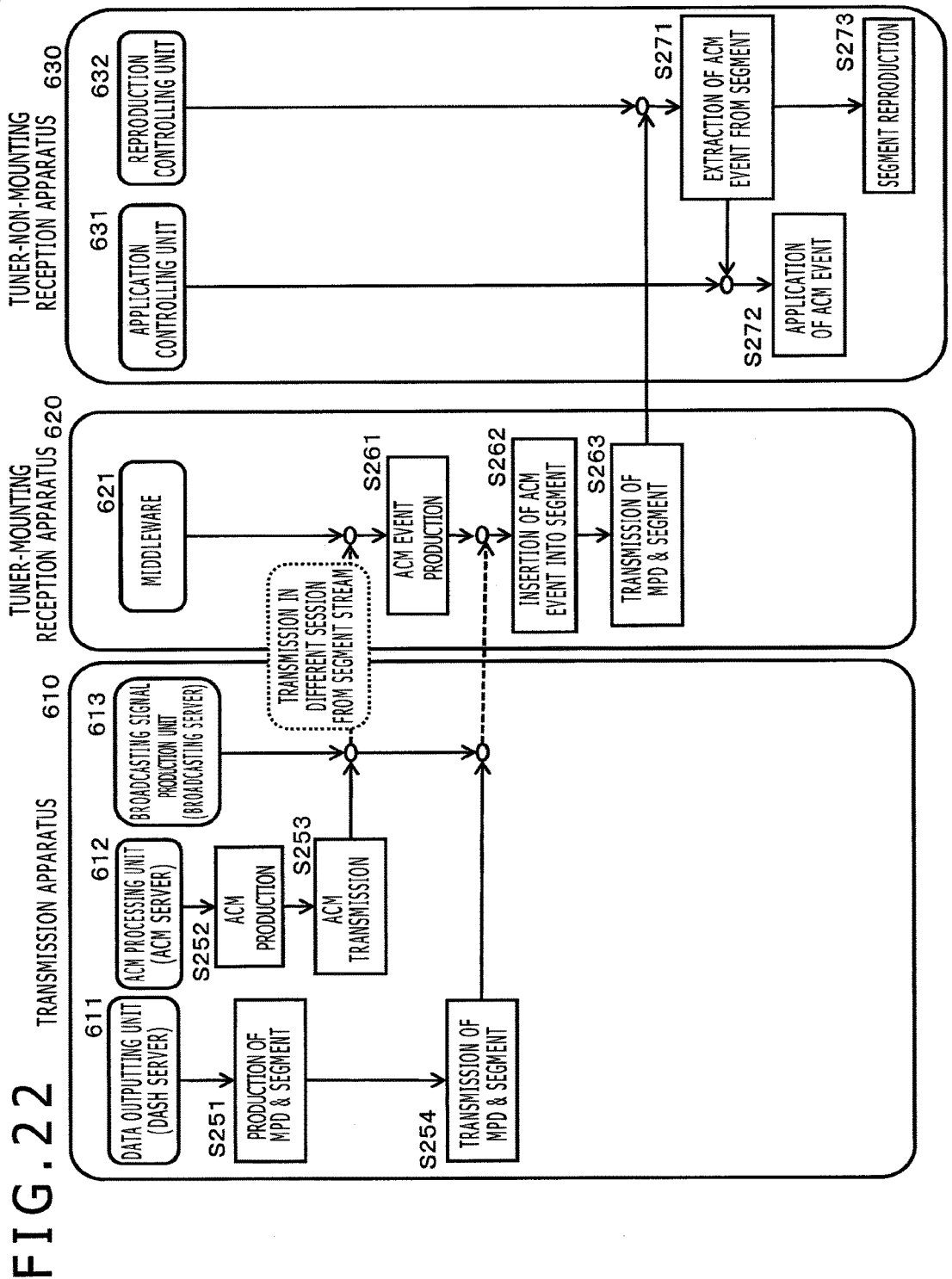
FIG. 22 is a view illustrating a still further production, transmission and utilization sequence of an application control message (ACM).

In FIG. 22, the transmission apparatus 610, tuner-mounting reception apparatus 620 and tuner-non-mounting reception apparatus 630 are depicted from the left.

The transmission apparatus 610 particularly is the broadcasting server 21 or the data distribution server 22 that transmits signaling data such as an MPD or an AV segment.

A process executed by the transmission apparatus 610 is described.

The transmission apparatus 610 includes a data outputting unit (DASH server) 611, an application control message (ACM) processing unit (ACM server) 612 and a broadcasting signal production unit (broadcasting server) 613.

It is to be noted that those functions are functions the broadcasting server 21 or the data distribution server 22 depicted in FIG. 1, which transmits signaling data such as an MPD or an AV segment, has.

In the following, processes executed by the transmission apparatus 610 are described for individual processing steps.

(Step S251)

First at step S251, the data outputting unit (DASH server) 611 of the transmission apparatus 610 produces and acquires an MPD as signaling data and a segment that includes AV data that configures a reproduction content.

(Steps S252 and S253)

Then, the application control message (ACM) processing unit (ACM server) 612 of the transmission apparatus 610 produces an application control message (ACM) at step S252, and transmits the produced application control message (ACM) at step S253.

The application control message (ACM) is a message in which, for example, data described hereinabove with reference to FIG. 15 is stored.

As described hereinabove with reference to FIG. 15, for the application control message (ACM), for example, the following two data types are available:
(1) an application main body non-storing type ACM; and
(2) an application main body storing type ACM.

At step S252, an application control message (ACM) of one of the types is produced.

(Step S254)

Then at step S254, the data outputting unit (DASH server) 611 of the transmission apparatus 610 transmits (outputs) the MPD as signaling data or the segment.

Where the transmission apparatus 610 is the broadcasting server 21, the broadcasting signal production unit (broadcasting server) 613 performs a process for transmitting the MPD or the segment on a broadcasting wave.

Where the transmission apparatus 610 is the data distribution server 22, the MPD or the segment is transmitted through a network.

Now, a process of the tuner-mounting reception apparatus 620 is described.

The tuner-mounting reception apparatus 620 has a configuration similar to that of the tuner-mounting reception apparatus 30 depicted in FIGS. 5 and 6.

The tuner-mounting reception apparatus 620 receives an AV segment or an application control message (ACM) transmitted from the transmission apparatus 610 and produces an ACM recorded segment in which the application control message (ACM) is recorded as event information in the segment.

Further, the tuner-mounting reception apparatus 620 transfers the produced ACM recorded segment or the MPD to the tuner-non-mounting reception apparatus 630.

Processes at steps executed by the tuner-mounting reception apparatus 620 are described.

(Step S261)

If the middleware 621 of the tuner-mounting reception apparatus 620 receives an application control message (ACM) from the transmission apparatus 610, then it sets the received application control message (ACM) as an event at step S261.

In particular, the middleware 621 of the tuner-mounting reception apparatus 620 sets parameters necessitated for event notification such as an activate time, a duration and so forth of the application control message (ACM) and prepares a format as event information in compliance with the DASH standard.

It is to be noted that the parameters to be applied to this process are described as attribute data incidental to the application control message (ACM) received from the transmission apparatus 610.

(Step S262)

Then at step S262, the middleware 621 of the tuner-mounting reception apparatus 620 performs insertion of the application control message (ACM) as event information into an emsg box prescribed in the MP4, which is configuration data of the segment.

By this process, a segment including the application control message described hereinabove with reference to FIG. 18 is produced. In particular, emsg box recorded data prescribed in the MP4 is produced.

In the application control message storage segment depicted in FIG. 18,
it is indicated that the type of the event is the application control message as described hereinabove.

Further, as event data, the application control message (ACM) described hereinabove with reference to FIG. 15 is stored.

Furthermore, an activate (activation) time, duration information and so forth of the application control message are recorded.

The reception apparatus can perform, in accordance with the application control message recorded in the segment, a process with a designated application control message referred to.

In particular, for an application acquired in accordance with the recorded data in the application control message, a process in which the control command recorded in the application control message is applied is executed.

The execution time period and the duration comply with the description of the segment (emsg box) recorded data.

(Step S263)

Then at step S263, the middleware 621 of the tuner-mounting reception apparatus 620 transmits (outputs) the MPD and the segment in which the application control message is recorded.

It is to be noted that outputting of an MPD or a segment from the tuner-mounting reception apparatus 620 to the tuner-non-mounting reception apparatus 630 is executed, for example, from the middleware of the tuner-mounting reception apparatus 620 through a proxy server.

Now, a process executed by the tuner-non-mounting reception apparatus 630 depicted at the right side in FIG. 22 is described.

In FIG. 22, the application controlling unit 631 and the reproduction controlling unit 632 of the tuner-non-mounting reception apparatus 630 are depicted. The components mentioned correspond to the components of the tuner-non-mounting reception apparatus 40 depicted in FIGS. 5 and 6.

(Step S271)

First, if the reproduction controlling unit (DASH client) 632 of the tuner-non-mounting reception apparatus 630 acquires a segment through the middleware 621 of the tuner-mounting reception apparatus 620, then it acquires event information from the acquired segment at step S271.

It is to be noted that it is assumed here that the acquired segment is a segment that includes an emsg box in which an application control message (ACM) is recorded. The segment is a segment in which an application control message (ACM) is recorded in an emsg box prescribed in the MP4 described hereinabove with reference to FIG. 18.

In the application control message storage segment,
it is indicated that the type of the event is the application control message as described hereinabove. Further, as event data, the application control message (ACM) described hereinabove with reference to FIG. 15 is stored.

Furthermore, an activate (activation) time, duration information and so forth of the application control message are recorded.

The reception apparatus can perform, in accordance with the application control message recorded in the segment, a process in which the designated command is applied to the designated application.

(Step S272)

Then at step S272, the application controlling unit 631 of the tuner-non-mounting reception apparatus 630 performs an application process of the application control message (ACM) acquired from the segment.

In the application control message storage segment, the application control message (ACM) described hereinabove with reference to FIG. 15 is stored as event data.

In the application control message (ACM), an application main body of a control target or identification information of the application is recorded, and further, metadata, a control command and so forth are recorded.

The application controlling unit 631 executes an application process of a command prescribed in the ACM for the application specified in accordance with the ACM recorded data.

It is to be noted that a command application time and duration information are recorded in the segment (emsg box prescribed in the MP4) as described hereinabove with reference to FIG. 18.

(Step S273)

Then, the reproduction controlling unit (DASH client) 632 of the tuner-non-mounting reception apparatus 630 acquires an AV content and so forth from the segment received through the tuner-mounting reception apparatus 620 and executes a reproduction process.

It is to be noted that the processes at steps S271 to S273 are executed continually and repetitively.

In this manner, it is possible for the tuner-non-mounting reception apparatus 630 to execute various application controls in accordance with the application control message (ACM) as event information recorded in the segment together with a process for receiving and reproducing an AV segment.

10. Example of Configuration of Transmission Apparatus and Reception Apparatus

Now, an example of an apparatus configuration of the transmission apparatus (server) 20 and the reception apparatus (clients) 30 and 40 that are communication apparatus is described with reference to FIGS. 23 and 24.

Figure 23:
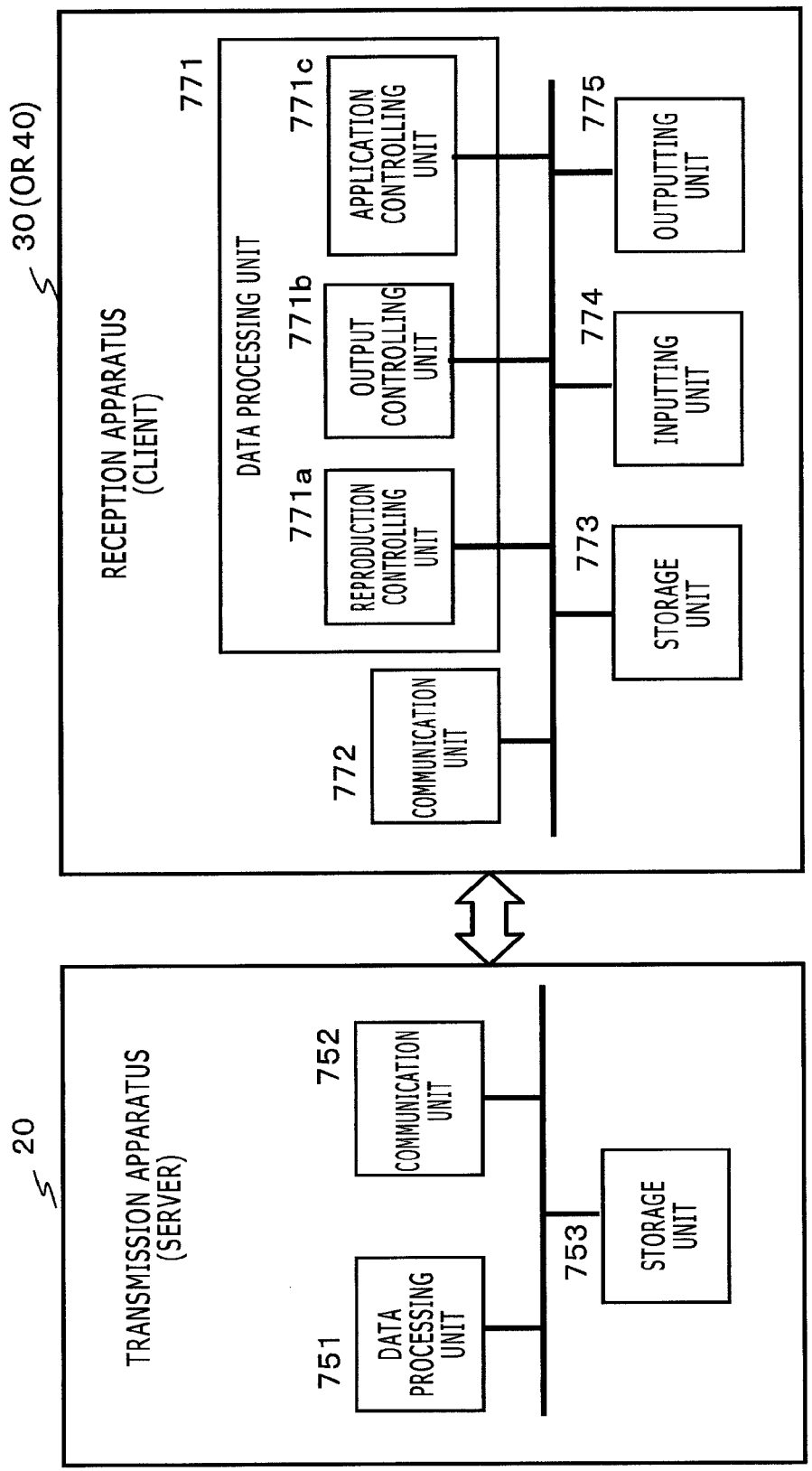
FIG. 23 is a view illustrating an example of a configuration of the transmission apparatus and the reception apparatus that are communication apparatus.

FIG. 23 depicts an example of a configuration of the transmission apparatus (server) 20 and the reception apparatus (client) 30.

The transmission apparatus (server) 20 includes a data processing unit 751, a communication unit 752 and a storage unit 753.

Each of the reception apparatus (clients) 30 and 40 includes a data processing unit 771, a communication unit 772, a storage unit 773, an inputting unit 774 and an outputting unit 775.

The data processing unit 771 includes a reproduction controlling unit 771a, an output controlling unit 771b and an application controlling unit 771c.

The data processing unit 751 of the transmission apparatus (server) 20 executes various data processes for executing a data distribution service. For example, the data processing unit 751 performs production and transmission control of configuration data of a data distribution service. Further, the data processing unit 751 performs production and transmission processes of an application, an application control message (ACM), an ACM storage MPD, an ACM storage segment, other various data and signaling data to be provided to the tuner-mounting reception apparatus (client) 30.

The communication unit 752 performs a communication process of distributing, in addition to an AV segment, an application, an application control message (ACM), an ACM storage MPD, an ACM storage segment, other various data, signaling data and so forth.

Into the storage unit 753, an AV segment that is made a distribution target, an application, an application control message (ACM), an ACM storage MPD, an ACM storage segment, data to be utilized by the application, signaling data and so forth are stored.

Furthermore, the storage unit 753 is utilized as a work area for a data process executed by the data processing unit 751 and is utilized also as a storage region for various parameters.

Meanwhile, the reception apparatus (clients) 30 and 40 include the data processing unit 771, the communication unit 772, the storage unit 773, the inputting unit 774 and the outputting unit 775.

The communication unit 772 is set different between the communication unit of the tuner-mounting reception apparatus 30 and that of the tuner-non-mounting reception apparatus 40.

The communication unit of the tuner-mounting reception apparatus 30 receives data distributed from the transmission apparatus (server) 20, for example, an AV segment, an application, an application control message (ACM), an ACM storage MPD, an ACM storage segment, data to be utilized by the application, signaling data and so forth.

Further, the communication unit of the tuner-mounting reception apparatus 30 is configured as a communication unit that allows data transmission and reception through a network such as a LAN, Wi-Fi or the like.

Meanwhile, the communication unit of the tuner-non-mounting reception apparatus 40 does not include a tuner unit that can receive a broadcasting wave and is formed as a communication unit that can execute transmission and reception of data through a network such as a LAN, Wi-Fi or the like.

The data processing unit 771 includes the reproduction controlling unit 771a, the output controlling unit 771b and the application controlling unit 771c and executes, for example, processes according to the embodiment described hereinabove and so forth.

In particular, the data processing unit 771 executes data processes that utilize an application, an API (Application Programming Interface), an application control message (ACM), an ACM storage MPD, an ACM segment and so forth.

Instruction commands of a user, for example, various commands for channel selection, application activation, install and so forth, are inputted through the inputting unit 774.

Reproduction data is outputted to the outputting unit 775 such as a display unit or a speaker.

Into the storage unit 773, an AV segment, an application control message (ACM), an ACM storage MPD, an ACM storage segment, an application, data to be utilized by the application, signaling data and so forth are stored. Furthermore, the storage unit 773 is utilized as a work area for a data process executed by the data processing unit 771 and is utilized also as a storage region for various parameters.

FIG. 24 depicts an example of a hardware configuration of a communication apparatus that can be applied to the transmission apparatus 20 and the reception apparatus 30.

A CPU (Central Processing Unit) 801 functions as a data processing unit that executes various processes in accordance with a program stored in a ROM (Read Only Memory) 802 or a storage unit 808. For example, the CPU 801 executes processes in accordance with the sequences described hereinabove in connection with the embodiment. Into a RAM (Random Access Memory) 803, a program to be executed by the CPU 801, data and so forth are stored. The CPU 801, ROM 802 and RAM 803 are coupled to each other by a bus 804.

The CPU 801 is coupled to the input/output interface 805 through the bus 804, and to the input/output interface 805, an inputting unit 806 configured from various switches, a keyboard, a mouse, a microphone and so forth and an outputting unit 807 configured from a display unit, a speaker and so forth are coupled. The CPU 801 executes various processes in accordance with an instruction inputted thereto from the inputting unit 806 and outputs a result of the processes, for example, to the outputting unit 807.

The storage unit 808 coupled to the input/output interface 805 is configured, for example, from a hard disk or the like and stores a program to be executed by the CPU 801 and various data. A communication unit 809 functions as a transmission and reception unit for data communication through a network such as the Internet or a local area network and further as a transmission and reception unit for a broadcasting wave and communicates with an external apparatus.

A drive 810 coupled to the input/output interface 805 drives a removable medium 811 such as a magnetic disk, an optical disk, a magneto-optical disk, a semiconductor memory such as a memory card or the like to execute recording or reading of data.

It is to be noted that, although encoding or decoding of data can be executed as a process of the CPU 801 that serves as a data processing unit, a configuration including a codec as hardware for exclusive use for executing an encoding process or a recording process may be applied.

11. Summary of Configuration of Present Disclosure

The embodiment of the present disclosure has been described in detail with reference to a specific embodiment. However, it is self-evident that modification to or substitution of the embodiment can be made by those skilled in the art without departing from the subject matter of the present technology. In other words, the present invention has been disclosed in the form of illustration and shall not be interpreted restrictively. In order to determine the subject matter of the present disclosure, the claims should be taken into consideration.

It is to be noted that the technology disclosed herein can take the following configurations.

(1) A reception apparatus, including:
a communication unit configured to receive event notification data in which an application control message is stored as event data; and
an application controlling unit configured to execute application control based on the application control message stored as event data in an event notification message.

(2) The reception apparatus according to (1), wherein the event notification data is event notification data having a data format that complies with an MPD (Media Presentation Description) application event notification method (MPD Event) that is an event notification method utilizing an MPD that is signaling data transmitted as notification data of control information.

(3) The reception apparatus according to (1), wherein the event notification data is event notification data having a data format that complies with a segment application event notification method (=In-band Event Signaling) that is an event notification method utilizing a segment that is data for transmission of an AV content.

(4) The reception apparatus according to any one of (1) to (3), wherein the event notification data is data in which an event identifier indicating that the event data is an application control message is recorded.

(5) The reception apparatus according to any one of (1) to (4), wherein the event notification data is data in which control time information for executing a process in accordance with the application control message stored as event data is recorded.

(6) The reception apparatus according to any one of (1) to (5), wherein the application control message is data in which an application main body that becomes a control target or an application identifier is recorded.

(7) The reception apparatus according to any one of (1) to (6), wherein the application control message is data in which metadata relating to an application that becomes a control target is recorded.

(8) The reception apparatus according to (7), wherein the metadata includes information of at least one of the following (a) to (c):
(a) a version of an application that becomes a control target;
(b) resource information that is necessitated for execution of the application that becomes the control target; and
(c) rating information of the application that becomes the control target.

(9) The reception apparatus according to any one of (1) to (8), wherein the application control message is data in which a command to an application that becomes a control target is recorded.

(10) The reception apparatus according to any one of (1) to (9), further including:
a data processing unit that acquires the application control message from the event notification data received by the communication unit and outputs the application control message to the application controlling unit.

(11) A reception apparatus, including:
a communication unit configured to receive an application control message;
middleware configured to produce event notification data in which the application control message is stored as event data;
a data processing unit configured to acquire the application control message from the event notification data and output the application control message to an application controlling unit; and
the application controlling unit configured to execute application control based on the application control message.

(12) The reception apparatus according to (11), wherein the middleware produces event notification data having a data format that complies with an MPD (Media Presentation Description) application event notification method (MPD Event) that is an event notification method utilizing an MPD that is signaling data transmitted as notification data of control information.

(13) The reception apparatus according to (11), wherein the middleware produces event notification data having a data format that complies with a segment application event notification method (=In-band Event Signaling) that is an event notification method utilizing a segment that is data for transmission of an AV content.

(14) A transmission apparatus, including:
a communication unit configured to transmit event notification data in which an application control message is stored as event data.

(15) The transmission apparatus according to (14), wherein the event notification data is event notification data having a data format that complies with an MPD (Media Presentation Description) application event notification method (MPD Event) that is an event notification method utilizing an MPD that is signaling data transmitted as notification data of control information.

(16) The transmission apparatus according to (14), wherein the event notification data is event notification data having a data format that complies with a segment application event notification method (=In-band Event Signaling) that is an event notification method utilizing a segment that is data for transmission of an AV content.

(17) A data processing method executed by a reception apparatus, including:

receiving, by a communication unit, event notification data in which an application control message is stored as event data; and executing, by an application controlling unit, application control based on the application control message stored as event data in an event notification message.

(18) A data processing method executed by a reception apparatus, including:

receiving, by a communication unit, an application control message;

producing, by middleware, event notification data in which the application control message is stored as event data;

acquiring, by a data processing unit, the application control message from the event notification data and outputting the application control message to an application controlling unit; and executing, by the application controlling unit, application control based on the application control message.

(19) A data processing method executed by a transmission apparatus, including:

transmitting, by a communication unit, event notification data in which an application control message is stored as event data.

Further, the series of processes described hereinabove can be executed by hardware, by software or by a composite configuration of them. In the case where the processes by software are to be executed, a program in which a processing sequence is recorded can be installed into a memory in a computer incorporated in hardware for exclusive use and executed by the computer or can be installed into and executed by a computer for universal use that can execute various kinds of processes. For example, it is possible to record the program into a recording medium in advance. In addition to the installation from the recording medium into a computer, it is possible to receive the program through a network such as a LAN (Local Area Network) or the Internet and install the program into a recording medium such as a built-in hard disk.

It is to be noted that the various processes described herein not only may be executed in a time series in accordance with the order described but also may be executed in parallel or individually in accordance with the processing capacity of the apparatus that executes the processes or as occasion demands. Further, in the present specification, the term "system" signifies a logical aggregation configuration of a plurality of apparatus and is not limited to a system in which component apparatus are accommodated in the same housing.

INDUSTRIAL APPLICABILITY

As described above, according to the configuration of the embodiment of the present disclosure, a configuration by which application control in which an application control message is applied can be executed with certainty is realized.

In particular, a transmission apparatus transmits event notification data in which an application control message (ACM) is stored as event data to a reception apparatus. An application controlling unit of the reception apparatus executes application control based on the ACM stored as event data in the event notification message. The event notification data is stored in an MPD that is signaling data or in a segment that is data for transmission of an AV content, and the reception apparatus can acquire the ACM from the MPD or the segment and perform rapid application control.

By the present configuration, a configuration by which application control in which an application control message is applied can be executed with certainty is realized.

REFERENCE SIGNS LIST

10 Communication system
20 Transmission apparatus
21 Broadcasting server
22 Data distribution server
30 Tuner-mounting reception apparatus
31 Relay server
32 TV
33 PC
34 Portable terminal
40 Tuner-non-mounting reception apparatus
41 PC
42 Portable terminal
50 Signaling data
60 AV segment
70 Other data
110 Middleware
111 Communication unit (PHY/MAC)
112 Signaling acquisition unit
113 Signaling analysis unit
114 Segment acquisition unit
115 Event insertion unit
116 Application file acquisition unit
120 HTTP proxy server
121, 122 Cache unit
123 Address resolution unit
131, 151 Reproduction controlling unit
132, 152 Output controlling unit
140, 160 Application controlling unit
310 Event insertion execution apparatus
311 Data outputting unit (DASH server)
312 Event processing unit (event server)
320 Event execution apparatus
321 Reproduction controlling unit (event client)
322 Reproduction controlling unit (DASH client)
510 Transmission apparatus
511 Data outputting unit (DASH server)
512 ACM processing unit (ACM server)
513 Broadcasting signal processing unit (broadcasting server)
520 Reception apparatus
521 Middleware
522 Application controlling unit
523 Reproduction controlling unit
610 Transmission apparatus
611 Data outputting unit (DASH server)
612 ACM processing unit (ACM server)
613 Broadcasting signal processing unit (broadcasting server)
620 Tuner-mounting reception apparatus
621 Middleware
630 Tuner-non-mounting reception apparatus
631 Application controlling unit
632 Reproduction controlling unit
751 Data processing unit
752 Communication unit
753 Storage unit
771 Data processing unit
771a Reproduction controlling unit
771b Output controlling unit
771c Application controlling unit
772 Communication unit 773 Storage unit
774 Inputting unit
775 Outputting unit
801 CPU
802 ROM
803 RAM
804 Bus
805 Input/output interface
806 Inputting unit
807 Outputting unit
808 Storage unit
809 Communication unit
810 Drive
811 Removable medium

The invention claimed is:

1. A reception apparatus, comprising:
communication circuitry configured to receive, in a broadcast, event notification data in which an application control message is stored as event data; and
processing circuitry configured to:
extract the application control message from the event notification data received by the communication circuitry, and
execute application control based on the extracted application control message,
wherein the event notification data is data in which an event identifier indicating that the event data is an application control message is recorded.

2. The reception apparatus according to claim 1, wherein the event notification data is event notification data having a data format that complies with an MPD (Media Presentation Description) application event notification method (MPD Event) that is an event notification method utilizing an MPD that is signaling data transmitted as notification data of control information.

3. The reception apparatus according to claim 1, wherein the event notification data is event notification data having a data format that complies with a segment application event notification method (=In-band Event Signaling) that is an event notification method utilizing a segment that is data for transmission of an audio-visual content.

4. The reception apparatus according to claim 1, wherein the event notification data is data in which control time information for executing a process in accordance with the application control message stored as event data is recorded.

5. The reception apparatus according to claim 1, wherein the application control message is data in which an application main body that becomes a control target or an application identifier is recorded.

6. The reception apparatus according to claim 1, wherein the application control message is data in which metadata relating to an application that becomes a control target is recorded.

7. The reception apparatus according to claim 6, wherein the metadata includes information of at least one of the following (a) to (c):
(a) a version of the application that becomes the control target;
(b) resource information that is necessitated for execution of the application that becomes the control target; and
(c) rating information of the application that becomes the control target.

8. The reception apparatus according to claim 1, wherein the application control message is data in which a command to an application that becomes a control target is recorded.

9. A reception apparatus, comprising:
communication circuitry configured to receive, in a broadcast, an application control message;
middleware configured to produce event notification data in which the application control message is stored as event data; and
processing circuitry configured to:
extract the application control message from the event notification data, and
execute application control based on the extracted application control message,
wherein the event notification data is data in which an event identifier indicating that the event data is an application control message is recorded.

10. The reception apparatus according to claim 9, wherein the middleware produces event notification data having a data format that complies with an MPD (Media Presentation Description) application event notification method (MPD Event) that is an event notification method utilizing an MPD that is signaling data transmitted as notification data of control information.

11. The reception apparatus according to claim 9, wherein the middleware produces event notification data having a data format that complies with a segment application event notification method (=In-band Event Signaling) that is an event notification method utilizing a segment that is data for transmission of an audio-visual content.

12. A transmission apparatus, comprising:
processing circuitry configured to store an application control message in event notification data as event data;
communication circuitry configured to transmit, in a broadcast to a reception apparatus, the event notification data that includes the application control message as event data,
wherein the reception apparatus includes processing circuitry that extracts the application control message from the event notification data and executes application control based on the extracted application control message,
wherein the event notification data is data in which an event identifier indicating that the event data is an application control message is recorded.

13. The transmission apparatus according to claim 12, wherein the event notification data is event notification data having a data format that complies with an MPD (Media Presentation Description) application event notification method (MPD Event) that is an event notification method utilizing an MPD that is signaling data transmitted as notification data of control information.

14. The transmission apparatus according to claim 12, wherein the event notification data is event notification data having a data format that complies with a segment application event notification method (=In-band Event Signaling) that is an event notification method utilizing a segment that is data for transmission of an audio-visual content.

15. A data processing method executed by a reception apparatus, comprising:
receiving, by communication circuitry, event notification data in a broadcast in which an application control message is stored as event data;
extracting, by processing circuitry, the application control message from the event notification data received by the communication circuitry; and
executing, by the processing circuitry, application control based on the extracted application control message,
wherein the event notification data is data in which an event identifier indicating that the event data is an application control message is recorded.

16. A data processing method executed by a reception apparatus, comprising:
- receiving, by communication circuitry, an application control message in a broadcast;
- producing, by middleware, event notification data in which the application control message is stored as event data;
- extracting, by processing circuitry, the application control message from the event notification data; and
- executing, by the processing circuitry, application control based on the extracted application control message,
- wherein the event notification data is data in which an event identifier indicating that the event data is an application control message is recorded.

17. A data processing method executed by a transmission apparatus, comprising:
- storing, by processing circuitry of the transmission apparatus, an application control message in event notification data as event data;
- transmitting, by communication circuitry, in a broadcast to a reception apparatus, the event notification data that includes the application control message,
- wherein the reception apparatus includes processing circuitry that extracts the application control message from the event notification data and executes application control in accordance with the extracted application control message,
- wherein the event notification data is data in which an event identifier indicating that the event data is an application control message is recorded.

* * * * *